(12) United States Patent
Carpenter et al.

(10) Patent No.: US 8,352,346 B2
(45) Date of Patent: Jan. 8, 2013

(54) SYSTEMS AND METHODS FOR PROVIDING INVESTMENT PERFORMANCE DATA TO INVESTORS

(76) Inventors: Steven A. Carpenter, San Francisco, CA (US); Manu Sharma, San Francisco, CA (US); Sven Junkergard, San Francisco, CA (US)

( * ) Notice: Subject to any disclaimer, the term of this patent is extended or adjusted under 35 U.S.C. 154(b) by 663 days.

(21) Appl. No.: 12/497,500

(22) Filed: Jul. 2, 2009

(65) Prior Publication Data

US 2010/0005034 A1 Jan. 7, 2010

Related U.S. Application Data

(63) Continuation-in-part of application No. 12/420,040, filed on Apr. 7, 2009, and a continuation-in-part of application No. 12/420,043, filed on Apr. 7, 2009.

(60) Provisional application No. 61/077,852, filed on Jul. 2, 2008, provisional application No. 61/077,853, filed on Jul. 2, 2008, provisional application No. 61/167,519, filed on Apr. 7, 2009.

(51) Int. Cl.
*G06Q 40/00* (2012.01)
(52) U.S. Cl. ............ 705/36 R; 705/35; 705/38; 717/114

(58) Field of Classification Search ................ 705/36 R, 705/35, 38; 717/114
See application file for complete search history.

(56) References Cited

U.S. PATENT DOCUMENTS

| | | | |
|---|---|---|---|
| 7,016,872 B1 * | 3/2006 | Bettis et al. ................ | 705/36 R |
| 7,509,274 B2 * | 3/2009 | Kam et al. ...................... | 705/35 |
| 7,546,264 B2 * | 6/2009 | Charnley, Jr. ............... | 705/36 R |
| 7,647,579 B2 * | 1/2010 | Drissi et al. .................... | 717/114 |
| 7,698,196 B1 * | 4/2010 | Rouvinez et al. ........... | 705/36 R |
| 7,711,623 B2 * | 5/2010 | Smith et al. ................. | 705/36 R |
| 7,801,808 B1 * | 9/2010 | Mattison et al. ................ | 705/38 |

* cited by examiner

*Primary Examiner* — Harish T Dass
(74) *Attorney, Agent, or Firm* — Conley Rose, P.C.

(57) ABSTRACT

Systems and methods for generating a performance index are described. A rank score is generated for each investor relative to a group of investors of which the investor is a member. Generation of the rank score uses investment data of a portfolio of the investor, and the portfolio comprises at least one investment position. A set of investors is selected from the group of investors, and the selection is based on the rank score of each investor. The performance index is generated to provide a measure of performance of top individual investors over time relative to a market index. Generation of the performance index includes generating a composite portfolio comprising investment positions of each portfolio of each investor of the set of investors.

105 Claims, 30 Drawing Sheets

200

Aggregate investment data and real-time trade data of numerous investors.

202

Rank the investors according to investment performance derived from the investment data.

204

Generate equity ratings for stocks held by the investors using the ranking and the trade data.

```
┌─────────────────────────────────────┐
│ Aggregate investment data and real-time │
│     trade data of multiple investors.    │
│                 502                       │
└─────────────────────────────────────┘
                  ↓
┌─────────────────────────────────────┐
│       Generate base score for each       │
│      investor using investment data.     │
│                 504                       │
└─────────────────────────────────────┘
                  ↓
┌─────────────────────────────────────┐
│ Generate adjusted score for each investor by adjusting │
│ base score according to parameter selected from a group │
│ consisting of tenure of investment data, verification state │
│    of investment data, and investor popularity.        │
│                 506                       │
└─────────────────────────────────────┘
                  ↓
┌─────────────────────────────────────┐
│ Rank investors by assigning each investor to a rank group │
│    according to adjusted score of investor.    │
│                 508                       │
└─────────────────────────────────────┘
```

FIG.5

|  | Sharpe Ratio Strategy | Information Ratio Strategy | IR Excess |
|---|---|---|---|
| Top 10% 2008 | -47.97% | -45.48% | 2.49% |
| Top 5% 2008 | -50.26% | -44.67% | 5.59% |
| Top 1% 2008 | -51.27% | -43.24% | 8.03% |
| Top 10% 2007 | 28.00% | 36.61% | 8.61% |
| Top 5% 2007 | 30.05% | 35.98% | 5.93% |
| Top 1% 2007 | 42.62% | 51.70% | 9.08% |

Generating a skill score for an investor of a plurality of investors.
702

↓

Generating a persistence score for investor.
704

↓

Generating a confidence score for investor.
706

↓

Generate a rank score for investor representing a weighted average of the skill score, the persistence score and the confidence score.
708

| Calculating a weighted average win percentage for a portfolio of each investor. | 1102 |

↓

| Calculating a weighted average loss percentage for a portfolio of each investor. | 1104 |

↓

| Generating confidence score as a ratio of the weighted average win percentage to the weighted average loss percentage. | 1106 |

| Calculating a first quantity by multiplying a percentage of the investment position in the portfolio and a percentage gain for the investment position. | 1202 |

↓

| Calculating a second quantity by summing each first quantity for all periods of time for which the investment position outperformed benchmark. | 1204 |

↓

| Calculating weighted average win percentage by dividing second quantity by total number of investment positions that outperformed benchmark. | 1206 |

| Calculating a third quantity by multiplying a percentage of investment position in the portfolio and a percentage loss for the investment position. | 1302 |

↓

| Calculating a fourth quantity by summing each third quantity for all periods of time for which the investment position underperformed the benchmark. | 1304 |

↓

| Calculating weighted average loss percentage by dividing third quantity by total number of investment positions that underperformed benchmark. | 1306 |

FIG.13

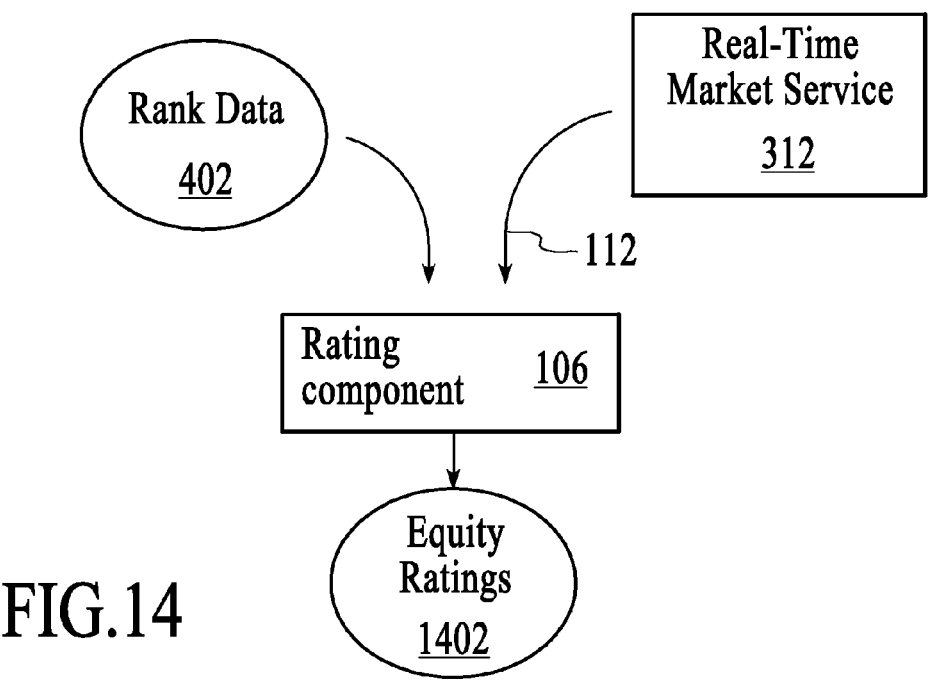

```
Receive rank data of multiple investors that includes
a plurality of rank groups derived from investment
data and trade data of the investors.
                                                    1502
```

```
Designate as a predictor group a rank group having a
pre-specified ranking among the plurality of rank groups.
                                                    1504
```

```
Generate an equity rating for each security using
trade parameters of real-time trade data of
investors of predictor group.
                                                    1506
```

```
Identifying a set of investors, wherein each investor
of the set of investors owns an investment position.
                                                    1702
            │
            ▼
Generating a rank score for each investor, the rank score
categorizing each investor relative to other investors.
                                                    1704
            │
            ▼
Generating an average rank score for a period of time
by averaging the rank scores of the set of investors.
                                                    1706
            │
            ▼
Generating a trailing rank score by averaging
the rank scores of each period of time.
                                                    1708
            │
            ▼
Generating a stock rating score by combining the
average rank score and the trailing rank score.
                                                    1710
```

FIG.17

| Investor | Rank Score |
|---|---|
| 1 | 87.3 |
| 2 | 54.3 |
| 3 | 23.1 |
| 4 | 10.9 |
| 5 | 34.2 |

FIG.18

| Stocks In | Get a rating score of | Which translates to a grade of |
|---|---|---|
| The top 2.5% | 15 | A+ |
| The next 3% | 14 | A |
| The next 4.5% | 13 | A- |
| The next 6% | 12 | B+ |
| The next 7% | 11 | B |
| The next 8% | 10 | B- |
| The next 9% | 9 | C+ |
| The next 20% | 8 | C |
| The next 9% | 7 | C- |
| The next 8% | 6 | D+ |
| The next 7% | 5 | D |
| The next 6% | 4 | D- |
| The next 4.5% | 3 | F+ |
| The next 3% | 2 | F |
| The next 2.5% | 1 | F- |

FIG.19

| Funds / ETFs in | Get a rating score of | Which translates to a grade of |
|---|---|---|
| The top 1.5% | 15 | A+ |
| The next 2% | 14 | A |
| The next 2% | 13 | A- |
| The next 3.5% | 12 | B+ |
| The next 3.5% | 11 | B |
| The next 3.5% | 10 | B- |
| The next 5% | 9 | C+ |
| The next 5% | 8 | C |
| The next 5% | 7 | C- |
| The next 9% | 6 | D+ |
| The next 10% | 5 | D |
| The next 10% | 4 | D- |
| The next 13% | 3 | F+ |
| The next 13% | 2 | F |
| The next 14% | 1 | F- |

Generating a rank score for each investor relative to a plurality of investors of which the investor is a member.

2402

Selecting a set of investors from the plurality of investors based on the rank score of each investor.

2404

Generating a performance index by generating a composite portfolio comprising investment positions of each portfolio of each investor of the set of investors.

```
┌─────────────────────────────────────────┐
│  Receive data corresponding to members. │
│                                         │
│                                    2502 │
└─────────────────────────────────────────┘
                    │
                    ▼
┌─────────────────────────────────────────┐
│  Assign weights to input data components.│
│                                         │
│                                    2504 │
└─────────────────────────────────────────┘
                    │
                    ▼
┌─────────────────────────────────────────┐
│     Generate score for members using    │
│     input data and corresponding weights.│
│                                         │
│                                    2506 │
└─────────────────────────────────────────┘
                    │
                    ▼
┌─────────────────────────────────────────┐
│ Automatically match members according to scores.│
│                                         │
│                                    2508 │
└─────────────────────────────────────────┘
```

```
┌─────────────────────────────────────────────┐
│  Forming an electronic network between investors. │
│                    3202                     │
└─────────────────────────────────────────────┘
                      │
                      ▼
┌─────────────────────────────────────────────┐
│  Sharing investment data and/or brokerage data │
│  between the investors via the electronic network. │
│                    3204                     │
└─────────────────────────────────────────────┘
                      │
                      ▼
┌─────────────────────────────────────────────┐
│  Executing a first action involving an investment position │
│  in a first portfolio and/or a first brokerage account of a │
│  first investor in response to the investment data and/or │
│  brokerage data indicating a second action taken in a │
│  second portfolio and/or a second brokerage account of │
│  at lease one second investor. │
│                    3206                     │
└─────────────────────────────────────────────┘
```

FIG.32

SYSTEMS AND METHODS FOR PROVIDING INVESTMENT PERFORMANCE DATA TO INVESTORS

RELATED APPLICATIONS

This application is a continuation in part of U.S. patent application Ser. Nos. 12/420,040 and 12/420,043, filed Apr. 7, 2009.

This application claims the benefit of U.S. Patent Application No. 61/077,852, filed Jul. 2, 2008.

This application claims the benefit of U.S. Patent Application No. 61/077,853, filed Jul. 2, 2008.

This application claims the benefit of U.S. Patent Application No. 61/167,519, filed Apr. 7, 2009.

TECHNICAL FIELD

The disclosure herein relates generally to information systems. In particular, this disclosure relates to gathering and sharing investment and trade data.

BACKGROUND

Currently, individual investor data and the actual performance of individual investor returns are not transparent. There also is no platform that allows for the formal sharing of actual/authenticated/verifiable individual investment information with others. As a consequence, the entire $100 B investment advisory and portfolio management industry and $10 T mutual fund industry have preyed upon investor insecurity and confusion. The lack of a universal standardized set of benchmarks for independent advisors, investment managers, and mutual fund managers has resulted in billions of dollars in wasted fees annually as individuals fail to meet basic return metrics. Coupled with the popping of the Internet investment bubble, corporate scandals, Wall Street analyst conflicts of interests, etc. many individuals no longer trust professional financial service providers and instead rely on friends and family when making their investment decisions.

Consumer research indicates that friends and family are the most trusted source for investment information and that people by and large do not trust professionals for advice. There are now more than 35 MM active online brokerage accounts and 40 MM American investors who do not rely on a financial advisor to make their important investment decisions. And, those who do so are becoming more and more involved in managing their advisors' decisions. With nearly 75% of mutual funds underperforming their respective indices after accounting for fees, individual investors would have been better off over the past twenty years buying the stocks of the fund companies themselves rather than consuming their services. More, new research out of Harvard Business School suggests that the top decile of individual investors consistently beat the market by 4 basis points per day, or 10% annually. It is no wonder that the Annual Securities Industry Association Investor Survey found that nearly 70% of surveyed investors believe "financial advisors and advisory firms put their own interests ahead of their clients." This sentiment has been steadily and consistently rising since 1999.

There is also strong empirical evidence that suggest that the collective decision-making of a group of individuals making guesses about a subject that can be quantified, often best "expert" sentiment. In the book "The Wisdom of Crowds" by James Surowiecki, the author provides many examples that support this theory. The famous example is the finding that the average of a collective of guesses of the number of jellybeans in a jar comes very close to the actual number; a better guess than the single best guesses individually. As this relates to the stock market, Wharton professor J. Scott Armstrong wrote that he "could find no studies that showed an important advantage for expertise" over individuals. Marshall Wace, a $10 B hedge fund based in the UK, has created a proprietary system, called TOPS, to take advantage of this reality. The firm has created a platform for 1,500 brokers around the world to send in their best investment ideas, which Marshall Wace then runs through its proprietary algorithms. Marshall Wace has been one of the top performing hedge funds in the world over the past few years, relying on these collective ideas. Last, Internet startup PicksPal (www.pickspal.com), a website that allows its users to guess the outcome of sporting events, has uncovered a similar outperformance by a group of its top pickers. PicksPal's overall record against Las Vegas betting lines has been 562-338, a win rate of 63%. In college basketball, the win rate is 66%. In pro football, the win rate is 62%. They are even getting a 52% win rate in pro hockey. In other words, the collective guesses of its top users are besting betting markets.

Consequently, there is a need for a system that will eliminate the uncertainty and intimidation around personal investments by automating and formalizing the current practice of shared peer investment advice with actual, actionable, real-time data. Conventional systems used in the investment business have not yet specifically addressed these consumer needs around investment data but there are a few similar and related technologies and services that have focused on aggregating data principally for viewing.

For example, the Open Financial Exchange (OFX) Standard is a specification for the electronic exchange of financial data between financial institutions, business and consumers via the Internet. Created by CheckFree, Intuit and Microsoft in early 1997, Open Financial Exchange supports a wide range of financial activities including consumer and small business banking, consumer and small business bill payment, bill presentment, tax information, and investments tracking, including stocks, bonds, mutual funds, and 401(k) account details. Open Financial Exchange defines how financial services companies can exchange financial data over the Internet with the users of transactional Web sites, thin clients and personal financial software. Open Financial Exchange streamlines the process financial institutions need to connect to multiple customer interfaces, processors and systems integrators. The Open Financial Exchange specification is publicly available for implementation by any financial institution or vendor. As of March 2004 OFX is supported by over 2,000 banks and brokerages as well as major payroll processing companies.

Other examples of conventional systems include Quicken and Microsoft Money. These systems are Personal Financial Management software that allow users to download and view their financial information from a variety of accounts. For example, Quicken provides access to approximately 2,900 participating financial institutions. Both Quicken and Money allow a user to enter in their username and passwords and automatically download transaction and balance information from those accounts. Further, many of these financial institutions allow users to download "Web Connect" data directly from their sites to users' hard drives for importation later.

As yet another example of a conventional system, Yodlee provides personalized consumer financial solutions to banks, brokerages, and portals. Operating predominantly as an Application Service Provider (ASP), Yodlee has integrated with, and provides services for AOL, Bank of America, Charles Schwab, Chase, Fidelity, Merrill Lynch, MSN, and Wachovia. The Yodlee solutions are powered by a technology known as Account Aggregation, which is built into the Yodlee Platform. This Platform now powers financial service offerings for over 100 financial service providers (FSPs) and their more than 6 million consumers, processing millions of account updates daily in a highly secure, scalable, reliable way.

These examples show that conventional systems used in the investment business have not yet specifically addressed consumer needs around investment data. Consequently, there is a need for a system that helps the now 90 MM and growing individual investors in the U.S. make better, smarter, and more efficient investment decisions with their $16 T in investable assets using the collective knowledge and actual performance of their peers.

Incorporation by Reference

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 2 is a flow diagram for rating securities using the IDSS, under an embodiment.

FIG. 5 is a flow diagram for ranking investors using the ranking component, under an embodiment.

FIG. 6 is a table showing example simulation results for investment data using Information Ratio ranking criterion versus Sharpe Ratio ranking criterion, under an embodiment.

FIG. 7 is a flow diagram for ranking an investor, under an embodiment. The investor is one buying an investment position in the description that follows.

FIG. 11 is a flow diagram for generating a confidence score, under an embodiment.

FIG. 12 is a flow diagram for generating a weighted average win percentage, under an embodiment.

FIG. 13 is a flow diagram for generating a weighted average loss percentage, under an embodiment.

FIG. 14 is a block diagram of the rating component of the IDSS configured to provide or output security ratings, under an embodiment.

FIG. 15 is a flow diagram for rating equities using the rating component operating on rank data and real-time trade data, under an embodiment.

FIG. 17 is a flow diagram for rating a plurality of investment positions, under an embodiment.

FIG. 18 is a table showing example investors and corresponding investor rankings generated by the ranking component, under an embodiment.

FIG. 19 is a table showing example stock ratings generating by the rating component, under an embodiment.

FIG. 21 is a table showing example mutual fund/ETF ratings generating by the rating component, under an embodiment.

FIG. 24 is a flow diagram for a method of generating a performance index, under an embodiment.

FIG. 25 is a flow diagram for investor matching using the IDSS, under an embodiment.

FIG. 26 is an example output of the mutual fund engine of the recommendation engine, under an embodiment.

FIG. 30 is an example output showing the Fit Score for a particular stock, under an embodiment.

FIG. 32 is a flow diagram for transaction facilitation by the IDSS, under an embodiment.

DETAILED DESCRIPTION

Figure 1:
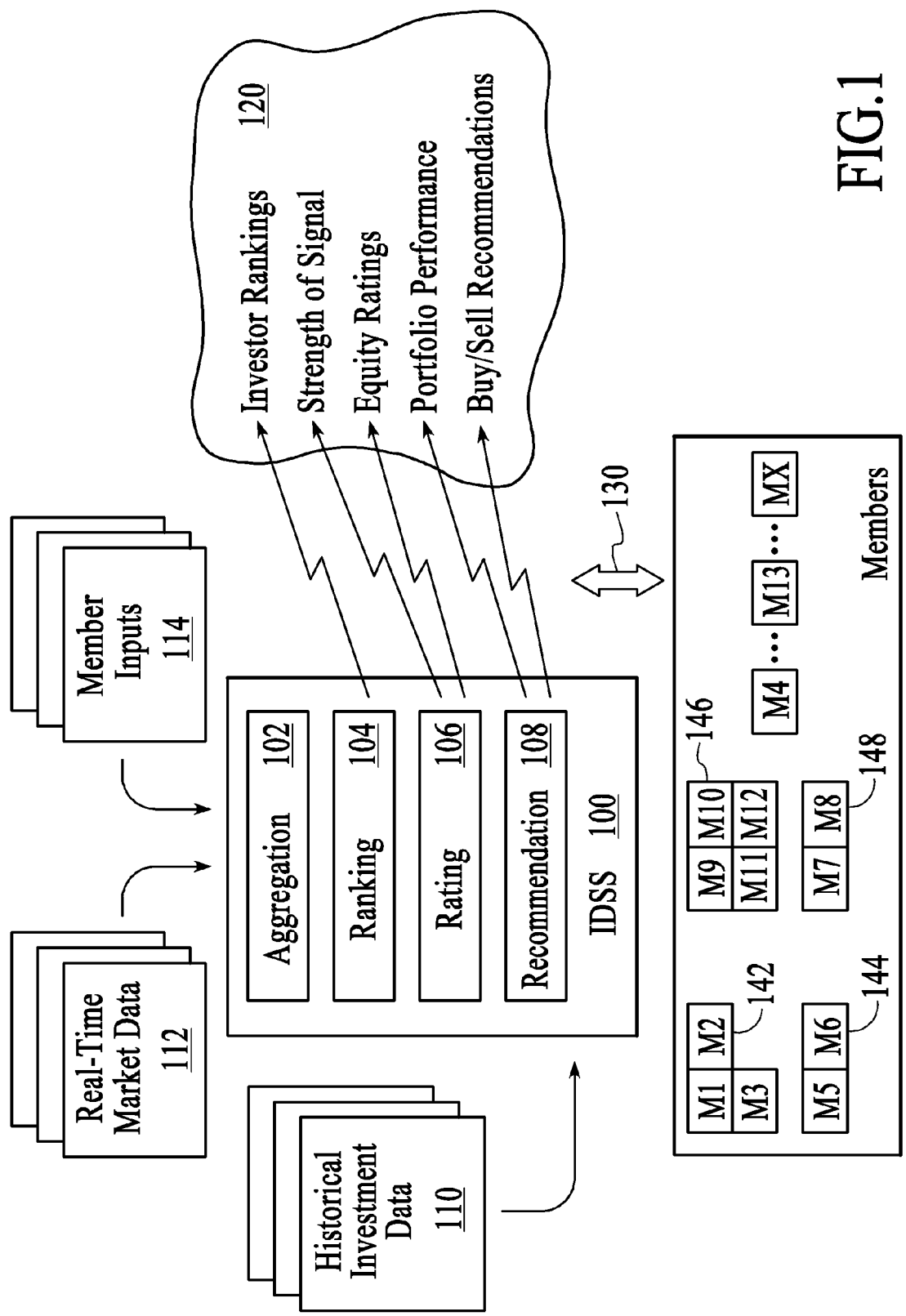
FIG. 1 is a block diagram of the investment data sharing system (IDSS), under an embodiment.

Systems and methods are described below for gathering investment information of peers and/or other trusted sources and making the investment information and analysis available on a real-time basis. These systems and methods, collectively referred to herein as the investment data sharing system (IDSS), are configured and function to provide investment information and advisory services for individual member-investors (referred to as members, user, or subscribers) generated through peer research, real-time portfolio and trading sharing. The IDSS components are configured to consolidate individual member account data from a variety of data sources and then allow those members to share the aggregate data set for the purposes of providing real-time information, insights, and investment recommendations to peers based upon individual performance, real-time trading activity, and summary member data. Specifically, members will be able to share current holdings, positions that they are watching or thinking about buying or selling, and provide real-time or near real-time notifications of actual transactions. Furthermore, the IDSS generates insights into individual member portfolios based on the performance of other individual investors.

The IDSS include components configured to enable or support the collection and sharing of actual investment information among various individual member-investors. The investment data includes data of any type of investment vehicle used by the investor including but not limited to data or information of public equities or securities, exchange-traded funds (ETFs), mutual funds, fixed income and options data. In so doing, the IDSS aggregates investment data of members to form a data set that ties historical performance data of actual investors to real-time trade data. Aggregation of investment data, which includes data on what investments are being made and/or considered by members, includes pulling, fetching and/or receiving financial data from the members' brokerage accounts or other investment accounts and/or receiving data entered directly by a member. The IDSS uses the aggregate data to make inferences and conclusions on the overall market and then directly applies the inferences and conclusions to member portfolios. Thus, the IDSS creates a social network around investment information so that a member can gain access to investment data and performance of other members to whom the member is linked. Further, the IDSS provides an automated portfolio management system or service for use in financial or investment services that uses the aggregate data to provide cost effective yet customized investment advice.

The IDSS uses data of members to provide transparency and insights around current holdings, asset allocation, historical performance, risk assessment, watch list, research and trading activity of the members. Top performers become "stars" under the IDSS by helping others simply by allowing others access to their investment data. Investment performance is a unique data set because it is an objective metric; so-called "professionals" and "amateurs" can be judged on an even playing field. Once there is a community (the IDSS community) sharing this information, the aggregate data set is an incredibly powerful tool used to identify both high and low performing investors, which may likely exist in the close personal network of members. The IDSS thus reduces or eliminates the uncertainty and intimidation around personal investments by automating and formalizing the current practice of shared investment advice with actual, actionable, real-time data from peers.

In the following description, numerous specific details are introduced to provide a thorough understanding of, and enabling description for, embodiments of the IDSS. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The following terms are intended to have the following general meanings as they are used herein.

An "investor" is any party that makes an investment. An investor in finance includes the particular types of people and companies that regularly purchase equity or debt securities for financial gain in exchange for funding an expanding company. An investor can purchase and hold assets in hopes of achieving capital gain, as a profession, and/or for short-term income.

A "security exchange" or share market is a corporation or mutual organization that provides facilities for stock brokers and traders, to trade company stocks and other securities. Stock exchanges also provide facilities for the issue and redemption of securities as well as other financial instruments and capital events including the payment of income and dividends. The securities traded on a security exchange include shares issued by companies, unit trusts and other pooled investment products and bonds. Trading or transactions via a security exchange can be via electronic networks and/or at a physical location.

A "market service" is a real-time, streaming quote and news service with data direct from stock exchanges. Market service data allows a member to watch market movements in real time. Examples of data or information available from a market service include, but are not limited to, the following: stock and option quotes; futures, futures options, and futures spreads quotes for international and domestic; international and domestic futures quotes; single stock futures quotes; customized watchlists; graphical displays and/or statistics of trading trends; tickers; and news of business, technology, commodities, and finance.

The description and examples of the IDSS that follow reference "securities" as the investment vehicle. The use of a single type of investment ("securities") is only for purposes of simplicity in describing the system, and it is understood that "securities" can be replaced throughout the description herein with any type of investment vehicle used by investors. More specifically, for example, the investment vehicles contemplated hereunder include public equities, exchange-traded funds (ETFs), mutual funds, and fixed income and options data, to name a few, and can further include any other type of investment vehicle not specifically described herein that is appropriate under the description of the IDSS.

FIG. 1 is a block diagram of the investment data sharing system (IDSS) 100, under an embodiment. The IDSS includes numerous components running under one or more processors. The IDSS components of an embodiment include an aggregation component or engine 102, a ranking component or engine 104, a rating component or engine 106, and a recommendation component or engine 108. The IDSS includes couplings or connections to sources or components from which historical investment data 110 and real-time market data 112 can be received, fetched, gathered, and/or inputted. The investment data 110 and real-time market data 112 can be received periodically or continuously in real-time or near real-time via synchronization over electronic couplings with brokerages, market services, and/or other third-party sources of data. The IDSS is also configured to receive data or information 114 manually entered by a member.

The IDSS components 102-108 can be components of a single system, multiple systems, and/or geographically separate systems. The IDSS components 102-108 can also be subcomponents or subsystems of a single system, multiple systems, and/or geographically separate systems. The IDSS components 102-108 can be coupled to one or more other components (not shown) of a host system or a system coupled to the host system.

The IDSS components are configured and function, individually and/or collectively, to provide data products or outputs 120 including investor rankings, security ratings, risk-adjusted portfolio performance, and/or buy/sell recommendations, as described in detail below. The IDSS also includes portals and/or couplings 130 by which members M1-MX (where X is any number) can access the data products relating to their individual accounts or portfolios as well as the accounts or portfolios of members to whom they are linked. The portals and/or couplings 130 of an embodiment include, for example, connections between a member's computer and the IDSS via a web site provided or hosted by the IDSS.

Member access to the IDSS 100 includes links to the accounts and/or portfolios of other members and, consequently, the establishment of social networks 142-148 around investment information. Therefore, the IDSS components are configured to enable a member "invited" by a friend and/or family member (e.g., via electronic mail) to enter the IDSS and to establish a connection with the inviting member for the purposes of sharing investment information. Members are then able to establish and maintain connections with other peers within the IDSS for the purposes of sharing research, insights, portfolio investments, historical returns. The example shown includes four networks including: a first network 142 including linked members M1, M2 and M3; a second network 144 including linked members M5 and M6; a third network 146 including linked members M9, M10, M11, and M12; and a fourth network 148 including linked members M7 and M8. The example shown also includes numerous members M4 and M13-MX not linked to any other member. While particular networks are shown for purposes of this example, the embodiment is not limited to particular numbers or sizes of networks.

Operations under the IDSS generally include the flow or transfer of data in real-time or near real-time from third-party sources, generation of performance feedback and customized recommendations, and the establishment of a social network among member-investors that enables sharing of the data, performance feedback, and recommendations. Accordingly, the IDSS operations include the flow or transfer of data (e.g., historical investment data, real-time trade data, etc.) into the system, manipulations and calculations relating to the data, creating or establishing social networks around investment information, generating security ratings, generating security recommendations, providing sharing of research and investment information that includes members or a collection of members "following" portfolios, providing real-time trading notifications, and automatically performing trades based on system information, to name a few. Each of these operations is described below; these operational descriptions are provided as examples only and are not intended to limit embodiments of IDSS to those described.

The IDSS of an embodiment includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of the IDSS, and/or provided by some combination of algorithms. The IDSS methods described herein can be implemented in one or more of software algorithm(s), programs, firmware, hardware, components, circuitry, in any combination.

The IDSS components can be located together or in separate locations. Communication paths couple the IDSS components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

The IDSS 100 of an embodiment includes a ranking component 104, a security rating component 106, and a recommendation component 108, as described in detail herein. The basis for the ranking, rating and recommendation components or models of an embodiment is the fundamental assumption that historical out-performance by certain individual investors will, on average, lead to corresponding out-performance in the future for some determined amount of time. For example, see Coval, Joshua D., David Hirshleifer, and Tyler Shumway, "Can Individual Investors Beat the Market?" Harvard Business School Working Paper, No. 04-025, 2003). Thus, the "top" investors as designated by the IDSS, and based on a multitude of variables regarding past performance, current holdings, and real-time trading activity, will pick stocks that, on average, will outperform other investors, indices of non-active investment strategies, and professional investment advisors for some period of time. And, conversely, historically poorer performing individuals will select stocks that, on average, will under-perform these same benchmarks for another period of time. By also combining this data with publicly-available financial and trading information, the IDSS provides a compelling proprietary quantitative investment model that can be used to provide advice to anyone managing a portfolio.

Conventional rating systems rate stocks using a model based on some number of variables or criteria (e.g., related to earnings per share, market CAP, etc.), where the variables are all based on publicly available data or metrics. Once rated, the stocks are ranked. In contrast to these conventional systems, the IDSS rating component is built on a ranking system which ranks members or individuals. The IDSS generally uses a ranking component to rank members based on their historical investment performance, and then uses data of the ranking to identify a segment or portion of the people whose past performance is a good predictor of future results. The IDSS of an embodiment uses the aggregated data to rank the members and, using the ranking, identify the appropriate segment of people to use as predictors. Subsequently, the IDSS uses data of the real-time trading activities of the predictor members as a security rating system to rate securities for all participating members. Also, other parameters (e.g., earnings per share (EPS), price-to-earnings (P/E) ratio, stock price momentum, etc.) may be used along with the rank data to generate the security ratings. The rating system (e.g., ratings include A, B, C, D, and F ratings) is then used to automatically monitor member portfolios.

FIG. 2 is a flow diagram for rating securities 200, under an embodiment. The components of the IDSS 100 (FIG. 1) are configured to rate securities by aggregating 202 investment data and real-time trade data of numerous members. The investment data includes data of current holdings, historical holdings, historical performance data, historical transactional data, and/or watch lists, to name a few. More specifically, for example, the investment data includes data or information of public equities, exchange-traded funds (ETFs), mutual funds, fixed income and options data, but is not so limited and can include data of any type of investment vehicle used by the investor. The real-time trade data includes trade data of the members and publicly available trade data of at least one stock market. The IDSS components rank 204 the members according to investment performance derived from the investment data. Ratings are generated 206 for securities held by the members using the rankings along with the real-time trade data of the members. The IDSS compares the ratings with a member's current holdings and specified or calculated risk level and, in response, generates recommendations for the securities held by the member in his/her portfolio with the goal of providing a better performing mix of investments, while maintaining or lower the current risk level and preserving the investor's asset allocation strategy. The recommendations of an embodiment include a transaction recommendation and strength of signal indicator. The transaction recommendation includes a buy/sell rating for a corresponding stock, and the strength of signal indicator indicates strength of the transaction recommendation.

The data aggregation of an embodiment operates on data entered by a member and/or data received at the IDSS via data pushing, pulling, and/or fetching operations from the member's brokerage accounts or other investment accounts and/or receiving data entered directly by a member. For manual inputting of data by a member, the member can manually enter a portion and/or all of the positions of his/her portfolio data into the IDSS via a member portal or access point.

The IDSS also supports automatic data transfer operations. For example, a user can enter the username and password to each financial institution account (e.g., third-party brokerage account, etc.) that stores the member's online investment data; components of the IDSS will then receive the data from the third-party financial institution account via one or more of data pushing, pulling, fetching and/or retrieving operations. The data of an embodiment is automatically received according to programmable or selectable periods (e.g., hourly, twice a day, daily, weekly, etc.). Furthermore, the IDSS can import data from a file obtained from a third-party financial institution in response to activation or selection of a "download" button (e.g., "Quicken Web Connect"). Regardless of the data entry mechanism used, the IDSS components automatically aggregate investment data and incorporate the data into back-end databases with other individual investor data.

Figure 3:
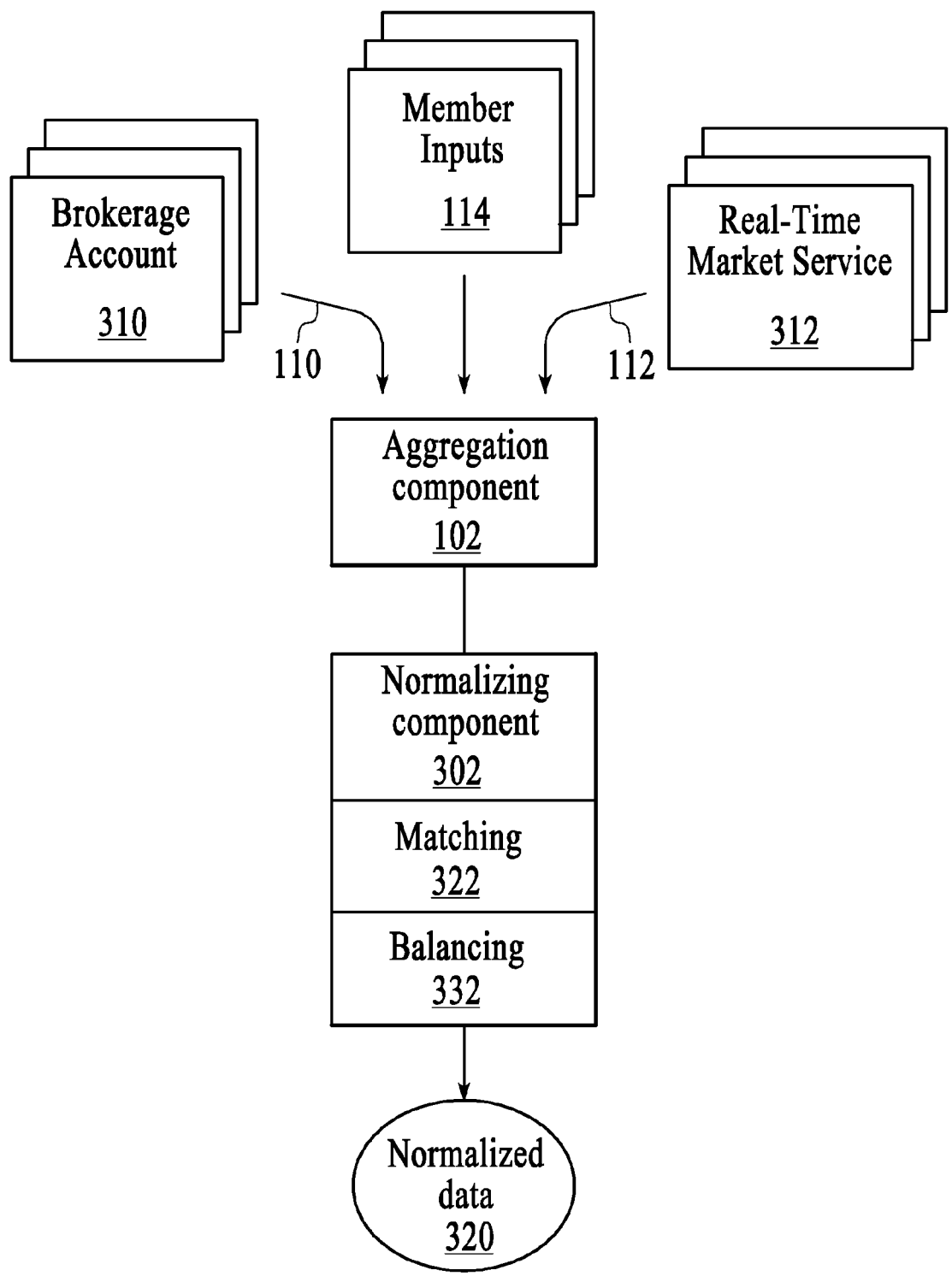
FIG. 3 is a block diagram of the aggregation component of the IDSS coupled to and/or including a normalizing component, under an embodiment.

The data aggregation of an embodiment includes normalizing of data received at the IDSS. FIG. 3 is a block diagram of the aggregation component 102 of the IDSS coupled to a normalizing component 302, under an embodiment. The normalizing component 302 is coupled to the aggregation component 102 or, alternatively, integrated as a sub-component or sub-system of the aggregation component 102. The output of the normalizing component includes normalized data 320.

Using the normalizing component 302, data aggregation of an embodiment includes normalization of data aggregated from across multiple financial institution accounts. This normalization can include, but is not limited to insertion of synthetic buy/sell transactions for balancing purposes, determining if a portfolio is complete and balanced, auto reconciliation of positions and transactions, security matching given symbol, Committee on Uniform Security Identification Procedures (CUSIP) number, or company name, sector information, corporate action and short selling handling, and verification of position pricing information with several different historical data sources.

The IDSS of an embodiment is configured to normalize aggregated data by receiving investment data 110 (e.g., positions, transactions, cash balances, etc.) from one or more third-party brokerages 310 or brokerage accounts. The investment data 110 can be received via synchronization over electronic couplings with brokerages, market services, and/or other third-party sources of data. The received data is matched 322 against a known set of identifiers for each particular security. The matching 322 includes taking a set of possible solutions and finding the first successful match using the security's CUSIP, symbol, or name. Because every brokerage 310 may use a different description for broker actions, a determination is made as to how each brokerage 310 describes the common broker actions, for example, buy, sell, split, and dividend to name a few. Each transaction is then classified according to the broker action.

When the normalizing includes balancing 332, the IDSS of an embodiment is configured to balance 332 a portfolio by forming historical snapshots of the portfolio using data of the received positions and transactions. The snapshots are historical versions of a member's holdings and transactions at each transactional event. These snapshots include holdings coming into the transaction, holdings going out of the transaction, and a transactional event.

A determination is made as to whether any additional transactions are required in order to match 332 the current portfolio state or holding to the portfolio state indicated by the transactional history. If the transactional history totals to more holdings than the current portfolio holdings, the normalizing component 302 generates or creates a synthetic sell transaction to reduce the holdings; the synthetic sell transaction involves a number and/or type of stocks by which the transactions history exceeds the current holdings. If the transactional history totals to fewer holdings than the current portfolio holdings, the normalizing component 302 generates or creates a synthetic buy transaction to increase the holdings; the synthetic buy transaction involves a number and/or type of stocks by which the transactions history is deficient relative to the current holdings.

When the normalizing of an embodiment includes automatic reconciliation of positions and transactions, the IDSS is configured to locate a particular security. If the particular security is not located it remains in a "not found" state in the aggregate investment data. When located, the price, activity date, and action of the security is compared against all other transactions known for this member. If no other similar transactions are found for this member, the transaction is reconciled; otherwise, the transaction is marked as a possible duplicate transaction.

Figure 4:
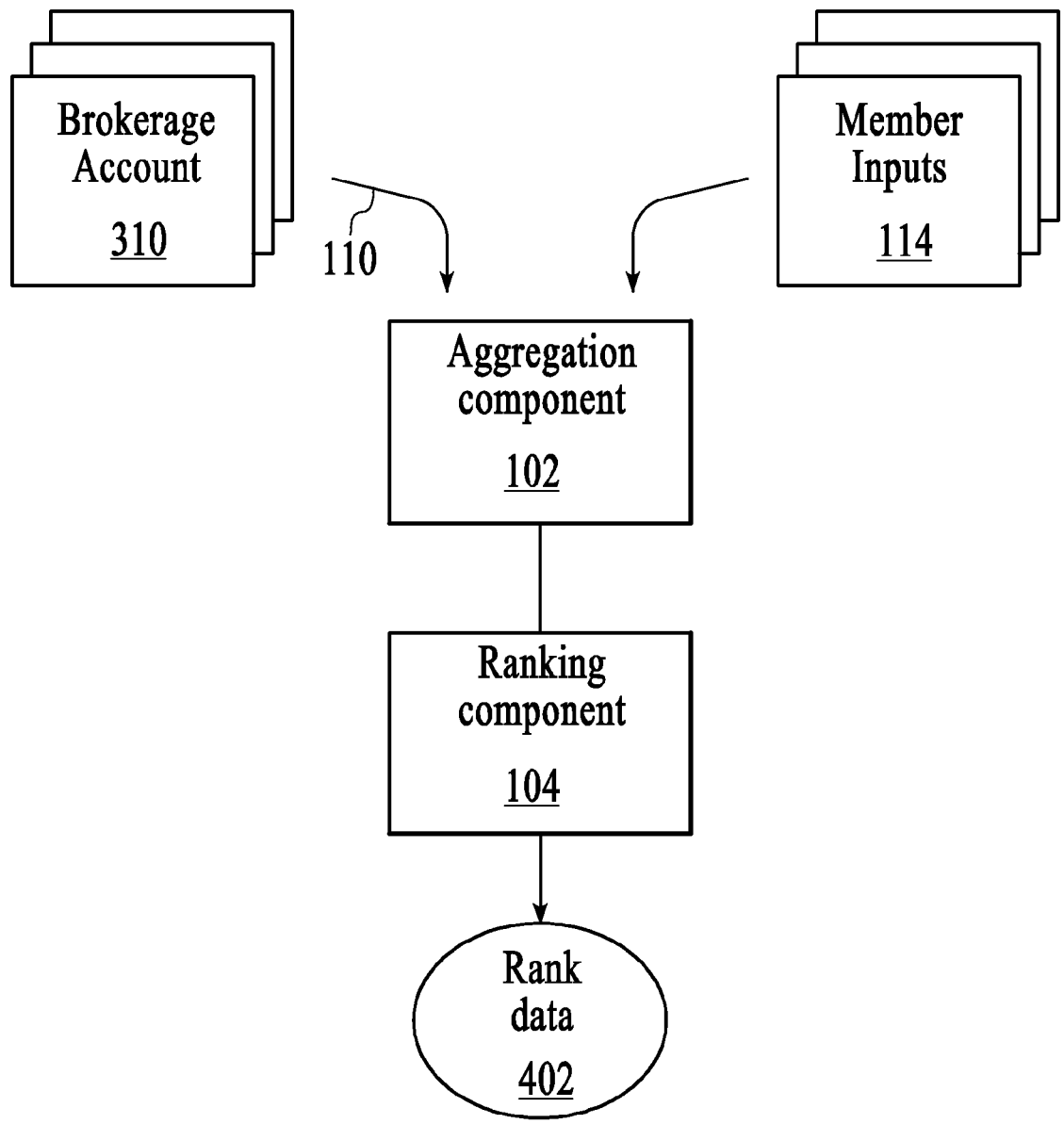
FIG. 4 is a block diagram of the aggregation component of the IDSS coupled to a ranking component that outputs investor ranks, under an embodiment.

The IDSS uses aggregated data of investors to rank the investors. FIG. 4 is a block diagram of the aggregation component 102 of the IDSS coupled to a ranking component 104 that outputs investor ranks 402, under an embodiment. The input to the ranking component 104 includes normalized data as described above, but is not limited to normalized data.

FIG. 5 is a flow diagram for ranking investors 500 using the ranking component 104, under an embodiment. Components of the IDSS are generally configured and function to aggregate 502 investment data and real-time trade data of the investors, as described above. A base score is generated 504 for each investor using the investment data. The investment data is received from third-party sources 310 and/or entered 114 by the member, as described above. An adjusted score is generated 506 for each investor by adjusting the base score according to an attribute or weighting parameter. The attribute can include, for example, tenure of the investment data, verification state of the investment data, and/or popularity of the investor to name a few. The IDSS ranks investors 508 by assigning each investor to a rank group according to the adjusted score of the investor. The ranking is described in detail below.

The IDSS ranks individual members based on a variety of attributes, including actual historical and current portfolio data. The ranking attributes might include data of watch lists but is not so limited. The security rating and recommendation engine operations are based on these rankings as detailed below. The ranking component generally ranks individual investors into different tiers, and the tiers are defined by different percentiles where the highest tier (e.g., Elite rank or tier) comprises the top investors in the IDSS community. The other tiers below the highest tier follow the same principle with the last tier comprising the lowest performing investors. The ranking is derived primarily from risk adjusted performance which is a measure of investor performance with the volatility attributable to different risk profiles removed and exposing the skill in picking different investments. Investors with a high risk adjusted performance are rated higher than those with a low risk adjusted performance.

The IDSS receives investment data of a large number of members, and the investment data includes actual historical portfolio data, current holdings, watch lists, and/or real-time trading information for example. The investment data can include other types of historical performance data of the members. This investment data is received into the IDSS from a variety of sources: online brokerage accounts, portfolio management websites, personal software of a member (e.g., Quicken, etc.), as well as manual entry. The investment data is received via importation, fetching, and/or retrieving, for example, or via other techniques known in the art for transferring data. The investment data received can span long periods of time and, in some cases, can go as far back as eight (8) years, depending on the data tenure of the online brokerages.

This disparate individual historical performance data in the system provides insight into the past and current universal distribution curve of "high" (strong) and "low" (poor) performing individual investors. Investors that have consistently experienced significant historical returns and outperformed indices and benchmarks are ranked higher than those with minimal or negative returns. For the first time, the IDSS enables individual investors to see where they stand as far as their investment performance relative to some number of their peers, and the top individual investors in the IDSS community can be recognized.

The ranking operations begin when a user imports his/her investment data from one or more brokerage accounts (e.g., Charles Schwab, Fidelity, eTrade, etc.) via an electronic coupling between the brokerage account and the IDSS. The IDSS aggregates the investment data received and initiates or performs a series of calculations. The data aggregation enables matching of investors as described herein, where the matching includes identifying other investors with portfolios having a similar structure to a member yet are realizing better performance than the member's portfolio.

The IDSS is configured to take the investment data and construct numerous distinct views of information. For example, the IDSS of an embodiment generates a first view that is personal to the member (personal view), a second view that is shared with a network (network view), and a third view that is shared with the general public (public view). The information views can be accessed via the IDSS web site. For the member specifically, the IDSS automatically calculates individual portfolio returns and performance for various time periods. The returns and performance are calculated, for example, for a current period (e.g., current day, time period of the current day, etc.) and/or during a historical period (e.g., daily for the last 180 days, daily for the last month, daily for the last quarter, daily for the last year, monthly for the last year, monthly for the last five (5) years, average annual return for the last year, average annual return for the last two (2) years, etc.).

The calculations performed by the IDSS of an embodiment include one or more of time or money weighted performance, current and historical portfolio risk, Sharpe ratio, portfolio dollar values (including cash balances), verification level of the "quality" of the data, number of trades/year, average hold time of an asset, average cost basis, holdings percentages and asset allocation, and tenure of data. These calculations appear on the member's area of a portal or electronic site (e.g., "members home page" of the IDSS web site) and are easily accessible throughout the IDSS. These calculations form the basis for a member statistics or "stats" area, which provides or preserves a historical record of a member's investment activity, similar to the statistics for a baseball player on the back of a baseball card. This is of immense value to a member since the majority of online brokerage firms only preserve a certain window of data and then it becomes inaccessible to the user as well as providing a consolidated view of the statistics for a member's entire holdings across various investment accounts held at different financial institutions.

The ranking component 104 of an embodiment is configured to perform a weighting of members using results of the calculations and data of numerous weighting parameters or member attributes as described above. The parameters include the risk-adjusted performance of each member. The risk-adjusted performance is generated from data of historical performance and risk.

The parameters also include the tenure of data. The tenure of data is the amount or length of transactional history available for a member. If a member has three years of transactional history stored within the system, the tenure of her account is three years, for example. The data tenure of an embodiment can be any period of time (e.g., 1-months data, 2 years of data, etc.).

The parameters additionally include validity of data. Each member has a verification level assigned to him/her based on the amount of that member's data that is manually created or entered by the member (e.g., not verifiable) and the amount of that member's data received via an electronic link or coupling with a brokerage (e.g. verifiable).

The ranking system weighting parameters can also include member popularity. The popularity attribute quantifies or weights each member by the quality of investors to which that member is linked on the platform. Members can follow other members, and when many other members are linked to a particular member (e.g., has many followers) this is a quantifiable measure of popularity. When considering a member's "popularity" the quality of the member's followers is also considered, and highly rated followers score higher than lowly rated followers.

The parameters for weighting of members further include momentum. The momentum attribute represents, for example, performance above a pre-specified threshold during a pre-specified period of time (e.g., 3 months, 6 months, etc.). The most recent performance trend (e.g., upward trend, downward trend, plateau) of the member's portfolio is therefore represented in the overall ranking as members can change their investment strategy at any point and the "current" strategy is more important to the IDSS member-investor community as it will be controlling the future performance of the investor.

The weighting parameters used in the ranking of members can include various other variables. The other variables can include number of trades per year by a member, average hold time of an investment, and sector weighting to name a few.

Using the weighting parameters described above, the IDSS "ranks" each member in order to compare him/her against other members, individuals, and benchmarks. In ranking each member, the ranking component 104 calculates or generates each member's five (5) year Sharpe Ratio, and this Sharpe Ratio forms a base score. While the ranking component 104 of an embodiment uses the Sharpe Ratio to form the base score, the embodiment is not so limited, and alternative embodiments can use other available techniques to generate the base score.

The ranking component 104 adjusts the base score according to one or more criteria. The ranking component 104 of an embodiment adjusts the base score according to the data tenure. For example, the base score remains unadjusted for a data tenure approximately equal to five (5) or more years, while the base score is adjusted down to a value of zero (0) for a data tenure of zero (0) or an absence of tenure data. The adjustments are performed by multiplying the input base score by a factor representative of the data tenure. For example, a data tenure of approximately three (3) years results in multiplication of the base score by a factor of 60% (three (3) years is 0.60 or 60% of five (5) years), for an effective reduction in the base score of approximately 40%. The adjustments for data tenure however are not limited to linear adjustments or multiplication operations.

The ranking component 104 also adjusts the base score according to data validity or verification. For example, the input base score, whether unadjusted or previously adjusted, is not adjusted for a fully verified account, but is adjusted down (e.g., reduced 50%, reduced 30%, etc.) for an unverified account. The adjustments for data validity are not limited to linear adjustments or multiplication operations.

The ranking component 104 can also adjust the base score according to member popularity. For example, the input base score, whether unadjusted or previously adjusted, is not adjusted for a contact and follower network larger than a pre-specified popularity threshold. However, the input base score can be adjusted down (e.g., reduced 25%) for an empty network with no linked members. For example, a network of a particular member that includes a number of members approximately equal to 80% of the popularity threshold value results in an effective reduction in the base score of approximately 10%. The adjustments for member popularity are not limited to linear adjustments or multiplication operations.

The ranking component 104 of an embodiment categorizes and qualifies individual investors based upon real historical and real-time brokerage account data. The opportunity is to develop either a long or short investment strategy that can be used as the basis for an investment recommendation. Several criteria are considered, including historical performance, real-time trading activity and holding decisions, sector inflows and outflows, risk, and diversification (amongst others) to form the basis of the system. The system can then confidently and predictively identify skillful and not-so-skillful investors from a pool of retail investors that have a high potential to continue to realize positive or negative returns for some period into the future.

Previously, it has been assumed that investors with historically high Sharpe Ratios (i.e., risk adjusted excess return) over some time period will continue to have high Sharpe Ratios in the future. However, the mere presence of a high Sharpe Ratio does not guarantee that an individual has a proven, and replicable, ability in either portfolio construction or stock selection, or market timing. Rather, it reveals a combination of skill (alpha), leverage (beta) and luck. It is this combination of alpha, beta and luck that comprises the realized Sharpe Ratio. There is no promise of persistence. Therefore, using Sharpe Ratio to rank investors might be like saying, "I am willing to bet my money on investors that got the most return for a given amount of risk—regardless of how they got there—i.e., I don't care if they were skillful investors, or leveraged the market in an up market, or were just lucky".

This is a poor bet, simply because out of a pool of investors with high realized Sharpe Ratios, the only ones that are expected to do well in the future are those that have skill—alpha. Investors with high beta scores will likely continue to outperform in bull markets and, conversely, will be expected to underperform in bear markets. Investors that were just lucky may or may not continue to outperform in the future—it is more likely the case that he/she will not outperform.

A predictive ranking algorithm like the ranking component of an embodiment, therefore, identifies skillful investors and filters out investors with high betas and investors that have simply been lucky. The first filter should ideally make the skilled investor pool market of an embodiment neutral and the second filter should remove randomness from that skilled investor pool.

The IDSS, through the ranking component, identifies skilled (not leveraged) investors who win most of the time (persistent) and win big (win big lose small, confident in their choices). The ranking component of an embodiment functions to identify the skilled investors who are persistent and confident, as described in detail below.

The ranking component functions to remove investors that achieved high returns because of leverage through the use of the Information Ratio (IR) as a ranking criterion. Similar to the Sharpe Ratio, the Information Ratio measures risk adjusted active return. The active return is return (alpha) over a benchmark (e.g., S&P 500). The IR is used in the IDSS of an embodiment instead of the Sharpe Ratio and, in an alternative embodiment of the IDSS the IR is used along with the Sharpe Ratio.

Simulations were run with 16 different ranking algorithms on half of the dataset (to avoid statistical over-fitting of data) by varying the ranking and following times. In each case, two simulations were run—one using Sharpe Ratio as the ranking criterion and the other using the Information Ratio. In addition to ranking investors over a fixed time period (2 years, 3 years, etc.) the concept of a blended ranking algorithm was introduced that takes into account ranking over multiple time scales (for example, 40% of the rank comes from a 2 year Sharpe/Information Ratio, 30% comes from a 1 year Sharpe/Information Ratio, 20% from a 6 month Sharpe/Information Ratio and 10% from a 3 month Sharpe/Information Ratio. It was found that most such blended ranking algorithms were inferior to ranking algorithms based on a single time scale—however it should be noted that the shortest time period used in the static ranking algorithms is 2 years, while the shortest time period used for the blended ranking algorithm is 3 months.

These simulations showed that the Information Ratio based strategies outperform Sharpe Ratio-only strategies in approximately 70% of the cases. Furthermore, in cases when the IR strategy underperforms, the average underperformance is −2.64% (range−0.39% to −7.7%) while the average outperformance is 7.46% (range 0.22% to 28.17%).

Additionally, the ranking component or algorithm of an embodiment based on or considering IR follows the desired/intuitive trend where the top 1% population out performs the top 5% population which outperforms the top 10% population, and so on. While this trend was robust up to 2007 even when using a SR strategy, it was reversed in 2008 with the SR strategy, where the top 1% investors underperformed the top 10% by ~3%. The results for this case are summarized in the table shown in FIG. 6. The Ranking algorithm used looks at Sharpe/Information ratio based on 2 years of performance and follows the top x % investors for a period of 4 months.

FIG. 7 is a flow diagram for ranking an investor 700, under an embodiment. The investor is one buying an investment position in the description that follows. The investor ranking of an embodiment comprises generating a skill score 702 for each investor of a plurality of investors. The skill score of an embodiment represents an Information Ratio (IR) of the investor, as described below with reference to FIG. 8. The skill score of an alternative embodiment represents a combination of an IR and a Sharpe Ratio (SR) of the investor, as described below with reference to FIG. 9.

The investor ranking of an embodiment further comprises generating a persistence score 704 for each investor of the plurality of investors. The persistence score represents skill of the investor relative to a benchmark. The investor ranking of an embodiment comprises generating a confidence score 706 for each investor of the plurality of investors. The confidence score represents an investment win percentage relative to an investment loss percentage. The investor ranking of an embodiment comprises generating a rank score for each investor of the plurality of investors by combining the skill score, the persistence score and the confidence score. The rank score categorizes the investor relative to other investors based upon historical investment data and real-time brokerage account data.

The objective of the skill score is to come up with a numeric score between 0 and 100 for each investor. The skill score of an embodiment takes into account the IR and investing tenure of each investor. Generally, skill score generating includes generating a base score and then adjusting the base score by a tenure adjustment or factor based on the investing tenure of each investor. Generally, base score generation or calculation includes the following operations, but the embodiment is not so limited: calculate the IR for each investor over the last 2 years; take the minimum IR and subtract this from all IRs (results in a lower limit of 0); take the maximum IR and divide all IRs by the max IR (results in an upper limit of 1); generate a base score by multiplying each investor's IR by 100 (results in an IR range between 0 and 100). The skill score is generated by adjusting the base score for investing tenure. In applying a tenure adjustment, if the investor has more than 2 years of investing tenure, a tenure adjustment factor of 1.0 is used. If the investor has 2 years or less of investing tenure, a tenure adjustment factor used is (0.2+0.7×Tenure/1.75); this adjustment keeps the entire base score for everyone that has a tenure of 2 years or more, but scales down the score for investors that have less than 2 years of tenure, and, for investors with less than 3 months of investing tenure, the algorithm retains 30% of their base score.

Figure 8:
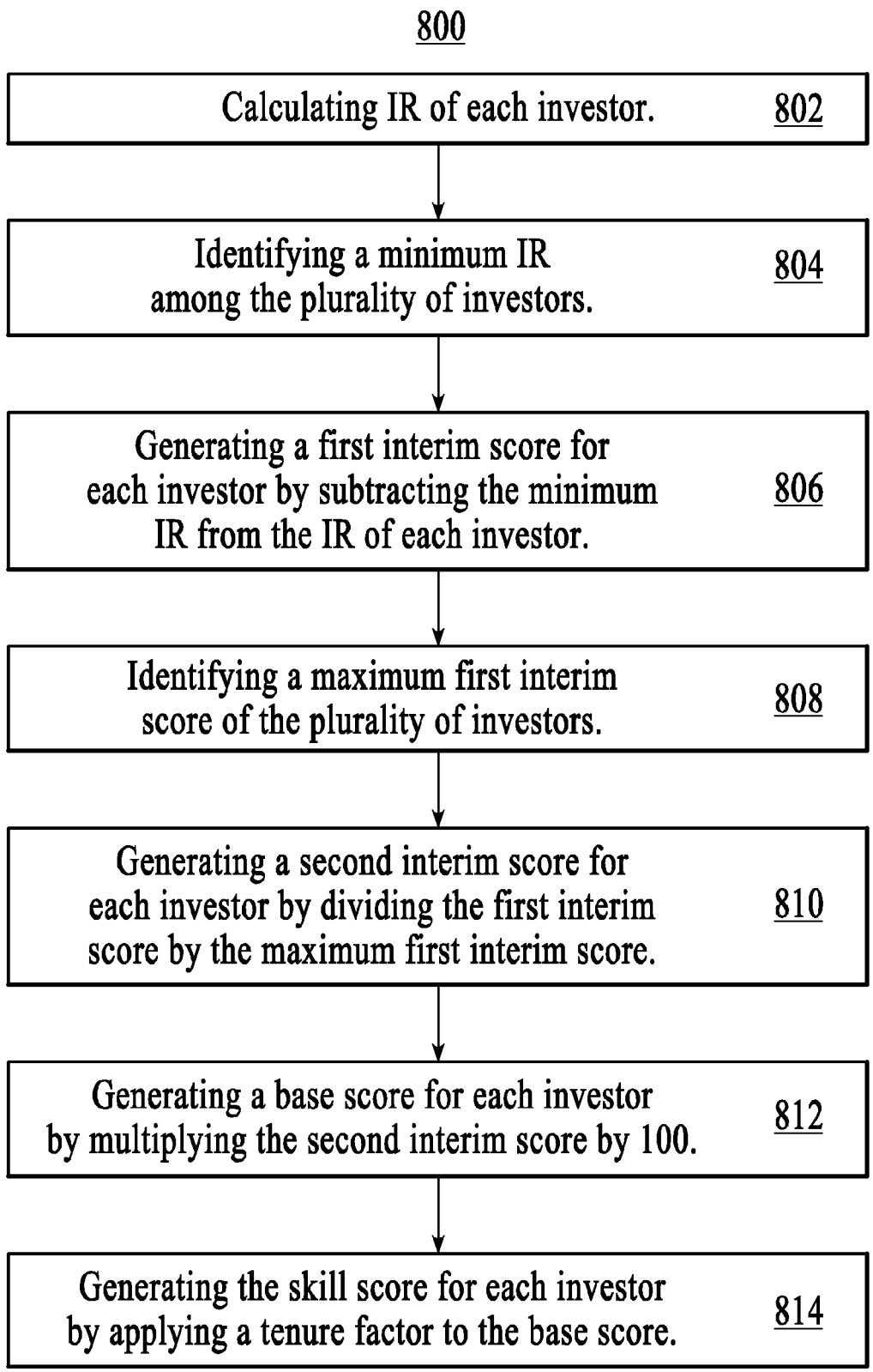
FIG. 8 is a flow diagram for generating a skill score using the Information Ratio (IR), under an embodiment.

FIG. 8 is a flow diagram for generating a skill score 800 using the Information Ratio (IR), under an embodiment. The skill score represents an investing tenure of an investor. Generating the skill score of an embodiment comprises calculating the IR 802 of each investor. The IR represents active return on a corresponding investment position adjusted for risk. Generating the skill score of an embodiment comprises identifying a minimum IR 804 among the plurality of investors. Generating the skill score of an embodiment comprises generating a first interim score 806 for each investor by subtracting the minimum IR from the IR of each investor. Generating the skill score of an embodiment comprises identifying a maximum first interim score 808 of the plurality of investors. Generating the skill score of an embodiment comprises generating a second interim score 810 for each investor by dividing the first interim score by the maximum first interim score. Generating the skill score of an embodiment comprises generating a base score 812 for each investor by multiplying the second interim score by 100. Generating the skill score of an embodiment comprises generating the skill score 814 for each investor by applying a tenure factor to the base score.

Figure 9:
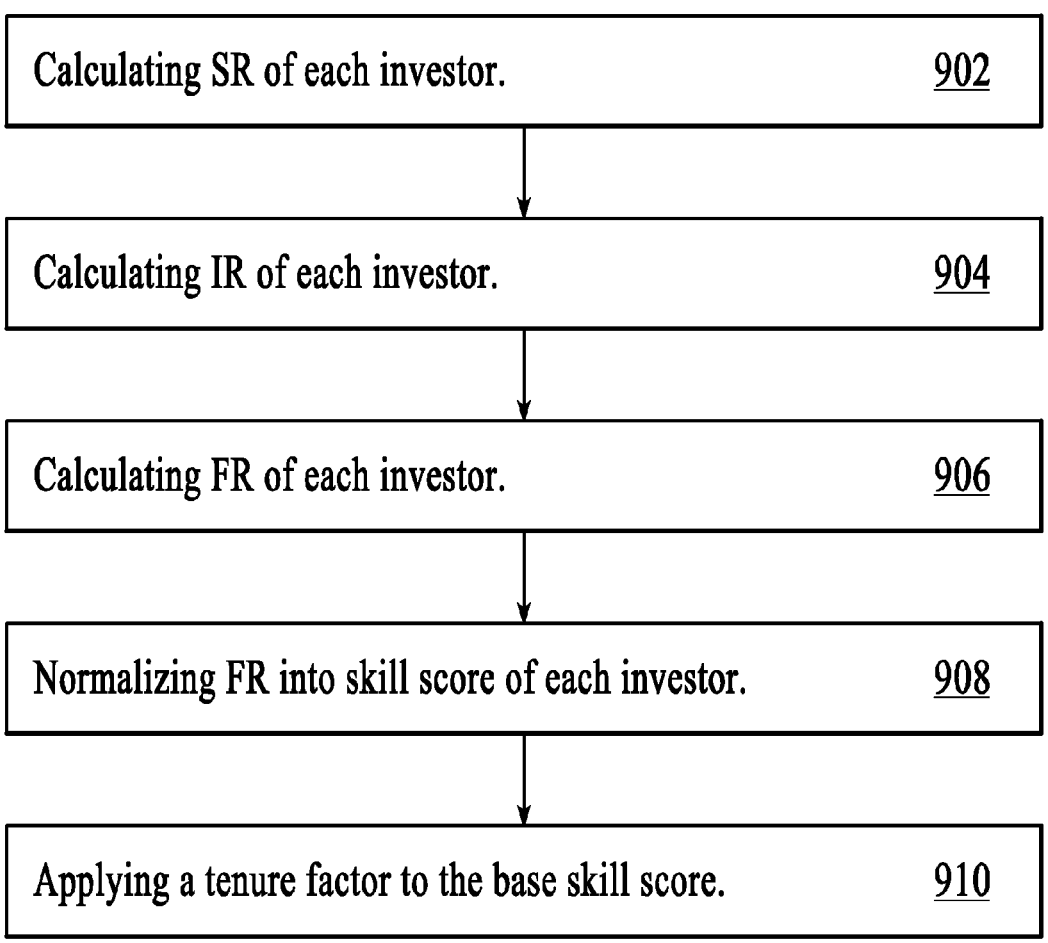
FIG. 9 is a flow diagram for generating a skill score using the Sharpe Ratio (SR) and Information Ratio (IR), under an alternative embodiment.

The skill score of an alternative embodiment represents a combination of the IR and SR of the investor. FIG. 9 is a flow diagram for generating the skill score 900 using the Sharpe Ratio (SR) and Information Ratio (IR), under an alternative embodiment. To calculate the skill score of this alternative embodiment, the ranking component calculates the SR and IR for each individual. The ranking component calculates the SR 902 by calculating the monthly excess return for each investor (the monthly excess return for an investor is defined as the monthly return for the investor minus the risk free return) for each month for the past N years. The IDSS of an embodiment uses two (2) years for the calculation of SR, but it could be for any time period. The SR is computed by dividing the average of the monthly returns by the standard deviation of the monthly returns.

Let the monthly returns for an investor be denoted by $\{r_1, r_2, r_3, \ldots r_{24}\}$ and the risk-free returns be denoted by $\{r^f_1, r^f_2, r^f_3, \ldots r^f_{24}\}$, where the subscripts denote each monthly period for which the return is calculated. The excess monthly return $\{r^{xs}_i\}$ for month i is then given by, $$r^{xs}_i = r_i - r^f_i$$

The average of the excess monthly returns is then calculated as $$\bar{r}_{xs} = \frac{\sum_{i=1}^{N} r^{xs}_i}{N},$$

and the standard deviation is calculated as $$\sigma = \sqrt{\frac{\sum_{i=1}^{N} (r^{xs}_i - \bar{r}_{xs})^2}{N}}.$$

Finally, the Sharpe Ratio is obtained by $$S.R = \frac{\bar{r}_{xs}}{\sigma}.$$

The ranking component calculates the IR 904 by calculating the monthly excess active return for each investor for each month for the past N years. The monthly excess active return for an investor is defined as the monthly return for the investor minus a benchmark return; the benchmark can be any index, or security, for example, the Standard and Poor's (S&P) 500 (S&P 500), Dow Jones Industrial Average (DJIA), and National Association of Securities Dealers Automated Operations (NASDAQ), to name a few. The IDSS of an embodiment currently uses two (2) years for the calculation of IR, but it could be for any time period. The IR is computed by dividing the average of the weighted monthly active returns by the standard deviation of the monthly returns.

Let the monthly returns for an investor be denoted by $\{r_1, r_2, r_3, \ldots r_{24}\}$ and the benchmark returns be denoted by $\{r^b_1, r^b_2, r^b_3, \ldots r^b_{24}\}$, where the subscripts denote each monthly period for which the return is calculated. The excess active monthly return $\{r^{xs}_{a\,i}\}$ for month i is then given by, $$r^{xs}_{a\,i} = r_i - r^b_i$$

Once the excess active monthly returns are calculated, they are weighted using a weighting function (which may be a constant, a linear function, an exponential function but not limited to these). The IDSS uses an exponential weighting scheme to weight the returns as $$r_{weighted_i}^{xs} = r_{a_i}^{xs} \times \exp(-t),$$

where t=0 for the most recent month and decreases linearly by 1 each prior month, and $$\bar{r}_{weighted}^{xs} = \frac{\sum_{i=1}^{N} r_{weighted_i}^{xs}}{N}.$$

The average of the un-weighted excess monthly returns is then calculated as $$\bar{r}_a^{xs} = \frac{\sum_{i=1}^{N} r_a^{xs_i}}{N},$$

and the standard deviation is calculated as $$\sigma = \sqrt{\frac{\sum_{i=1}^{N} (r_a^{xs_i} - \bar{r}_a^{xs})^2}{N}}.$$

Finally, the IR is obtained by $$I \cdot R = \frac{\bar{r}_{weighted}^{xs}}{\sigma}.$$

The ranking component calculates a Final Ratio (FR) 906 as a weighted average of the IR and the SR as, $$FR = a \times SR + (1-a) \times IR.$$

Generating the skill score of the alternative embodiment continues by normalizing 908 the FR into the skill score as follows. Generating the skill score of an embodiment comprises identifying a minimum FR among the plurality of investors. Generating the skill score of an embodiment comprises generating a first interim score for each investor by subtracting the minimum FR from the FR of each investor, and this produces a lower limit of zero (0). Generating the skill score of an embodiment comprises identifying a maximum FR of the plurality of investors. Generating the skill score of an embodiment comprises generating a second interim score for each investor by dividing the first interim score by the maximum FR, and this produces an upper limit of one (1). Generating the skill score of an embodiment comprises generating the skill score 812 for each investor by multiplying the second interim score by 100, and this operation produces an FR range between 0 and 100.

Generating the skill score of an embodiment comprises generating the skill score for each investor by applying a tenure factor 910 to the base skill score. If an investor has more than two (2) years if investing tenure, the tenure adjustment factor is 1.0, otherwise, tenure adjustment is a decay function (e.g., linear decay, exponential decay, etc.). The tenure adjustment keeps the entire base score for everyone having tenure of 2 years or more, but scales down the score for investors that have less than 2 years tenure. If an investor has less than 3 months of investing tenure, the skill score is multiplied by a tenure factor of 0.3.

Regardless of method used to generate the skill score, the ranking component of an embodiment uses a persistence score to find and filter investors that have high IR purely by luck. In a world of random investors, it is assumed that the probability of winning is the same as the probability of losing. In the absence of any information other than what is known to everyone else, the unskilled, common investor is as likely to outperform as he or she is to underperform. Here a 'win' is defined as outperforming a benchmark, not just making money. The properties of the binomial distribution are then used to calculate a measure of skill. This is very similar to a coin toss experiment, where the probability of getting a head (win) in a coin toss is 0.5. Thus, in a series of coin toss experiments the number of heads and tails should converge. This is similar to the situation where there is no investing skill. If, however the number of heads is significantly different from the number if tails, it is determined that the coin is biased.

The probability of winning n times out of N trials is given by $$Pr_n^N = \frac{N!}{n!(N-n)!} \cdot p^n \cdot (1-p)^{N-n},$$

where p is the winning probability (in this case 0.5). Other properties of the binomial distribution used herein are the mean as $$\bar{x} = np,$$

the variance as $$\sigma^2 = Np \cdot (1-p),$$

and the standard deviation as $$S.D. = \sigma = \sqrt{\sigma^2} = \sqrt{Np \cdot (1-p)}.$$

A distance is then calculated from the mean for each user and used to rank the users as described in the example cases below.

In a first example case, a user makes 9 winning bets out of 10. The distance is calculated in this example as follows: calculate the Wining score—this is simply the number of wins, and in this case, Winning score is 9; calculate the mean for the case with 10 trials as the number of trials (N) times the probability of success (p) (e.g., Mean=10×0.5=5); calculate the SD (Sigma) for binomial distribution with N=10 as $$\sigma = \sqrt{10 \times 0.5 \times (1-0.5)} = \sqrt{2.5} = 1.58;$$

calculate a distance from the mean as

Delta=(Winning Score−Mean)/Sigma (e.g., Delta=(9−5)/1.58=2.53). The distance is a measure of hw far the winning score is from the mean, counted in terms of Sigma. In a normal distribution, 66% of all values lie within 1 sigma of the mean, ~95% within 2 sigma and about 99% values lie within 3 sigma of the mean. The larger the distance the greater the likelihood the result is skill and not luck.

In a second example case, a user makes 90 winning bets out of 100. The distance is calculated in this example as follows: calculate the Wining score—this is simply the number of wins, and in this case, Winning score is 90; calculate the mean for the case with 100 trials as the number of trials (N) times the probability of success (p) (e.g., Mean=100×0.5=50); calculate the SD (Sigma) for binomial distribution with N=100 as 5; calculate a distance from the mean as Delta=(Winning Score−Mean)/Sigma (e.g., Delta=(90−50)/5=8.0).

In a third example case, a user makes 75 winning bets out of 100. The distance is calculated in this example as follows: calculate the Wining score—this is simply the number of wins, and in this case, Winning score is 75; calculate the mean for the case with 100 trials as the number of trials (N) times the probability of success (p) (e.g., Mean=100×0.5=50); calculate the SD (Sigma) for binomial distribution with N=100 as 5; calculate a distance from the mean as Delta=(Winning Score−Mean)/Sigma (e.g., Delta=(75−50)/5=5.0). These examples show that a person who makes 75 winning bets out of 100 is more skillful than one who makes 9 winning bets out of 10 even though the latter wins 90% of the time, while the former wins 75% of the time; however, the latter has fewer bets to show persistence.

Following calculation of delta's for all investors, the deltas are normalized. The normalization of an embodiment is performed as follows. The delta scores are exponentiated as Delta Score=$e^{Delta}$.

Once a delta score has been calculated for all investors, the smallest delta score is selected or identified and subtracted from the delta scores of each investor. The largest delta score is selected or identified, and the delta score of each investor is divided by the largest delta score. All delta scores are multiplied by 100 to generate the persistence score, where the persistence score is in the range of 0 to 100.

Figure 10:
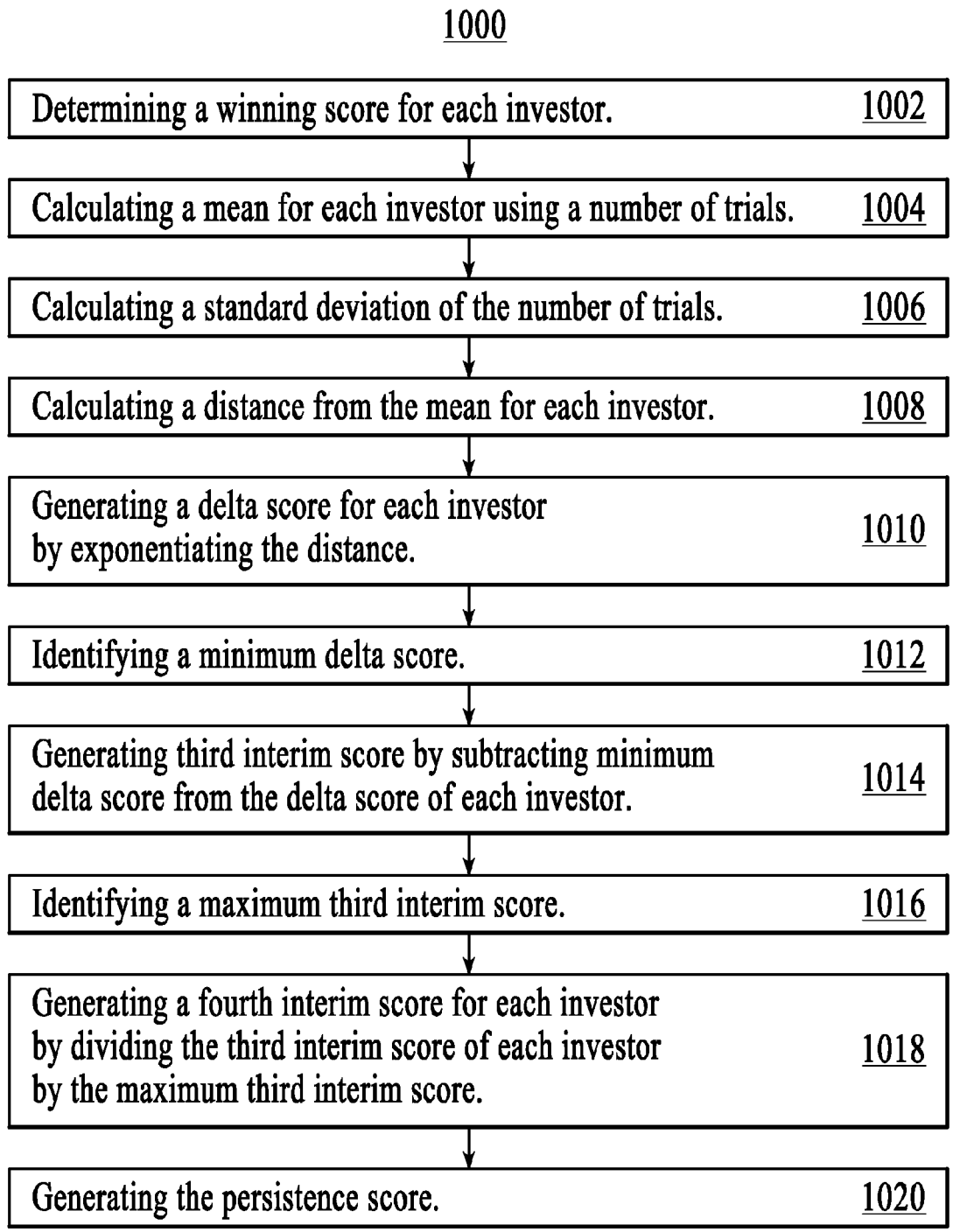
FIG. 10 is a flow diagram for generating a persistence score, under an embodiment.

FIG. 10 is a flow diagram for generating a persistence score 1000, under an embodiment. Generating the persistence score of an embodiment comprises determining a winning score 1002 for each investor as a number of times the investor outperformed a benchmark. Generating the persistence score of an embodiment comprises calculating a mean 1004 for each investor using a number of trials. The number of trials is a sum of a number of times the investor outperformed the benchmark and a number of times the investor failed to outperform the benchmark. Generating the persistence score of an embodiment comprises calculating a standard deviation 1006 of the number of trials for each investor. Generating the persistence score of an embodiment comprises calculating a distance from the mean 1008 for each investor as a first quantity divided by the standard deviation. The first quantity is determined by subtracting the mean from the winning score. Generating the persistence score of an embodiment comprises generating a delta score 1010 for each investor by exponentiating the distance.

Generating the persistence score of an embodiment comprises identifying a minimum delta score 1012 among the delta scores of the plurality of investors. Generating the persistence score of an embodiment comprises generating a third interim score 1014 for each investor by subtracting the minimum delta score from the delta score of each investor. Generating the persistence score of an embodiment comprises identifying a maximum third interim score 1016 of the plurality of investors. Generating the persistence score of an embodiment comprises generating a fourth interim score 1018 for each investor by dividing the third interim score of each investor by the maximum third interim score. Generating the persistence score of an embodiment comprises generating the persistence score 1020 for each investor by multiplying the fourth interim score by 100.

The ranking methodology continues by selecting or determining which investors are not only skillful and persistent in their skill, but also confident. A confidence score measures how big an investor wins when they make a winning bet versus how small they lose when they make a losing bet. The score itself is defined as the ratio of portfolio weighted average win percentage vs. the portfolio weighted average loss percentage as $$\text{Confidence Score} = \frac{\overline{W}}{\overline{L}},$$

where $\overline{W}$ is the portfolio weighted average win percentage and $\overline{L}$ is the portfolio weighted average loss percentage.

The portfolio weighted average win percentage $\overline{W}$ and the portfolio weighted average loss percentage $\overline{L}$ are calculated as, respectively, $$\overline{W} = \frac{\sum_i \lambda_i \cdot g_i}{N_{Gains}},$$

$$\overline{L} = \frac{\sum_i \lambda_i \cdot l_i}{N_{Losses}}.$$

Here $\lambda$ is the weight (percentage) of the position in question in the entire portfolio, g is the percentage gain for the position in question, l is the percentage loss for the position in question, and $N_{Gains}$ and $N_{Losses}$ are the number of winning and losing bets respectively.

Ideally, the objective is to identify investors that have either a high or low confidence score. These would be investors who either win big with large percentages of their portfolio and lose small with small percentages of their portfolios (i.e., if someone made 200% on a position that was 1% of the portfolio, then that should count as 2% (1% of 200%) gain not 200% gain, and vice versa).

Generally, confidence score is generated by calculating, for each trade made in the ranking period, a gain/loss. In this case the gain/loss also needs to take into account the portfolio percentage the position in question made up in the portfolio at the beginning, so the portfolio needs to be valued at the time of Buy transactions. Once the wins and losses are calculated this way, the average win and average loss is calculated, and a ratio of wins to losses is determined. An upper limit is created for the weighted win ratio so that people with zero losses do not get an infinite win ratio. These scores are normalized in the same way as described above for the skill and persistence scores to provide a confidence score in the range of 0 to 100.

FIG. 11 is a flow diagram for generating a confidence score 1100, under an embodiment. Generating the confidence score of an embodiment comprises calculating a weighted average win percentage 1102 for a portfolio of each investor. Generating the confidence score of an embodiment comprises calculating a weighted average loss percentage 1104 for a portfolio of each investor. Generating the confidence score of an embodiment comprises generating the confidence score 1106 as a ratio of the weighted average win percentage to the weighted average loss percentage.

FIG. 12 is a flow diagram for generating a weighted average win percentage 1200, under an embodiment. Generating the weighted average win percentage of an embodiment comprises calculating a first quantity 1202 by multiplying a percentage of the investment position in the portfolio and a percentage gain for the investment position. The first quantity is calculated for each period of time of a plurality of periods of time for which the investment position outperformed a benchmark. Generating the weighted average win percentage of an embodiment comprises calculating a second quantity 1204 by summing each first quantity for all periods of time of the plurality of periods of time for which the investment position outperformed the benchmark. Generating the weighted average win percentage of an embodiment comprises calculating the weighted average win percentage 1206 by dividing the second quantity by a total number of investment positions that outperformed the benchmark.

FIG. 13 is a flow diagram for generating a weighted average loss percentage 1300, under an embodiment. Generating the weighted average loss percentage of an embodiment comprises calculating a third quantity 1302 by multiplying a percentage of the investment position in the portfolio and a percentage loss for the investment position. The third quantity is calculated for each period of time of a plurality of periods of time for which the investment position underperformed a benchmark. Generating the weighted average loss percentage of an embodiment comprises calculating a fourth quantity 1304 by summing each third quantity for all periods of time of the plurality of periods of time for which the investment position underperformed the benchmark. Generating the weighted average loss percentage of an embodiment comprises calculating the weighted average loss percentage 1306 by dividing the third quantity by a total number of investment positions that underperformed the benchmark.

Generating the weighted average gain percentage and the weighted average loss percentage also includes establishing a portfolio value for the portfolio at a time when the investment position is entered, and using the portfolio value to establish the percentage gain and the percentage loss. Therefore, the confidence score represents for each investor a magnitude of outperforming a benchmark when the investment position outperforms relative to a magnitude of failing to outperform the benchmark when the investment position underperforms.

The final rank score, as described above, identifies skilled investors (high Information Ratio) who win most of the time (high Persistence Score) and win big (high Confidence score). The final rank score is generated by taking a weighted average of the three component scores, which produces or results in a number between 0 and 100, as $$\text{Final Rank Score} = \alpha \times \text{Skill Score} + \beta \times \text{Persistence Score} + \gamma \times \text{Confidence Score},$$

where $\alpha + \beta + \gamma = 1$.

Generating the rank score of an embodiment thus comprises generating a weighted average of the skill score, the persistence score and the confidence score. Generating the rank score of an embodiment comprises forming a skill component by multiplying the skill score by a first weight. Generating the rank score of an embodiment comprises forming a persistence component by multiplying the persistence score by a second weight. Generating the rank score of an embodiment comprises forming a confidence component by multiplying the confidence score by a third weight. Generating the rank score of an embodiment comprises calculating the rank score by summing the skill component, the persistence component and the confidence component. A sum of the first weight, the second weight and the third weight equals one (1). The rank score is used to classify each investor by the rank score of the investor.

Following application of any adjustments to the base score, as appropriate to a member and the member's corresponding data, the resulting score is assigned to the member. The ranking component 104 uses the assigned score of members to "rank" 402 each member and compare each member against other members, individuals, and benchmarks. The ranking component 104 assesses the scores of the total member population and assigns each member to a group, where each group represents a percentile of the total member population. The ranking component 104 of an embodiment, for example, includes five groups into which a member is placed, the groups including elite members (top 1%), platinum members (top 2-10%), gold members (top 11-25%), silver members (top 26-50%), and bronze members (remaining). The ranking component 104 of alternative embodiments can include an alternative number of groups and/or alternative percentiles corresponding to the groups (e.g., decile groups, etc.).

The IDSS components use the member rankings 402 to "match" a member with other members who may share similar portfolio construction, holdings, risk level, investing strategies, and/or other demographics (e.g., age, zip code, education), and who may have significantly outperformed the member with lower incurred risk levels. By doing so, the IDSS greatly informs a particular member about the state of his/her investment approach and performance and potentially improves future returns for the member.

The IDSS also uses the ranking 402 to understand or provide information as to how different ranks of investors are making investment decisions. For example, the IDSS enables visibility into what the "top 10%" members are holding, investing in, watching, and/or transacting. Furthermore, the IDSS provides insight into the top aggregated holdings, watch list items, and buys and sells across each of the rank categories or groups. The IDSS enables tracking of certain securities over time to understand how a particular security (e.g., Apple Inc.) trends in "popularity" over time and identify when large blocks of individuals having a certain rank are trading. Therefore, while trading activity in the form of total volume of securities traded is publicly available information, the IDSS adds a component of information as to which investors (e.g., "good" or "bad" investors) are participating in the trading activity.

The member rankings 402 are also used as benchmarks by which each member can evaluate his/her performance against his/her appropriate benchmark using his/her portfolio components. For example, the rankings 402 serve to benchmark individual member performance against relevant market indices over the tenure of data, to benchmark individual return performance against other individuals, to benchmark individual return performance against an aggregate of individuals based upon ranked return performance and various demographic characteristics including, but not limited to, zip code, income level, investment strategies, education, professional affiliation, and social networks, to name a few.

The IDSS rankings 402 also provide "Instant Asset Allocation" benchmarks to peer rank groups. The IDSS allocates member positions into core asset categories and provides an asset allocation model. The IDSS therefore enables comparison of individual asset allocation with other peer rank groups. The IDSS also creates "best practices" asset allocation models based upon the top performance of individuals using holdings, risk exposure, beta, Sharpe and other relevant metrics. The IDSS of an embodiment uses or includes a proactive "Dynamic Asset Allocation" model by which users can set allocation parameters enabling the IDSS to automatically notify users when allocation parameters are violated.

The IDSS uses data of the investor rankings 402 to rate securities. The rating component 106 is configured to rate 602 publicly-traded equities, exchange-traded funds (ETFs), mutual funds, options, fixed income instruments, and/or other available investment vehicles based on the performance of the individuals that own, buy, and/or sell positions. For example, a member doing research on Apple Inc. can search the IDSS for information on the stock. The IDSS subscribes a rating 602 to the stock based on the number and quality of other members that currently own the stock, the number and quality of members that are shorting the stock, the number and quality of members that previously own the stock, and the relative performance of those members. Equities that have been recently purchased by aggregate top ranked members and/or equities that continue to be owned by top ranked members will receive relatively high ratings. Positions that have either been liquidated by top ranked performers and/or acquired primarily by lower ranked performers will receive relatively low ratings.

FIG. 14 is a block diagram of the rating component 106 of the IDSS configured to provide or output security ratings 1402 in response to or as a result of operations on rank data 402 and real-time trade data 112, under an embodiment. The real-time trade data 112 can be received from one or more real-time market services 312 to which the rating component is coupled, but is not so limited.

FIG. 15 is a flow diagram for rating equities 1500 using the rating component 106 operating on rank data 402 and real-time trade data 112, under an embodiment. Components of the IDSS are generally configured and function to receive 1502 rank data of the investors. The rank data includes rank groups derived from investment data and trade data of the investors. The IDSS uses all rank behavior and activity to generate ratings and, in so doing, sorts positions based on cumulative ownership, watch and transaction behavior and selects or designates 1504 a rank group having a pre-specified ranking (e.g., the highest ranking, lowest ranking, etc.). The selected group is used as a predictor group. A security rating is generated 1506 for each security using trade parameters of real-time trade data of investors of the predictor group.

Generally, the rating component 106 uses information of the member rankings 402 to generate security ratings 1402. Similar to the Schwab Equity Rating System and Morningstar's mutual fund star rating system, the IDSS provides a proprietary rating for publicly-available securities; however, in contrast to these conventional systems, the basis for the IDSS security ratings 1402 is the individual member rankings as described below. Additionally, other parameters (e.g., earnings per share (EPS), price-to-earnings (P/E) ratio, balance sheet strength, etc.) may be used along with the rank data to generate the security ratings. The security ratings 1402 function to associate with each stock either a buy or a sell recommendation together with "strength of signal" indications of strength of the recommendation.

The IDSS evaluates activity of certain ranks of members in the aggregate to rate publicly-traded equities in real-time. The ratings 1402 include the ratings A, B, C, D, and F, but alternative embodiments can use alternative scales or alternative gradations. The IDSS ratings component 106 is configured to sort or organize security positions based on the cumulative ownership, watch, and transaction behavior by rank. For example, movements in and out of positions by members of particular ranks 402 will be catalogued and analyzed (e.g., buys and sells by "Elite" and "Platinum" investors are likely more attractive buying opportunities for corresponding purchases by lower ranked investors). The rating component 106 is configured to also use publicly available financial data, such as fundamentals, valuation, earnings momentum, and risk, in the generation of ratings 1402. The rating 1402 of an embodiment is based on rank 402, with a principal focus on ownership and activity (e.g., buying, selling, retaining) of the members ranked at the top and bottom 10%, but is not so limited.

The rating component 106 evaluates strategies of the members to provide information on strategies that have worked previously and strategies likely to be successful in the future. For example, regression analysis can be applied to investment data to identify the core components that can lead to a predictive model of future out-performance for some period of time. The opposite is also true, whereby the rating component can determine investors and strategies that have been found to under-perform. An anti-fraud component provides fraud detection so that members are prevented from using the system to manipulate stocks, thereby affecting their performance and rating. The rating component 106 thus provides information of expected future performance of particular equities in the form of the security ratings 1402. Consequently, the IDSS provides data and predictive information or models that, on average, is relatively more accurate than individual analysts at brokerage firms, mutual fund managers, and professional investment advisors.

The ratings 1402 form the basis for comparisons across different positions. For example, the IDSS can track movements over time and compare how securities have trended over certain time horizons. The IDSS can compare individual members based on the "rating" 1402 of positions in their portfolios. Other positions can be provided or displayed to a member, which may provide more significant upside with reduced risk than the ones currently in the member's portfolio. The IDSS can also "see" across various industry sectors and investing strategies to develop hypotheses around areas of potential out-performance and under-performance.

The IDSS of an embodiment is configured to display the ratings 1402 to members via a portal (e.g., IDSS web site). A rating is displayed to correspond to each security or position in the member portfolios. The IDSS can also use filtering to display other securities that are related to a particular security but which have a higher "rating" than the particular security.

The security ratings are displayed using a "strength of signal" graphic or plot, for example. Because the rankings 402 generated by the IDSS assist members in better understanding the underlying positions that members of different ranks are holding, watching, and transacting, the IDSS uses the rankings 402 to generate information of and display via the strength of signal plot the "net buying" activity of particular positions through application of a calculation that aggregates all of the different rankings into one measure. The IDSS calculates this measure over time to determine an understanding of trends. This way, a member can compare various positions quickly to gauge whether he/she should sell or buy.

Figure 16:
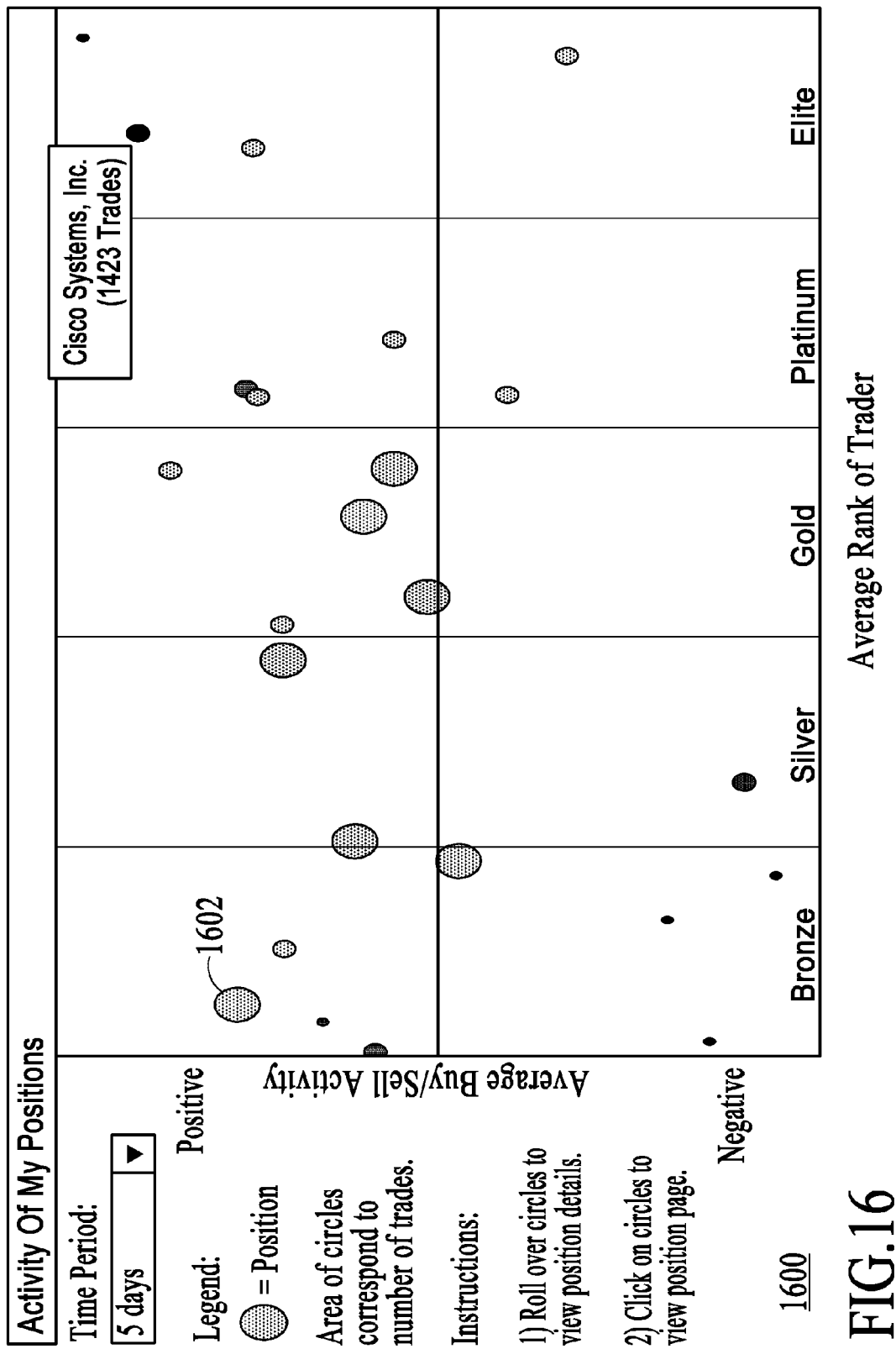
FIG. 16 is a strength of signal plot, under an embodiment.

FIG. 16 is a strength of signal plot 1600, under an embodiment. The IDSS calculates the strength of signal 1600 over time to determine an understanding of trends, and the strength of signal measure is visually illustrated 1602 in the strength of signal plot 1600. The absolute value of the strength of signal value 1602 indicates the strength of a security rating for the corresponding security, and the sign (position on y-axis relative to center-point) of the strength of signal value 1602 indicates if it is rated as a buy or a sell (e.g., a positive strength of signal value indicates a buy and a negative strength of signal value indicates a sell). This enables a member to compare various publicly-traded securities quickly to determine whether he/she should sell or buy.

In generating strength of signal, the organizing of rank categories is done by scoring each category. The scoring includes determining the number of trades per rank category (e.g., elite, bronze, etc.), and weighting the number of trades of each rank category by the relative performance of that rank category compared to other categories. Therefore, the scoring includes determining a ratio for each category by dividing the average return for that category by the average return for the bronze category, where the performance of the bronze category serves as a base category in this example.

The categories are arranged along the x-axis of the strength of signal plot 1600 according to their score (e.g., category with lowest score is placed in left-most position along the x-axis, category with highest score is placed in right-most position along the x-axis). Alternatively, securities can be placed on the strength of signal plot 1600 without any express correlation to rank categories. Therefore, the IDSS generates the strength of signal plot 1600 by identifying the category of members that provide the best performance (e.g., members with an Elite rank, members with a Platinum rank, etc.) and organizing the categories along the x-axis of a plot according to the relative performance. The x-axis of the plot of an embodiment thus provides an indication of which members are buying or selling a security.

The IDSS determines a number of buys and sells done for each security, and calculates the net transactions for each security by subtracting the number of sells from the number of buys for a period of time. The strength of signal measure 1602 is determined by dividing the net transactions by the total number of buys and sells of the security. The y-axis of the strength of signal plot 1600 therefore represents this average buy/sell activity ("net buy" or "net sell"), or strength of signal.

The strength of signal plot 1600 of an embodiment provides information about which members have been buying a particular security over a certain time period. Using the strength of signal plot 1600 as an example, a security located in the "top right" corner of the plot 1600 means that top-ranked investors (e.g., Elite members in this example) have been buying this stock during the period, which might make this stock an attractive "buy" candidate for other members. Furthermore, an embodiment presents or displays the momentum of the strength of signal for a security over some period of time. The momentum includes information as to the difference in the size and placement of the circle over time but is not so limited.

The volume of trading for each security is represented by the size or area of the circle representing the security 1602 on the plot 1600. Consequently, the strength of signal plot 1600 of an embodiment also provides information of the volume of trading for each security.

Strength of signal can also be used, for example, to determine a stock rating score. The stock rating score of an embodiment, also referred to herein as "CakeTake" or a sentiment score, answers a simple question, "what is the collective 'take' of ranked members on a particular stock or security in terms of their recent buying and selling activity?" In other words, the stock rating score is a signal that distills the collective mood or sentiment of ranked members around a particular stock or security where they have been active that considers the historical performance and rankings of those members. The stock rating score is not a recommendation to buy or sell a particular stock or security nor is it a stock rating. The stock rating score does offer, however, a quick directional read on what ranked members have been buying or selling. In this sense, the stock rating score goes beyond what people may be saying or thinking, and looks at what they have been actually doing in their own portfolios.

Calculation or generation of the stock rating score generally begins by establishing a count of all current members who bought or sold a particular stock or security during the time period in question (e.g., prior week, month, quarter, year, etc.). It is to be understood that this count is a count of "the noses" of members, not the dollar amounts, how many shares each member bought or sold, or what they may continue to hold.

Further, consideration is given to other factors including, but not limited to, the specific ranking of each member who bought or sold during the time period. To get of better sense of the directional mood of the members, greater weight is placed on the actions of more highly-ranked members and less weight is placed on lower-ranked members. Additionally, greater weight is placed on more recent buying and selling activity because more recent activity likely says more about the mood or sentiment of members than activity that occurred some time ago.

For each position where sufficient data is available to calculate a stock rating score, all of the information described above is then rolled up into the collective 'take' of ranked members for each time period and an overall composite 'take' considering all time periods is also displayed. The purpose of the stock rating score is to gain better insights into whether ranked members have been buying or selling particular stocks or securities over each of the time periods and which way they are headed. A stock rating score is not calculated for securities that have not had sufficient trading activity. The stock rating score and member rankings are calculated and updated periodically (e.g., hourly, daily, etc.).

More specifically, the stock rating score generated under an embodiment of the IDSS is a numerical score for each stock for which it is calculated based on the activity in the IDSS. Thus, the "Cake Take" is a rating system for any publicly traded security-stocks, mutual funds and ETFs-based on the historical performance, real-time trading activity, and holding decisions of a group of individual investors. The stock rating score uses calculated ranges from 0 to 100, but is not so limited.

The IDSS of an embodiment includes any number of modules that generate and/or include aggregated data derived from the investment data, transactional information, and brokerage account information. As an example, the IDSS of an embodiment, as described below with reference to FIG. 23, includes one or more modules that include a Cake Take rating module. The Cake Take module generates and/or includes the Cake Take, as described herein.

When applied to an investment position including equities or stocks, the rating system generates a numerical score for each equity held in a data set. The numerical score comprises the average of the rank score of the group of individuals holding the stock in question.

FIG. 17 is a flow diagram for rating a plurality of investment positions 1700, under an embodiment. The rating of an investment position of an embodiment comprises identifying a set of investors 1702 corresponding to each investment position of the plurality of investment positions. A plurality of sets of investors corresponds to the plurality of investment positions, and each investor of the set of investors owns the investment position.

The rating of an investment position of an embodiment comprises, for each set of investors, generating a rank score for each investor 1704. The rank score categorizes each investor relative to other investors of the set of investors for a time period of time of the plurality of time periods. The rating of an investment position of an embodiment comprises, for each set of investors, generating an average rank score 1706 for the period of time. Generating the average rank score comprises generating an average rank score for the time period by averaging the rank scores of all investors of the set of investors.

The rating of an investment position of an embodiment comprises, for each set of investors, generating a trailing rank score 1708 by averaging the rank scores across the plurality of periods of time. Generating the trailing rank score comprises averaging the rank scores for all time periods of the plurality of time periods.

The rating of an investment position of an embodiment comprises generating a stock rating score 1710 for each investment position by combining the average rank score and the trailing rank score of the set of investors corresponding to the investment position. Generating the stock rating score comprises generating a weighted average of the average rank score and the trailing rank score. Generating the stock rating score comprises forming an average rank component by multiplying the average rank score by a first weight. Generating the stock rating score comprises forming a trailing rank component by multiplying the trailing rank score by a second weight. Generating the stock rating score comprises calculating the stock rating score by summing the average rank component and the trailing rank component. A sum of the first weight and the second weight equals one (1). The rating of an investment position of an embodiment comprises normalizing the stock rating scores for the plurality of investment positions.

The rating of an investment position of an embodiment comprises rating each of the plurality of investment positions according to the stock rating scores of each investment position. Rating the plurality of investment positions comprises organizing the plurality of investment positions according to the corresponding stock rating scores. The organizing comprises a descending stock rating score, but the embodiment is not so limited. Rating the plurality of investment positions generally comprises forming a rating hierarchy comprising a plurality of categories organized according to the stock rating score. The rating hierarchy of an embodiment comprises a 15-point scale, but is not so limited.

As an example of the rating of an embodiment, consider a stock ABC held by five investors (investors 1-5) with the rank scores shown in the table of FIG. 18. The average rank score assigned to stock in this example is 41.96 (the average of the five Rank scores). Also calculated is the trailing rank score for each stock over a specified period (e.g., last 30 days). The stock rating score is calculated as a weighted average of the current score and the 30 day trailing average score, as $$\text{Stock Rating Score} = \alpha \times \text{Current Score} + \beta \times 30 \text{ Day Trailing Score}$$

where $\alpha + \beta = 1$ $$\text{and, 30 Day Trailing Score} = \frac{\sum_{i=1}^{30} S_i}{30},$$

where $S_i$ is the score for the Stock in question on day i.

Once scores are calculated for each stock, the set of scores is normalized resulting in each stock getting a score on a 0 to 100 scale. The stocks are then rated on a 15-point scale (e.g., A+ through F-), as shown in the table in FIG. 19, and organized according to categories.

The plurality of categories of an embodiment comprise a first category comprising a first 2.5 percent of investment positions according to the stock rating score, wherein the first category has a rating score of 15. The plurality of categories of an embodiment comprise a second category following the first category, the second category comprising a first subsequent three (3) percent of investment positions according to the stock rating score, wherein the second category has a rating score of 14. The plurality of categories of an embodiment comprise a third category following the second category, the third category comprising a second subsequent 4.5 percent of investment positions according to the stock rating score, wherein the third category has a rating score of 13. The plurality of categories of an embodiment comprise a fourth category following the third category, the fourth category comprising a third subsequent six (6) percent of investment positions according to the stock rating score, wherein the fourth category has a rating score of 12. The plurality of categories of an embodiment comprise a fifth category following the fourth category, the fifth category comprising a fourth subsequent seven (7) percent of investment positions according to the stock rating score, wherein the fifth category has a rating score of 11.

The plurality of categories of an embodiment comprise a sixth category following the fifth category, the sixth category comprising a fifth subsequent eight (8) percent of investment positions according to the stock rating score, wherein the sixth category has a rating score of 10. The plurality of categories of an embodiment comprise a seventh category following the sixth category, the seventh category comprising a sixth subsequent nine (9) percent of investment positions according to the stock rating score, wherein the seventh category has a rating score of 9. The plurality of categories of an embodiment comprise an eighth category following the seventh category, the eighth category comprising a seventh subsequent 20 percent of investment positions according to the stock rating score, wherein the eighth category has a rating score of 8. The plurality of categories of an embodiment comprise a ninth category following the eighth category, the ninth category comprising an eighth subsequent nine (9) percent of investment positions according to the stock rating score, wherein the ninth category has a rating score of 7. The plurality of categories of an embodiment comprise a tenth category following the ninth category, the tenth category comprising a ninth subsequent eight (8) percent of investment positions according to the stock rating score, wherein the tenth category has a rating score of 6.

The plurality of categories of an embodiment comprise an eleventh category following the tenth category, the eleventh category comprising a tenth subsequent seven (7) percent of investment positions according to the stock rating score, wherein the eleventh category has a rating score of 5. The plurality of categories of an embodiment comprise a twelfth category following the eleventh category, the twelfth category comprising an eleventh subsequent six (6) percent of investment positions according to the stock rating score, wherein the twelfth category has a rating score of 4. The plurality of categories of an embodiment comprise a thirteenth category following the twelfth category, the thirteenth category comprising a twelfth subsequent 4.5 percent of investment positions according to the stock rating score, wherein the thirteenth category has a rating score of 3. The plurality of categories of an embodiment comprise a fourteenth category following the thirteenth category, the fourteenth category comprising a thirteenth subsequent three (3) percent of investment positions according to the stock rating score, wherein the fourteenth category has a rating score of 2. The plurality of categories of an embodiment comprise a fifteenth category following the fourteenth category, the fifteenth category comprising a fourteenth subsequent 2.5 percent of investment positions according to the stock rating score, wherein the fifteenth category has a rating score of 1.

In order to calculate ratings for mutual funds and ETFs, the IDSS of an embodiment applies the ranking algorithm of the ranking component to the mutual funds and ETFs. In so doing, an embodiment uses returns adjusted for expenses when calculating the Information Ratio of the mutual fund or exchange-traded fund (ETF). Furthermore, the variable α in the rank score formula is set equal to 1.0. Moreover, an embodiment considers additional factors such as the fund manager's historical performance, number of years investing, underlying holdings, turnover, and fund inflows and outflows, for example.

The mutual fund/ETF ranking of an embodiment comprises generating a skill score for each mutual fund/ETF of a plurality of mutual funds/ETFs, as described above with reference to an individual investor. The skill score represents an Information Ratio (IR) of the mutual fund/ETF. The mutual fund/ETF ranking of an embodiment comprises using the skill score as the rank score and the rating of the mutual fund/ETF.

The objective of the skill score, or rank score, is to generate a numeric score between 0 and 100 for each mutual fund/ETF. The skill score takes into account the IR and investing tenure of each mutual fund/ETF. Generally, skill score generating includes generating a base score and then adjusting the base score by a tenure adjustment or factor based on the investing tenure of each mutual fund/ETF. Generally, base score generation or calculation includes the following operations, but the embodiment is not so limited: calculate the IR for each mutual fund/ETF over the last 2 years; take the minimum IR and subtract this from all IRs (results in a lower limit of 0); take the maximum IR and divide all IRs by the maximum IR (results in an upper limit of 1); generate a base score by multiplying each mutual fund/ETF IR by 100 (results in an IR range between 0 and 100). The skill score is generated by adjusting the base score for investing tenure. In applying a tenure adjustment, if the mutual fund/ETF has more than 2 years of investing tenure, a tenure adjustment factor of 1.0 is used. If the mutual fund/ETF has 2 years or less of investing tenure, a tenure adjustment factor used is (0.2+0.7×Tenure/1.75); this adjustment keeps the entire base score for every mutual fund/ETF that has a tenure of 2 years or more, but scales down the score for mutual funds/ETFs that have less than 2 years of tenure, and, for mutual funds/ETFs with less than 3 months of investing tenure, the algorithm retains 30% of their base score.

Figure 20:
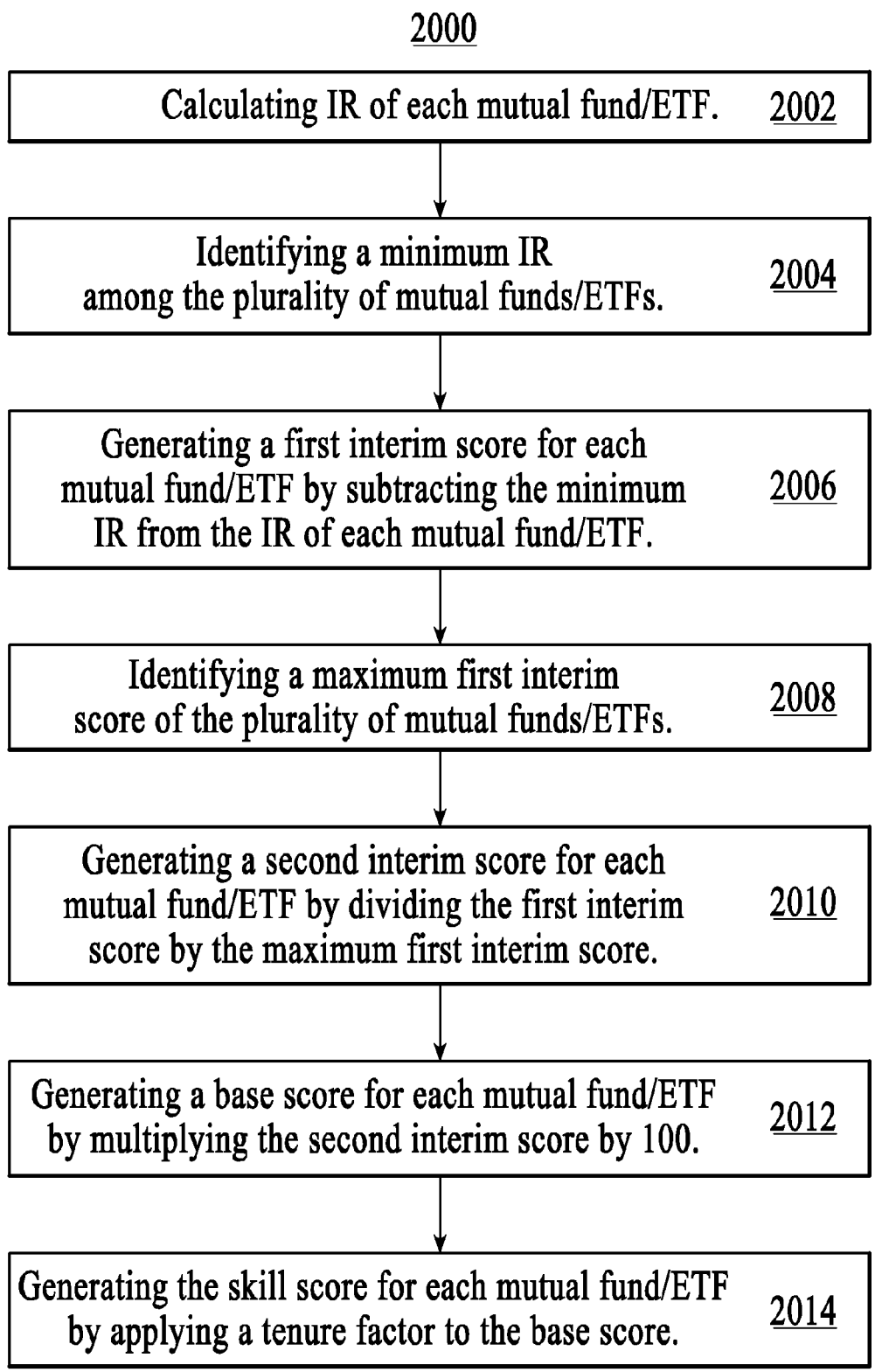
FIG. 20 is a flow diagram for generating a skill score, and hence a mutual fund/exchange-traded fund (ETF) rank score, under an embodiment.

FIG. 20 is a flow diagram for generating a skill score 2000, and hence a mutual fund/ETF rank score, under an embodiment. The skill score represents an investing tenure of mutual fund/ETF. Generating the skill score of an embodiment comprises calculating the IR 2002 of each mutual fund/ETF. The IR represents active return on a corresponding investment position adjusted for risk. Generating the skill score of an embodiment comprises identifying a minimum IR 2004 among the plurality of mutual funds/ETFs. Generating the skill score of an embodiment comprises generating a first interim score 2006 for each mutual fund/ETF by subtracting the minimum IR from the IR of each mutual fund/ETF. Generating the skill score of an embodiment comprises identifying a maximum first interim score 2008 of the plurality of mutual funds/ETFs. Generating the skill score of an embodiment comprises generating a second interim score 2010 for each mutual fund/ETF by dividing the first interim score by the maximum first interim score. Generating the skill score of an embodiment comprises generating a base score 2012 for each mutual fund/ETF by multiplying the second interim score by 100. Generating the skill score of an embodiment comprises generating the skill score 2014 for each mutual fund/ETF by applying a tenure factor to the base score.

Once skill scores are calculated for each mutual fund/ETF, the mutual funds/eTFs are then rated on a 15-point scale (e.g., A+ through F−), as shown in the table in FIG. 21, and organized according to categories.

The plurality of categories of an embodiment comprises a first category comprising a first 1.5 percent of investment positions according to the rating score, wherein the first category has a rating score of 15. The plurality of categories of an embodiment comprise a second category following the first category, the second category comprising a first subsequent two (2) percent of investment positions according to the rating score, wherein the second category has a rating score of 14. The plurality of categories of an embodiment comprise a third category following the second category, the third category comprising a second subsequent two (2) percent of investment positions according to the rating score, wherein the third category has a rating score of 13. The plurality of categories of an embodiment comprise a fourth category following the third category, the fourth category comprising a third subsequent 3.5 percent of investment positions according to the rating score, wherein the fourth category has a rating score of 12. The plurality of categories of an embodiment comprise a fifth category following the fourth category, the fifth category comprising a fourth subsequent 3.5 percent of investment positions according to the rating score, wherein the fifth category has a rating score of 11.

The plurality of categories of an embodiment comprise a sixth category following the fifth category, the sixth category comprising a fifth subsequent 3.5 percent of investment positions according to the rating score, wherein the sixth category has a rating score of 10. The plurality of categories of an embodiment comprise a seventh category following the sixth category, the seventh category comprising a sixth subsequent five (5) percent of investment positions according to the rating score, wherein the seventh category has a rating score of 9. The plurality of categories of an embodiment comprise an eighth category following the seventh category, the eighth category comprising a seventh subsequent five (5) percent of investment positions according to the rating score, wherein the eighth category has a rating score of 8. The plurality of categories of an embodiment comprise a ninth category following the eighth category, the ninth category comprising an eighth subsequent five (5) percent of investment positions according to the rating score, wherein the ninth category has a rating score of 7. The plurality of categories of an embodiment comprise a tenth category following the ninth category, the tenth category comprising a ninth subsequent nine (9) percent of investment positions according to the rating score, wherein the tenth category has a rating score of 6.

The plurality of categories of an embodiment comprise an eleventh category following the tenth category, the eleventh category comprising a tenth subsequent 10 percent of investment positions according to the rating score, wherein the eleventh category has a rating score of 5. The plurality of categories of an embodiment comprise a twelfth category following the eleventh category, the twelfth category comprising an eleventh subsequent 10 percent of investment positions according to the rating score, wherein the twelfth category has a rating score of 4. The plurality of categories of an embodiment comprise a thirteenth category following the twelfth category, the thirteenth category comprising a twelfth subsequent 13 percent of investment positions according to the rating score, wherein the thirteenth category has a rating score of 3. The plurality of categories of an embodiment comprise a fourteenth category following the thirteenth category, the fourteenth category comprising a thirteenth subsequent 13 percent of investment positions according to the rating score, wherein the fourteenth category has a rating score of 2. The plurality of categories of an embodiment comprise a fifteenth category following the fourteenth category, the fifteenth category comprising a fourteenth subsequent 14 percent of investment positions according to the rating score, wherein the fifteenth category has a rating score of 1.

The methodologies described above can be applied to rank the managers that manage the mutual funds. This results in rankings of mutual fund managers. If a fund manager managed more than one fund, the manager's rank score is a weighted average of the funds managed by the manager as $$\text{Rank Score} = \sum_{i=1}^{N} w_i \times S_i,$$

where N is the total number of funds, $w_i$ is the weight assigned to fund i, and $S_i$ is the score of Fund i. The weight corresponding to a fund is proportional to the assets under management for that particular fund as $$w_i = \frac{AUM_i}{\sum_{j=1}^{N} AUM_j},$$

and, $$\sum_{i=1}^{N} w_i = 1.$$

These formulas are extensible to include other fund variables such as: fund inflows and outflows, portfolio turnover, and top holdings.

Figure 22:
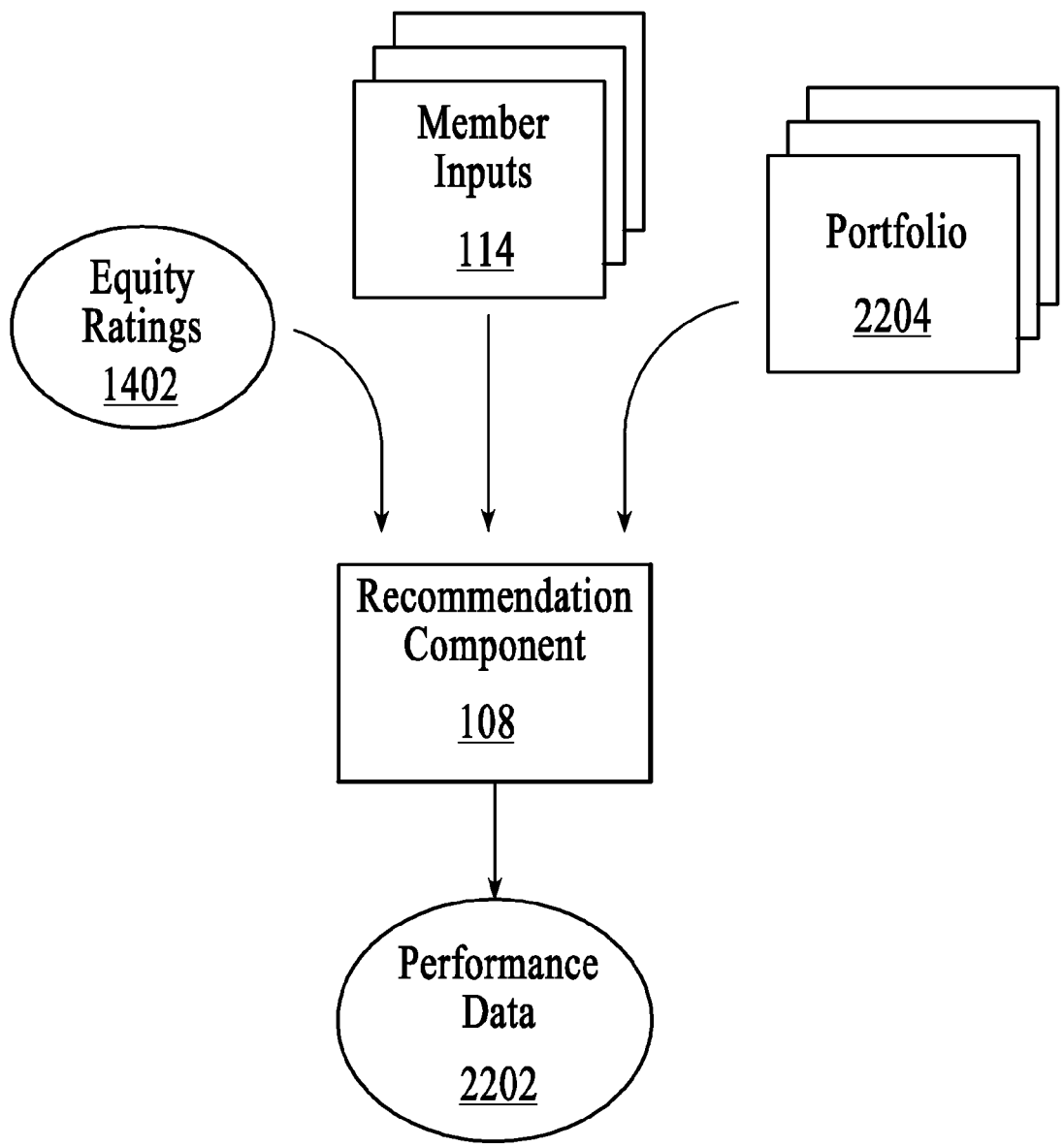
FIG. 22 is a block diagram of the recommendation component of the IDSS coupled to produce security rankings and dispense portfolio information or data, under an embodiment.

The IDSS uses the security ratings 1402 along with portfolio data 2204 of members to provide or output performance data 2202 including investment recommendations to members, under an embodiment. FIG. 22 is a block diagram of the recommendation component 108 of the IDSS coupled to receive security rankings 1402 and portfolio information or data 2104, under an embodiment. The recommendation component 108 is generally configured to evaluate the security ratings 1402 with risk level, asset allocation and stocks held by an investor, compare a set of members using the ranking and security ratings 1402, and generate recommendations 2202 for the stocks held by the member in response to the comparisons. The recommendations 2202 include recommendations to certain investment vehicles based on the aggregate holdings of other individual members based on performance, demographic characteristics, and social networks.

Regarding recommendations, the IDSS recommendation component 108 uses the security rating data 1402 to analyze each member's portfolio and to calculate and monitor performance measures so that a member is provided data on his/her portfolio returns, risk level, risk-adjusted performance and ranking. The recommendation component 108 uses data of a member's desired risk level (e.g., selected, entered 114 by the member or calculated by the system), asset allocation strategy and existing portfolio 2204 and compares it with the security ratings, and provides recommendations 2202 on which stocks to sell (e.g. sell F-rated stocks) and which to buy (e.g., buy A-rated or B-rated stock based on desired risk level).

The IDSS of an embodiment provides recommendations including an index for all or a subset of IDSS members, their portfolio holdings and performance for the purposes of measuring certain stock market performance. Similar to the Dow Jones Industrial Average, Russell 5000, and the Standard and Poor's 500 to name a few, the index, also referred to as the "individual investor index," can provide relevant insights into the state of the stock market at a particular time. The index illustrates the relative performance of the IDSS members across various cross-sections of the IDSS membership, for example, all members, or across a group based on rank. The index can be based on member data like current holdings, positions bought, and/or positions sold, but is not so limited. The Index could be licensed to third parties who might be interested in the real-time and daily sentiment of the individual investing community.

As an example, the IDSS of an embodiment provides an index that is formed based on a member's holdings. The IDSS forms the index for a member by setting a starting index value (e.g., 100) on the first day of evaluation. The starting index value for purposes of this example is 100, but the starting index value is not limited to any particular value. A cross-section of the IDSS membership is selected for the index (e.g., Elite group). The IDSS then identifies the current holdings of the selected group. On the second day, the daily performance of the current (as selected at the end of the first day) holdings of the selected group is calculated. The performance is based on the increase or decrease in value of the holdings from the market close of the first day to the market close of the second day, or in increments during the second day to provide intra-day/real-time values of the index. The daily performance forms a performance percentage (e.g., increase by 3%). The starting index value is adjusted by the performance percentage (e.g., the adjusted or new index value is 103 (100 multiplied by the quantity (1+0.03). Likewise, on the third day, the performance percentage of the end of second day holdings of the selected group is calculated based on their value during and at the end of the third day, and the index value of the second day is adjusted by the performance percentage. The index value adjustment proceeds on subsequent days as described above.

Figure 23:
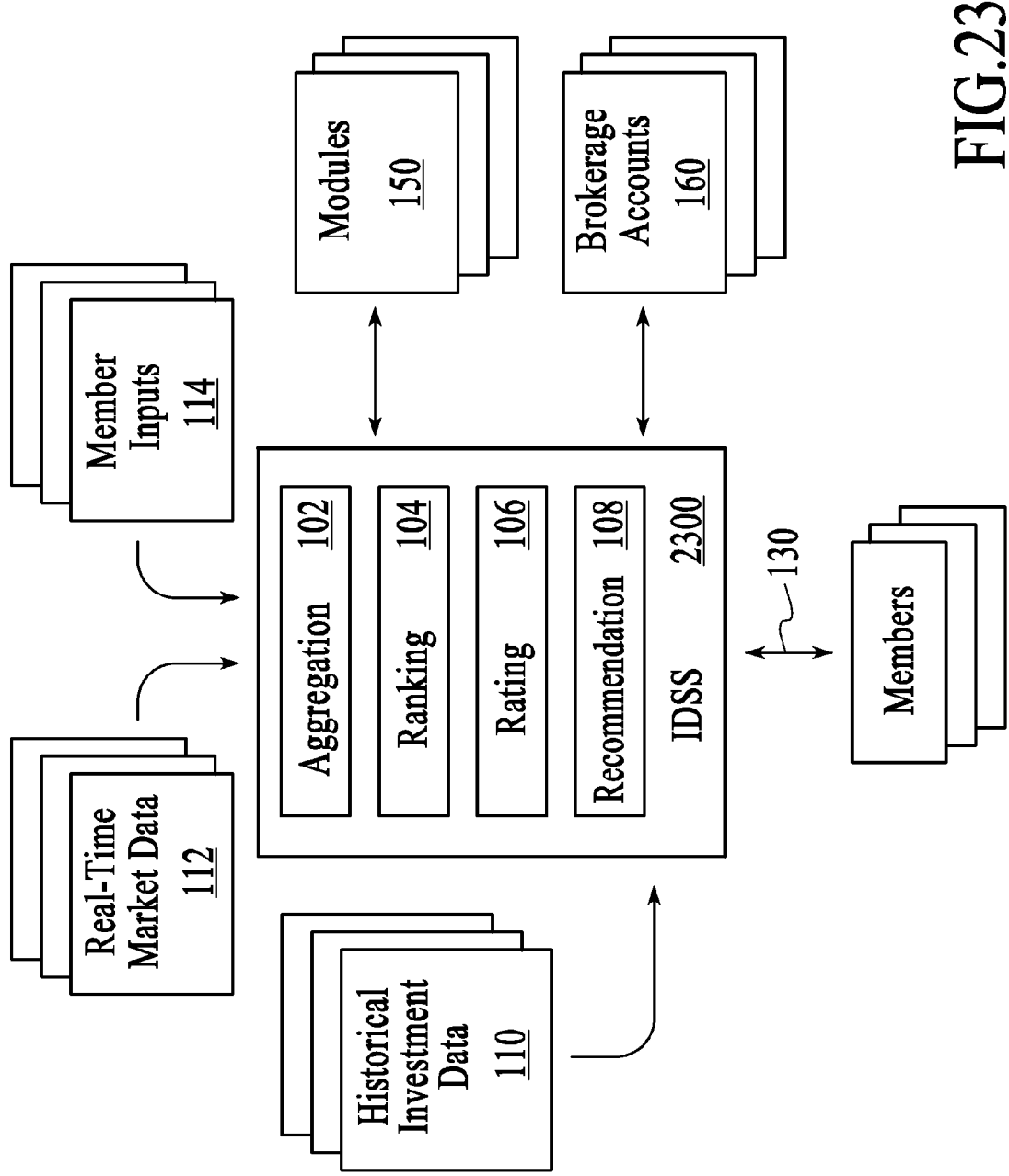
FIG. 23 is a block diagram of the investment data sharing system (IDSS), under an alternative embodiment.

FIG. 23 is a block diagram of the investment data sharing system (IDSS) 2300, under an alternative embodiment. The IDSS includes numerous components running under one or more processors. The IDSS components of an embodiment include an aggregation component or engine 102, a ranking component or engine 104, a rating component or engine 106, a recommendation component or engine 108, and any number of modules 150. The IDSS includes couplings or connections to sources or components from which historical investment data 110, real-time market data 112 and brokerage information or data can be received, fetched, gathered, and/or inputted. The investment data 110 and real-time market data 112 can be received periodically or continuously in real-time or near real-time via synchronization over electronic couplings with brokerages, market services, and/or other third-party sources of data. The IDSS includes couplings or connections to brokerage accounts 160 belonging to members, and the IDSS can facilitate or execute actions in the brokerage accounts via these couplings, as described in detail below. The IDSS is also configured to receive data or information 114 manually entered by a member.

The IDSS components 102-108 and 150 can be components of a single system, multiple systems, and/or geographically separate systems. The IDSS components 102-108 and 150 can also be subcomponents or subsystems of a single system, multiple systems, and/or geographically separate systems. The IDSS components 102-108 and 150 can be coupled to one or more other components (not shown) of a host system or a system coupled to the host system.

The IDSS components are configured and function, individually and/or collectively, to provide data products or outputs as described herein, including investor rankings, security ratings, risk-adjusted portfolio performance, and/or buy/sell recommendations, as described in detail herein. The IDSS also includes portals and/or couplings 130 by which any number of members can access the data products relating to their individual accounts or portfolios as well as the accounts or portfolios of members to whom they are linked. The portals and/or couplings 130 of an embodiment include, for example, connections between a member's computer and the IDSS via a web site provided or hosted by the IDSS.

The IDSS includes any number of modules 150, as described above, that generate and/or include aggregated data derived from the investment data, transactional information, and brokerage account information. As an example, the IDSS modules 150 of an embodiment include a Cake Take rating module, as described above. As another example, the IDSS modules 150 of an embodiment include a performance index module or component, also described herein as the Cakedex module. The Cakedex module generates and/or includes the Cakedex, as described in detail below.

The Cakedex module of the IDSS of an embodiment generates or produces a performance index or index, referred to herein as "Cakedex" or "Cake index", to measure how a set of individual investors perform over time relative to one or more general market indices (e.g., S&P 500, Dow, NASDAQ, etc.) and other commonly referenced benchmarks. The term "Cakedex" refers to a suite of securities, funds, or ETF groupings derived from the data described herein (e.g., authentic historical transactions, current holdings, and real-time trading activity of retirement and/or brokerage accounts, etc.) and used to measure how certain individual investors perform over time relative to the general market indices.

Cakedex is constructed on a forward-looking basis to track a hypothetical composite or aggregate portfolio or fund comprising the actual portfolios of a subset or pre-specified set of IDSS members (also referred to herein as "index investors"). The Cakedex of an embodiment tracks a hypothetical composite portfolio comprising the top N % investors in a data set, where the top N % investors are identified based on rank score, as described above. Cakedex does not take into account any transaction costs, brokerage commissions, taxes or other expenses related to its composition when measuring index performance. The index investors can include, for example, some number (e.g., 10, 50, 100, 1,000, etc.) or percentage (e.g., 1%, 5%, 10%, 20%, etc.) of top performers across all investment vehicles over one or more periods of time, some number or percentage of top performers across one or more sets or groups of investment vehicles over one or more periods of time, some number or percentage of top performers focused on technology stocks over one or more periods of time, some number or percentage of worst performers across all investment vehicles over one or more periods of time, some number or percentage of worst performers across one or more sets or groups of investment vehicles over one or more periods of time, to name a few. The Cakedex index then follows the aggregate portfolio of the index investors for a period of time at which point the IDSS re-evaluates and/or rebalances the member base.

FIG. 24 is a flow diagram for a method of generating a performance index 2400, under an embodiment. The method of an embodiment comprises generating 2402 a rank score for each investor relative to a plurality of investors of which the investor is a member. The generating of the rank score, as described in detail above, uses investment data of a portfolio of the investor, and the portfolio includes at least one investment position. The method of an embodiment comprises selecting 2404 a set of investors from the plurality of investors based on the rank score of each investor. The method of an embodiment comprises generating 2406 the performance index to provide a measure of performance of top individual investors over time relative to a market index. Generation of the performance index includes generating a composite portfolio comprising investment positions of each portfolio of each investor of the set of investors.

In operation, using the investment data that the IDSS receives from investors and their respective brokerages, the IDSS generates or calculates the rank score for these investors as described above and, using the rank scores, identifies a top set or pool of investors. The rank score can be generated using any rank method described herein (e.g., using SR, using IR, using a combination of SR and IR, etc.). The top pool of investors of an embodiment comprises the top 10% of investors, but the embodiment is not limited to the top 10%. The IDSS generates a hypothetical composite portfolio, the Cakedex, comprising the portfolio holdings of the top pool of investors. Once a top pool of investors is identified, performance of the set is tracked or followed for some number of months, N (N≧1), irrespective of whether or not these investors remain as the top pool in subsequent months.

To calculate the weighted composition of the Cakedex, following identification of the top pool of investors and thus the investment positions included in the Cakedex, the IDSS calculates the percentage portfolio allocation across the different investment positions (e.g., stocks, mutual funds and Exchange Traded Funds (ETFs)) for each investor in the top pool. For each investment position, the IDSS calculates the average percentage by taking a weighted average percentage allocation for all investors in the top pool. The weighting is proportional to each investor's rank score. Thus, the IDSS determines the weighted composition of the Cakedex as follows: generate a weight for each investor's portfolio relative to the other investors in the top pool; determine a weight of each investment position in each investor's portfolio relative to the other investment positions in that portfolio; determine a weight of each investment position in the Cakedex by forming a first quantity by multiplying the weight of an investor's portfolio by the weight of an investment position in that investor's portfolio, and summing across the top pool of investors the first quantity for the respective investment position for each investor holding that investment position. The composition of the Cakedex is calculated and updated on some time frequency (e.g., daily, weekly, monthly, some other period of time).

As an example, a top pool of investors includes three (3) investors with their respective rank scores (investor A with rank score 95, investor B with rank score 75, and investor C with rank score 45). The weight for each investor's portfolio relative to the other investors in the top pool is calculated for the Cakedex hypothetical portfolio as follows:

Investor A's portfolio has a weight of 95/(95+75+45)=44.18%;

Investor B's portfolio has a weight of 75/(95+75+45)=34.88%;

Investor C's portfolio has a weight of 45/(95+75+45)=20.93%.

Suppose investor A and investor B each hold stock XYZ, and investor C does not hold stock XYZ. Also assume, for purposes of this example that 10% of investor A's portfolio is in XYZ and 5% of investor B's portfolio is in XYZ. Therefore, the weighting of XYZ in the Cakedex is calculated to be 6.16% ((10%×44.18%)+(5%×34.88%)=6.16%). An equal weighting approach would yield a 5% weighting.

The performance of the Cakedex is measured daily on a "forward looking" basis for some time period, such as a month. On the first day of the following month, the IDSS again evaluates the current pool in the data set, calculates their rank scores and identifies the top pool of investors. The IDSS then recalculates the composition of the Cakedex based on factors that include changes to the holdings of such top investors, and additions or subtractions to the pool of such investors, but the embodiment is not so limited. This process is then repeated for successive months. Note that the investors who were in the top pool in the previous months (up to N months ago, where N months is the period for which the top investors are followed) and are not in the top pool in the following month are still included in the top pool.

The Cakedex family of funds include one or more of the following or a combination of two or more of the following, but the embodiment is not so limited: Cakedex Index-Aggregated holdings of "top performing" investors; Cakedex Hidden Gems-Aggregated least widely held, best performing positions by certain investors; Cakedex Balanced (50% of the N least widely held positions by certain investors+50% of the N most widely held positions); Cakedex by Cake Take (Comprised of all (or the top N) securities with a Cake Take of A+, A or A−); Cakedex funds by investor profession; Cakedex funds by investor zipcode/region; Cakedex funds by investor age-group; Cakedex funds by investor goals (play money, college funds, retirement, trust etc.; Cakedex funds by investor income range; Cakedex long—short strategy funds; Cakedex funds by investor strategy (buy and hold, day trader, market timer, passive etc.); Cakedex funds by investment style (value, growth, balanced etc.); Cakedex market cap funds (large cap, small cap, mid cap); Cakedex Sector funds (Technology, Basic Materials, Healthcare etc.); Cakedex funds by fundamental style (value, growth, blend).

In addition to creating a Cakedex fund by investors, as described above, a Cakedex fund or index can be created to include funds instead of individual investment positions. The Cakedex fund created to include funds is generated by grading or ranking mutual funds in the same manner as described above for individual investors, and then generating the Cakedex fund to include the top mutual funds based on any desired characteristic.

The IDSS of an embodiment enables member-investor matching in that it allows a member to identify other members with whom he/she has an investor relationship as measured by a pre-specified criteria. FIG. 25 is a flow diagram for investor matching 2500 using the IDSS, under an embodiment. Components of the IDSS receive data inputs 2502 corresponding to members. The data inputs include data of investment strategies, portfolio holdings, watch lists, transactions, performance and assorted demographic data, and other data as described above. Weights are assigned or selected 2504 for data components of the input data, and a score is generated 2506 for each member based on the input data and the corresponding weights. A member is automatically matched 2508 to other members according to his/her score. The matching is specific to criteria selected by the member requesting or controlling the matching. The results of the matching return information of members having the same score (within a pre-specified variance range) as the member requesting the match.

The matching is specific to criteria selected by the member requesting or controlling the matching, as described above. For example, when the criteria is investment approach, a member uses this criteria to control the matching based on how other members who share a similar investment approach are performing and what investments those other members are trading. The results of the match identify members having the same investment approach score (within a pre-specified variance range) as the member requesting the match. In this manner, a user can identify securities that he/she may be interested in adding to his/her portfolio.

The IDSS of an embodiment thus uses the ranking and rating data described above to provide real-time, automated, highly-customized investment "advice" to individual investors at a fraction of the cost of existing players. Leveraging the security rating described above, the IDSS provides or suggests improvements to a member's existing portfolio by suggesting changes to current asset allocation or substitutions to current allocation with less risky, higher-performing positions, explicitly based on a member's specific investment strategy. For example, if a member currently owns a stock that the IDSS rates as an "F", the IDSS can suggest an alternative "A" rated position.

The recommendation engine of an embodiment helps investors optimize their investments by generating or producing a set of securities (e.g., stocks, ETFs, mutual funds) that mimics a target asset allocation while, at the same time, reducing the portfolio risk and expenses associated to mutual fund /ETF fees and increasing portfolio return and diversification. The target asset allocation is decided by a level of risk tolerance, but is not so limited.

Figure 26:
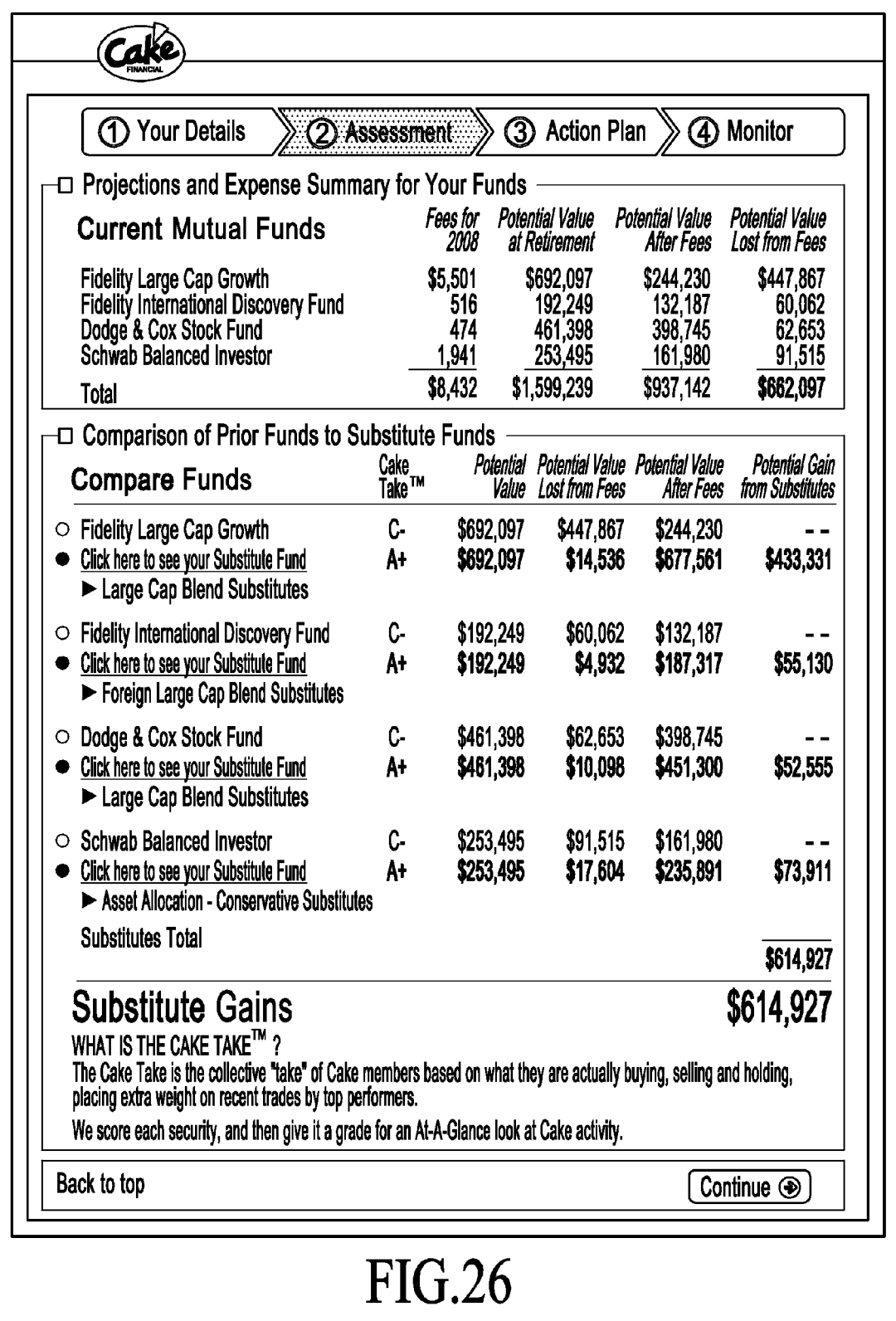

The recommendation engine of an embodiment includes a mutual fund engine, target asset allocation models, and a fit score, as described in detail herein. The mutual fund engine provides expense reduction to an investor by automatically identifying higher rated (based on mutual fund Cake Take) investment positions having lower associated fees and suggesting these substituted funds to investors based on the higher rating and lower fees. Because the fund ratings are calculated from fee-adjusted returns, the higher rated fund (rated as described above under an embodiment of the IDSS) generally provides superior returns even after accounting for fees. The higher-rated investment positions provided as suggested substitutes under an embodiment are suggested within desired categories (e.g., large cap, energy, technology, international, fixed income, etc.). FIG. 26 is an example output of the mutual fund engine of the recommendation engine, under an embodiment.

The target asset allocation models, driven by rank and risk metrics, provide an investor with information of a gap analysis between target and current investments. The allocation models use the rank (as described above) to derive asset allocation models for different investor characteristics such as risk, years to retirement, and retirement shortfall, and use that as another basis for investment recommendation and goal planning.

Figure 27:
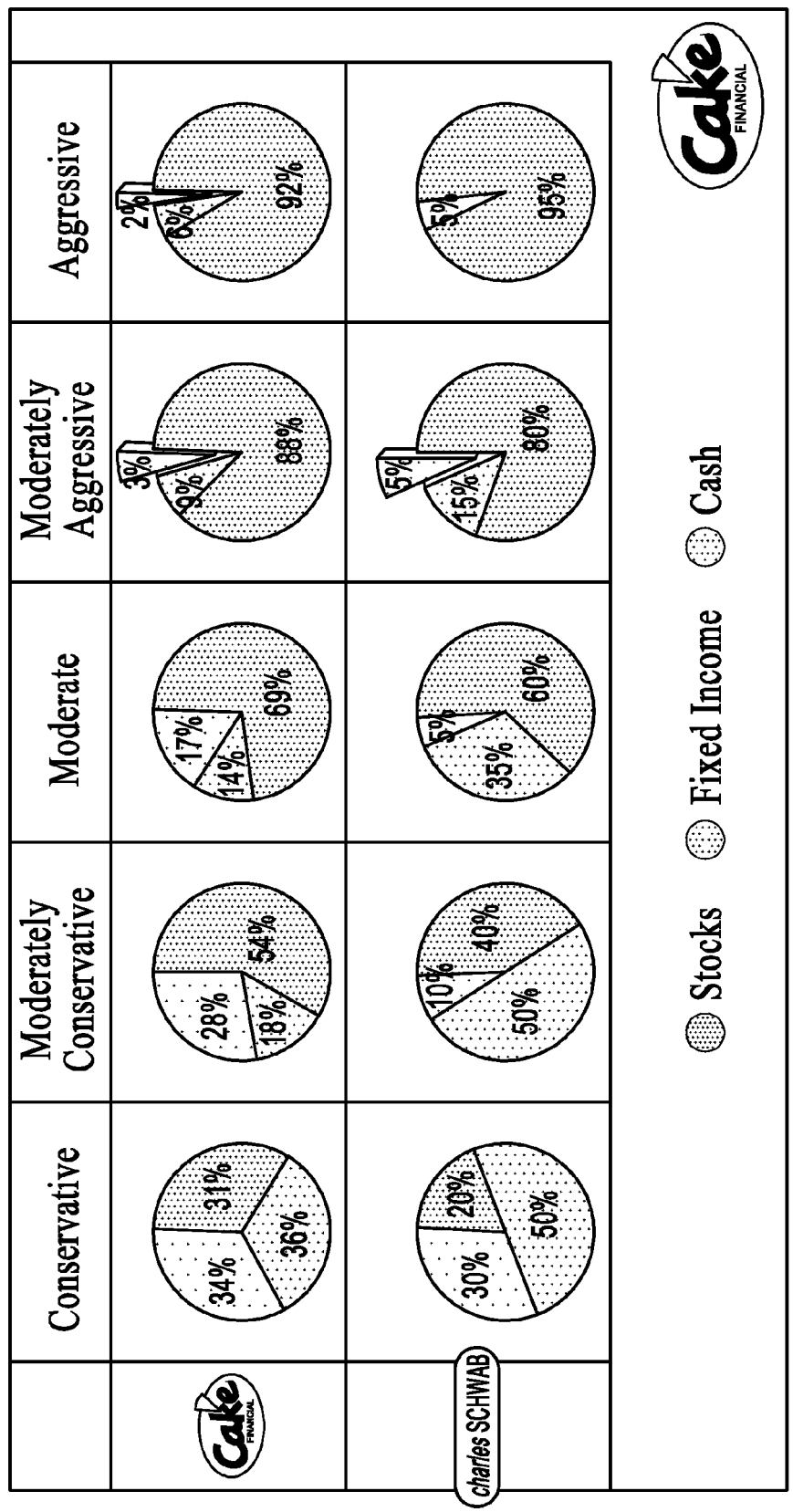
FIG. 27 shows sample results of derived asset allocation models, derived under an embodiment, in view of results from major brokerage firms and mutual fund companies.

The asset allocation models use investor groupings to identify optimal asset allocation models for different levels of risk tolerances. These models are then used as target asset allocation models for all other investors. It has been found that derived asset allocation models from the investment data rival those systems of major brokerage firms and mutual fund companies. FIG. 27 shows sample results of derived asset allocation models, derived under an embodiment, in view of results from major brokerage firms and mutual fund companies.

Figure 28:
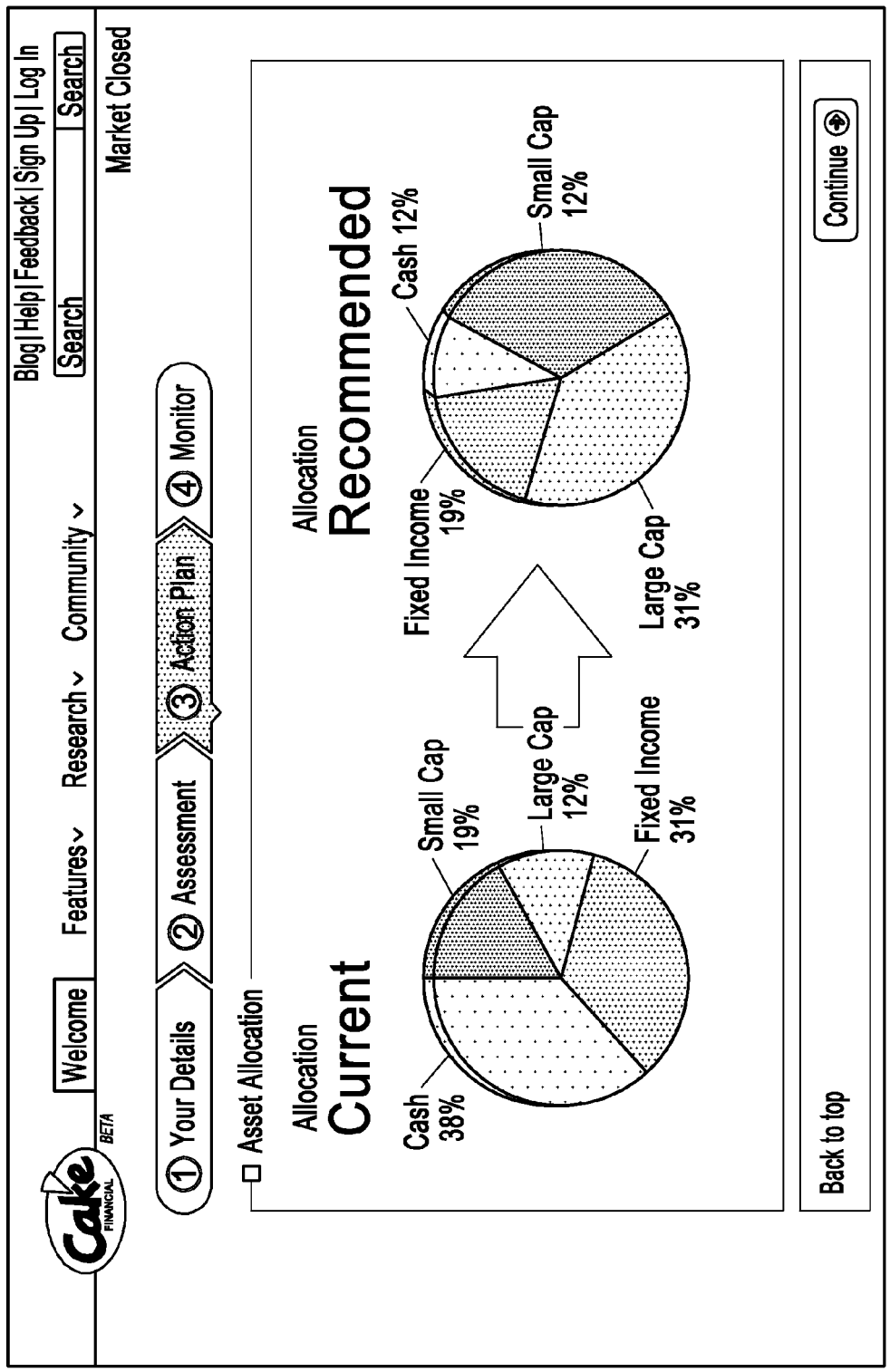
FIG. 28 is an example output showing the difference between a particular investor's current allocation and a desired target allocation, under an embodiment.

The IDSS of an embodiment then generates or calculates the difference between a particular investor's current allocation and a desired target allocation and reveals specific investment positions (e.g., stocks, mutual funds, ETFs, etc.) that can fill the gap. FIG. 28 is an example output showing the difference between a particular investor's current allocation and a desired target allocation, under an embodiment.

Figure 29:
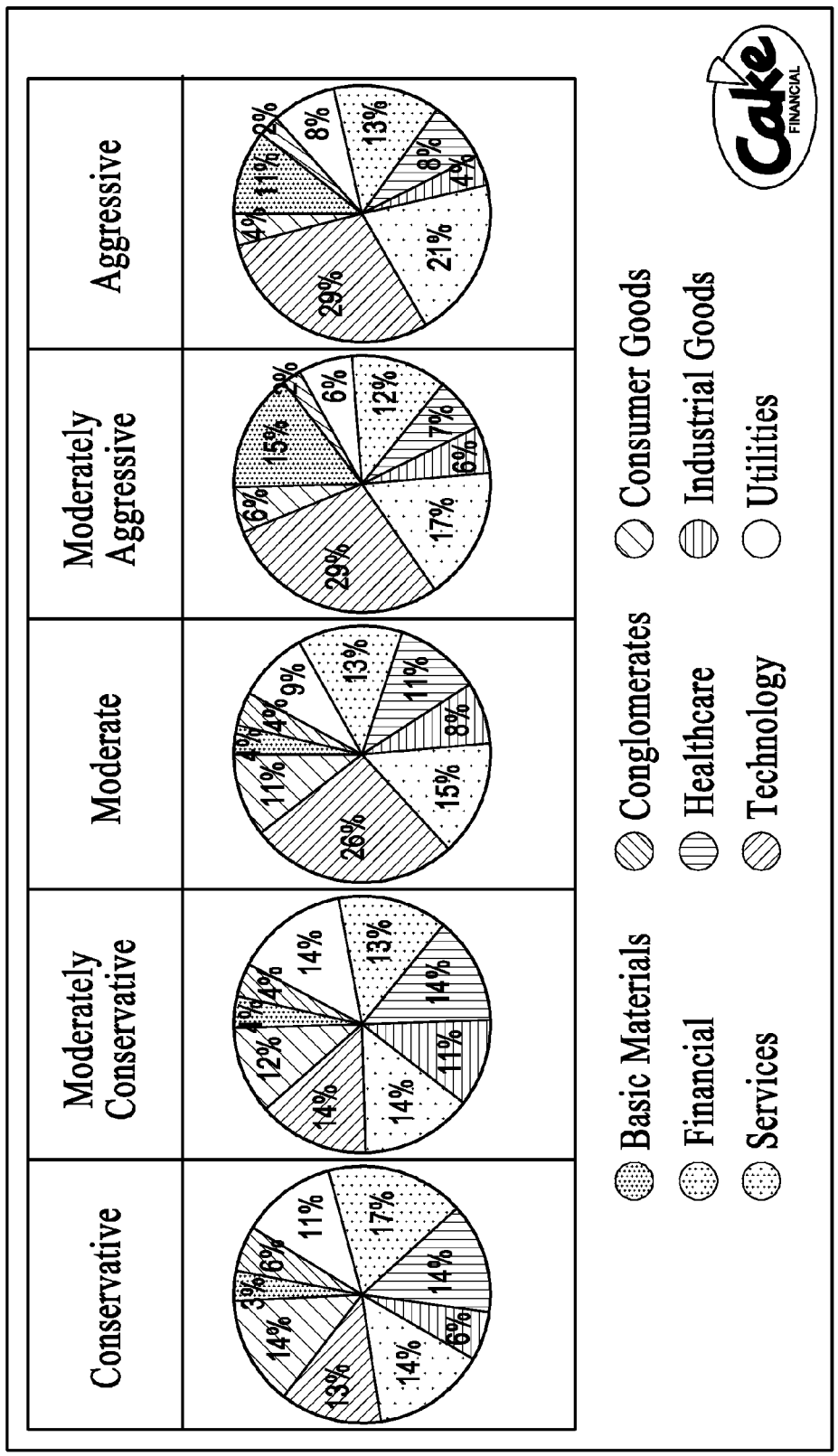
FIG. 29 is an example output showing application of the asset allocation target models to identify sector-level allocations for investors, under an embodiment.

The IDSS of an embodiment applies the asset allocation target models to identify sector-level allocations for investors. FIG. 29 is an example output showing application of the asset allocation target models to identify sector-level allocations for investors, under an embodiment. Thus, within each sector, the IDSS identifies investment positions that are highly rated by and are consistent with the target asset allocation at the desired or specified level of risk.

The recommendation engine provides a "Fit Score" that provides a personalized "fit" of a particular investment position (e.g., stock, fund, ETF, etc.) for a particular investor's current investments. The Fit Score is an objective measure that automatically calculates how well a particular investment position (e.g., stock, mutual fund, ETF, etc.) fits into a particular portfolio and communicates to an investor the appropriateness of and the size for inclusion of a new holding. For any given portfolio, once a risk tolerance and a target asset allocation has been determined, the recommendation engine can identify the appropriateness of a stock, mutual fund, and/or ETFs for a particular investor's portfolio. The new investment position must satisfy the given target asset allocation and have a high rating (rating as described herein) and, in the case of mutual funds and ETFs, also have low expense ratios.

Once such a set of investment positions is identified, each investment security can be substituted into a portfolio and a simulation run that calculates allocation level, risk and diversification measures for the new portfolio. The IDSS can then automatically determine the "fit score", or, how appropriate (or not) is the chosen position and what dollar value constitutes the ideal allocation.

The quality of the fit is measured by a number of components including, but not limited to, the following: risk score; diversification score, stock/fund rating score; fees score. Each of the four components of the fit score has a value in the range of 1 to 5. These correspond to quintiles that are calculated based on all the data available to the IDSS. For instance, for all portfolios linked to the IDSS, a risk and a diversification measure are calculated. The portfolios in the top 20% highest risk are assigned a risk score of 1, the next subsequent 20% risk are assigned a risk score of 2, the next subsequent 20% risk get a score of 3, the next subsequent 20% risk are assigned a risk score of 4, and the next subsequent 20% risk get a score of 5.

In determining diversification score, the portfolio in the bottom 20% for diversification get a diversification score of 1, the next subsequent 20% get a sore of 2, the next subsequent 20% get a sore of 3, the next subsequent 20% get a sore of 4, and the next subsequent 20% get a sore of 5.

For the rating score, the IDSS uses the ratings themselves, and every security having a rating of A+, A, A− gets a score of 5, securities rated B+, B, B− get a score of 4, securities rated C+, C, C− get a score of 3, securities rated D+, D, D− get a score of 2, and securities rated F+, F, F− get a score of 1.

For the fees score, the IDSS uses the expense ratios for mutual funds and ETFs. Therefore, the securities falling in the top 20% highest expense ratio get a score of 1, the next subsequent 20% get a score of 2, the next subsequent 20% get a score of 3, the next subsequent 20% get a score of 4, and the next subsequent 20% get a score of 5. All stocks are given a score of 5.

Each of the four scores (risk score; diversification score, stock/fund rating score; fees score) has a weight associated with it, and the final Fit Score is the sum of the four component scores multiplied by their respective weights. The weight of an embodiment has a default value of 5. In an embodiment, the weights corresponding to the risk score and diversification score are calculated dynamically for each portfolio using the following criteria: if current portfolio risk score is less than 3, then risk weight is calculated as the quantity (8—new risk score), and diversification weight is calculate as the quantity (10—risk weight); if current portfolio risk score is equal to or greater than 3, and new risk score is equal to or greater than 3 and diversification score is less than 3, then diversification weight is calculated as the quantity (8—new diversification score), and risk weight is calculate as the quantity (10—diversification weight). If these conditions are not satisfied, then the default value is used. In this manner, the IDSS can automatically determine if a contemplated new holding is or is not a fit.

Figure 30:
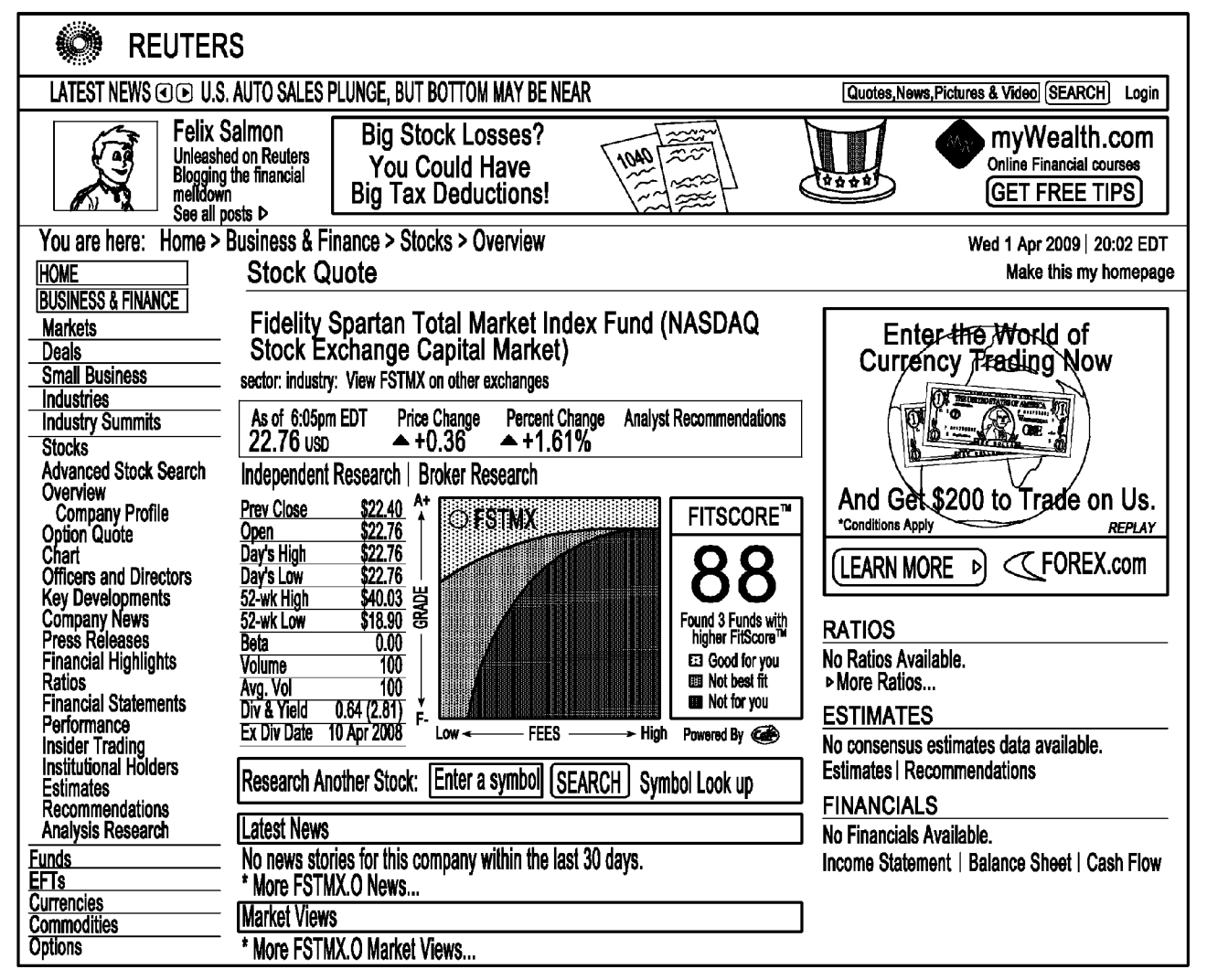

FIG. 30 is an example output showing the Fit Score for a particular stock, under an embodiment. In this example, the stock quote page shows information of the stock for Fidelity Spartan Total Market Index Fund (FSTMX). This example page also displays a Fit Score for FSTMX stock ("FITSCORE 88") relative to the investor's portfolio, where the Fit Score is generated as described above. The output further includes a graphic that plots the rating versus the fees for the FSTMX stock.

The IDSS of an embodiment provides electronic search capabilities to members for searching a database of member-investor information for the purposes of determining whether certain investment vehicles were previously or are currently held by other members. For example, a member can search for other members using data of a name, employer, holdings, performance, zip code, income levels, education, investing strategies, and professional and/or industry experience, to name a few.

The networking or linking of members provided by the IDSS also enables automated sharing of "authenticated" investment information with other members including, but not limited to, sharing of investment returns, holdings, such as portfolios, stock, bond, mutual fund, exchange traded funds, options, and other publicly available investment vehicles, as well as trading activity. As such, members can "allow" other members of the IDSS community to access relevant investment information.

The sharing of investment information further enables members to establish "private" Investment Clubs. An Investment Club is formed to include a set of members who share a common portfolio or investment vehicles. In contrast to ranking individual members, the IDSS of an embodiment is configured to apply the ranking techniques described above to the collective membership of each Investment Club in order to generate club rankings for each Investment Club. The club rankings can then be compared and/or used as described above in reference to individual member rankings.

The IDSS is also configured to enable members to "tag" the security holdings of certain other members to which they are linked for the purposes of easily and quickly monitoring their performance and progress. This can be done via a "My Profile" section of the IDSS website, for example, but is not so limited.

The IDSS enables a user to perform one or more of the following: "tag" a web page of an Internet web site; "add" an electronic link to a "My Profile" page of the IDSS web site; automatically distribute electronic links, news sources, and communications or messages via e-mail or instant messaging to members to whom the sending member is linked. As an example, a member reading a blog about Apple Inc. funds the article very informative as it mentions a new key feature that will allow Apple computers to run Windows. The user "tags" the URL of the blog posting or article and with one click "sends" the article to IDSS members that follow her portfolio.

The IDSS is configured to provide automated real-time trading activity notifications of individual member trading activity to other members. This allows members to set up an automated notification system, whereby they can view or be apprised of real-time buy and sell activity of other members. This can take the form of a personal "IDSS Stock Ticker" where positions of all or certain IDSS members are displayed, but is not so limited.

The IDSS enables automatic trading (auto-trade), for example, in response to the real-time disclosure of trading activity between linked investors. Consequently, the IDSS components can be configured to automatically mimic the trading activity (e.g. buying the same stock) of one member account in another account. Generally, a member ("follower member") can "link" his account to another member's account ("mentor"). When the mentor buys stock in Apple Inc., any followers will automatically purchase the same number of shares in their accounts, assuming sufficient funds.

More specifically, a first member sells 100 shares of stock in Company X. Another member linked to the first member can configure her account to automatically sell 100 shares of stock in Company X in response to the real-time notification of the linked member's trade activity. The automatic trading activity in response to linked investor data includes automatic trading in third-party investment accounts (e.g., with third-party broker/dealers and/or registered investment advisers) and/or investment accounts provided on the platform.

With the advent of online trading in the early 1990's to its now de facto method for buying and selling stocks for individuals, the act of trading securities has never been easier, cheaper, and more accessible by millions of investors. It is hard to remember but only 10 years ago a single trade could cost $200 and a customer had to call an actual person on the phone to effect a transaction. Now with $5 trades (going to free), shrinking spreads, and ubiquitous services offering real-time trades, customer satisfaction with act of trading online is very high.

However, the context for investing by individuals has not changed with this technical evolution and the confusion of whether to buy, sell or hold has proven to be suboptimal, as the average investor underperforms most major market indices due to a variety of factors associated with trading. It has been proven by behavioral finance researchers that individuals hold on to underperforming holdings too long, sell winners too early, trade too often so as to increase their fees and taxes, and have non-diversified portfolios that increase their risk to dangerous levels. In a sense, having the powerful capabilities of online trading so readily available, it is actually making it more difficult for individual investors to be smart with their finances.

The IDSS changes this by making it relatively simple for individual investors to create a smart asset allocation plan that matches their risk levels and age, to select the optimal holdings, and to stay disciplined and on track across of their accounts. The IDSS of an embodiment enables an individual to effect a transaction from the IDSS platform to their accounts via a trading API of the IDSS.

Figure 31:
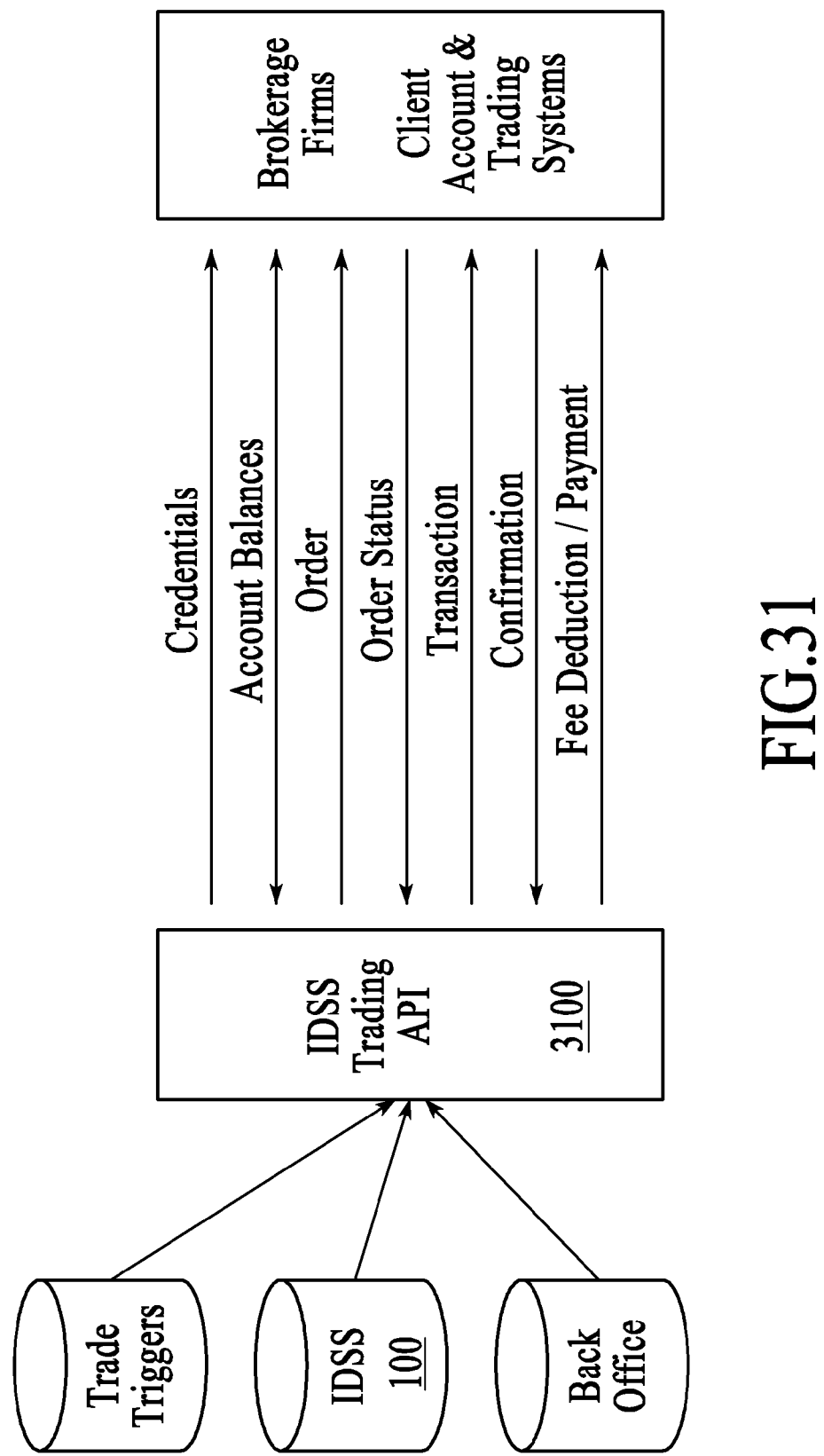
FIG. 31 is a block diagram of the IDSS including a trading API, under an embodiment.

FIG. 31 is a block diagram of the IDSS 100 including the trading API 3100, under an embodiment. The IDSS 100 comprises components as described above with reference to FIG. 1 and FIG. 23 and as described elsewhere herein. The IDSS 100 couples or connects to brokerage firms and/or client account and trading systems. The IDSS 100 exchanges information or data with the brokerage firms and/or client account and trading systems, the data including but not limited to credentials account balances, order information, order status, transaction information, confirmation, fee deduction and payment information.

The IDSS thus provides a personalized investment management platform that allows individual investors to manage all of their retirement and brokerage accounts from a central location and to get objective, personalized, actionable insights into how they can do better. Customers can connect an unlimited number of accounts to the IDSS and are not required to physically transfer their assets from their existing bank or brokerage firm to the IDSS in order to use the service. The IDSS seamlessly connects to retirement and brokerage accounts through its trading API and updates the investment data multiple times a day.

The IDSS of an embodiment enables and provides a platform for investing based on real brokerage information, historical performance and trades. The IDSS enables individual investors to communicate and share their real brokerage information with one another without revealing personal information such as net worth, the value of the portfolios, or the number of shares owned. The IDSS does not require that individuals transfer their assets or open up a new account to take advantage of the platform. The IDSS allows seamless communication to occur amongst individuals and across the different online brokerage platforms. For example, a couple where one spouse has an account at Fidelity and the other spouse has an E*Trade account can seamlessly communicate via the IDSS, as described herein.

With the IDSS platform, individuals can see one another's portfolio holdings, historical performance, and trading activity. With the benefit of this unprecedented transparency into the actions of other individuals, the IDSS compresses the time and effort that is currently required to go from conducting research (i.e., which investments to buy or sell) to taking action (i.e., making a specific buy or sell in an account(s)).

Without the IDSS, individual investors have few options in getting trusted help with managing their retirement and brokerage accounts and making trades. These options include, but are not limited to: paying an advisor or broker to make portfolio suggestions and/or manage their investments for them; making trades on their own at a discount online brokerage; and/or entering into a Legal Power of Attorney (LPOA) to empower another, non-professional, to make trades in their account(s) on their behalf.

The IDSS includes a process and service for a new way to make trades in individuals' existing brokerage account. The IDSS will facilitate trading actions from its platform into individuals' existing retirement and/or brokerage accounts via a trading API and from any website or device and, ultimately, anywhere where people are consuming their LDSS information across the web (such as Facebook, third party distribution partners, on mobile phones, etc.).

The IDSS of an embodiment comprises a trading API that generates, executes, monitors and records trade orders across multiple different brokerages and accounts. Trades can be executed by the trading API either manually or they can be triggered by a variety of triggers, for example, set by the user (e.g., sell a particular security when the price reaches a certain value, etc.), or algorithmic (exposure to certain market sectors crosses a threshold limit), or trades/actions of other people, etc.

Once a trade order has been initiated by one or more methods, as described herein, the trading API automatically issues a command to the broker-dealer to initiate authentication of the trade. Then, the trading API issues a command to execute the trade order. The trading API automatically issues a periodic command to check the status of the trade order. Upon receiving a trade order response confirming the execution of the trade order, the trading API automatically notifies the individual of the status. If the trade order gets rejected (e.g., selling more security than held), then the trading API automatically notifies the customer of the status and the reason.

The trading API also performs transaction reconciliation and order record keeping and an audit trail for full compliance. In so doing, the trading API automatically reads back the order to a person submitting the order so they can verify that the broker properly understood the order instruction. Depending on the deployment configuration, this would be performed by either the investor in question or by the trading API itself. The trading API also keeps a record of transactions.

There are numerous ways that the IDSS and trading API enable the "cross platform community investing" functionality from its platform to online brokerage accounts held by IDSS investor-members. For example, a member who has linked her brokerage account(s) to the IDSS and selects the "Trade" button on the IDSS website facilitates a transaction in her brokerage account(s) via the trading API. In another example, an investor can set up a rule or series of rules that trigger a transaction from the IDSS into the investor's account. Furthermore, a member who has linked her brokerage account(s) to the IDSS and is notified of an action by one or more other individual investors on the IDSS is given the option via the IDSS of making a similar trade in her own account(s) based on that activity.

As another example of the IDSS trading API enabling the cross platform investing functionality, a member who has linked her brokerage accounts(s) to the IDSS can automatically, via the IDSS, make the same or similar trade as one or more IDSS members based on that activity. Additionally, a member who has linked her brokerage account(s) to the IDSS and is notified of a change in the particular rating of a security allows the IDSS to facilitate trades to her account(s) on her behalf based upon that change. A further example allows a member who has linked her brokerage account(s) to the IDSS to allow the IDSS to facilitate trades to her account(s) on her behalf based upon IDSS derived algorithms based on the aggregated behavior of other IDSS members or predetermined criteria such as changes in asset allocation or pricing triggers. Moreover, a member who has linked her brokerage account(s) to the IDSS can allow the IDSS to facilitate trades to her account(s) on her behalf based upon third party triggers (e.g., email, Facebook, Twitter, etc.).

FIG. 32 is a flow diagram for transaction facilitation 3200 by the IDSS, under an embodiment. The transaction facilitation comprises forming 3202 an electronic network between or to include a plurality of investors. The electronic network includes the IDSS and couplings or connections to portfolios and online brokerage accounts of the investors. The transaction facilitation comprises sharing 3204 between the investors via the electronic network investment data and/or brokerage data. The investment data comprises data of the portfolios, and a portfolio comprises at least one investment position. The brokerage data comprises data of the brokerage accounts. The transaction facilitation comprises executing 3206 a first action involving an investment position in a first portfolio and/or a first brokerage account of a first investor. Execution of the first action is in response to the investment data and/or brokerage data indicating a second action taken in a second portfolio and/or a second brokerage account of at least one second investor.

The IDSS can be used to automate trading and/or provide additional trading and advisory products. For example, the IDSS could provide packaged solutions in the form of automated portfolio management in which a member pays an annual "advisory" fee and the IDSS maintains an asset allocation model customized for that member's investment goals. The IDSS could also offer investment products like mutual funds by certain sectors and investment strategies, thus creating a proprietary trading desk or IDSS mutual fund that seeks to capitalize on the IDSS aggregated data set through the inclusion of equities held by the highest ranked members, and selling shares in the mutual fund to the public. Additionally, the IDSS might provide a brokerage service including automatic trading.

Furthermore, the IDSS can be coupled or partner with online brokerage firms, who could add the IDSS to their proprietary system. Under this configuration, the IDSS would be an option within the online brokerage site so that account data is automatically populated. Also, the IDSS ranking system can be replicated within the partner environment to create a "mutual fund" of specific individuals that can be proprietary to specific partners.

Currently, there is no platform for professional investment managers to be "accredited" based upon their actual historical performance. The IDSS, however, provides a professional accreditation ranking system allowing an independent third party to "verify" performance of professionals. This is similar to other services like Better Business Bureau, BBB Online, Consumer Reports, and Good Housekeeping Seal of Approval, to name a few.

Conventional fee systems and the corresponding opaque mechanisms for extracting these fees, makes it difficult to hold investment advisors accountable for under-performance. Investment advisory service fees of the IDSS can be based on the actual delta improvement over a particular benchmark traced to the given advice, rather than on current industry practices of percentage of assets and/or flat fees. Thus, the IDSS includes a fee system under which a user pays nothing to the IDSS service if he/she fails to meet certain benchmarks, and pays a percentage of the incremental benefit of advice provided by or under the IDSS. Consequently, the IDSS establishes an "IDSS Universal Benchmark" from an amalgam of major indices which will serve as the benchmark for calculating fees on an annual basis. Under this system, if the "IDSS Universal Benchmark" was 4% for the year, and a user generated an 8% return, his/her fees would be some percentage of the 4% in incremental returns he/she generated presumably because of the IDSS.

The embodiments described herein include a method for generating a performance index, the method using a processor-based investment system. The method of an embodiment comprises generating a rank score for each investor relative to a plurality of investors of which the investor is a member, the generating of the rank score using investment data of a portfolio of the investor, wherein the portfolio comprises at least one investment position. The method of an embodiment comprises selecting a set of investors from the plurality of investors, the selecting based on the rank score of each investor of the plurality of investors. The method of an embodiment comprises generating the performance index to provide a measure of performance of top individual investors over time relative to a market index, the generating of the performance index comprising generating a composite portfolio comprising investment positions of each portfolio of each investor of the set of investors.

Generating the performance index of an embodiment comprises determining a portfolio weight for the portfolio of each investor, wherein the portfolio weight is relative to other investors of the set of investors.

Generating the performance index of an embodiment comprises determining an investment weight of each investment position in the portfolio of each investor, wherein the investment weight is relative to other investment positions in the portfolio.

Generating the performance index of an embodiment comprises determining a weight of each investment position in the performance index.

Determining the weight of each investment position in the performance index of an embodiment comprises forming a first quantity for each investment position in a portfolio of an investor by multiplying the portfolio weight of the portfolio by the investment weight of the investment position.

Determining the weight of each investment position in the performance index of an embodiment comprises summing across the portfolios of the set of investors the first quantity for all like investment positions.

The method of an embodiment comprises tracking performance of the set of investors for a period of time.

The method of an embodiment comprises periodically updating a composition of the performance index.

Periodically updating of an embodiment comprises accounting for changes to at least one of the portfolios and the set of investors.

Periodically updating of an embodiment comprises accounting for changes to contents of the portfolio of each investor of the set of investors.

Periodically updating of an embodiment comprises accounting for changes to investors in the set of investors.

The set of investors of an embodiment comprises the top N percentage of investors of the plurality of investors, wherein N is any number that is greater than zero.

The market index of an embodiment includes at least one of Standard and Poor's (S&P) 500 (S&P 500), Dow Jones Industrial Average (DJIA), and National Association of Securities Dealers Automated Operations (NASDAQ).

The performance index of an embodiment excludes transaction costs.

The performance index of an embodiment excludes taxes.

The performance index of an embodiment excludes brokerage commission.

The rank score of an embodiment ranks the investor relative to other investors based upon the investment data.

Generating the rank score of an embodiment comprises generating the rank score for each investor by combining a skill score, a persistence score and a confidence score corresponding to the investor.

The skill score of an embodiment represents an Information Ratio (IR) of the investor, wherein the IR represents active return on the investment position adjusted for risk.

The skill score of an embodiment represents an investing tenure of the investor.

The method of an embodiment comprises generating the skill score, wherein generating the skill score comprises calculating the IR of each investor.

Generating the skill score of an embodiment comprises identifying a minimum IR among the plurality of investors. Generating the skill score of an embodiment comprises generating a first interim score for each investor by subtracting the minimum IR from the IR of each investor.

Generating the skill score of an embodiment comprises identifying a maximum first interim score of the plurality of investors. Generating the skill score of an embodiment comprises generating a second interim score for each investor by dividing the first interim score by the maximum first interim score.

Generating the skill score of an embodiment comprises generating a base score for each investor by multiplying the second interim score by 100.

Generating the skill score of an embodiment comprises generating the skill score for each investor by applying a tenure factor to the base score.

The tenure factor of an embodiment comprises scales down the base score for each investor having an investing tenure equal to or less than two (2) years.

The tenure factor of an embodiment has a value of 1.0 when the investor has an investing tenure greater than two (2) years.

The tenure factor of an embodiment has a value determined by the formula $(0.2+0.7 \times \text{tenure}/1.75)$ when the investor has an investing tenure equal to or less than two (2) years.

The tenure factor of an embodiment has a value of 0.3 when the investor has an investing tenure less than three (3) months.

The skill score of an embodiment represents a Sharpe Ratio (SR) and an Information Ratio (IR) of the investor.

Generating the skill score of an embodiment comprises calculating the SR of each investor.

The SR of an investor of an embodiment comprises an average of an excess monthly return divided by a standard deviation of the excess monthly return.

Calculating the SR of an investor of an embodiment comprises calculating an excess monthly return for the investor for each month of a period.

Calculating the excess monthly return of an embodiment comprises subtracting a risk-free return from a monthly return.

The period of an embodiment comprises a past N years, wherein N is any number greater than zero.

Calculating the SR of an investor of an embodiment comprises calculating an average of the excess monthly return for the period.

Calculating the SR of an investor of an embodiment comprises calculating a standard deviation of the excess monthly return for the period.

Calculating the SR of an investor of an embodiment comprises dividing the average of the excess monthly return by the standard deviation of the excess monthly return.

Generating the skill score of an embodiment comprises calculating the IR of each investor.

The IR of an investor of an embodiment comprises an average of a weighted excess active monthly return divided by a standard deviation of the weighted excess active monthly return.

Calculating the IR of an investor of an embodiment comprises calculating an excess active monthly return for the investor for each month of a period.

Calculating the excess active monthly return of an embodiment comprises subtracting a benchmark return from a monthly return.

The method of an embodiment comprises receiving the benchmark return from a benchmark, the benchmark comprising at least one of Standard and Poor's (S&P) 500 (S&P 500), Dow Jones Industrial Average (DJIA), and National Association of Securities Dealers Automated Operations (NASDAQ).

The period of an embodiment comprises a past N years, wherein N is any number greater than zero.

Calculating the SR of an investor of an embodiment comprises calculating a weighted excess active monthly return by applying a weighting function to the excess active monthly return for the period.

The weighting function of an embodiment is an exponential function.

The weighting function of an embodiment is at least one of a constant, a linear function, and an exponential function.

Calculating the SR of an investor of an embodiment comprises calculating an average of un-weighted excess active monthly returns for the period.

Calculating the SR of an investor of an embodiment comprises calculating a standard deviation of the excess active monthly returns for the period.

Calculating the SR of an investor of an embodiment comprises dividing the weighted excess active monthly return by the standard deviation of the excess active monthly returns.

Generating the skill score of an embodiment comprises calculating a Final Ratio (FR) of each investor representing the IR and the SR of the investor.

Calculating the FR of each investor of an embodiment comprises calculating a weighted average of the IR and the SR.

Generating the skill score of an embodiment comprises normalizing the FR.

Normalizing the FR of an embodiment comprises identifying a minimum FR of the plurality of investors. Normalizing the FR of an embodiment comprises generating a first interim score for each investor by subtracting the minimum FR from the FR of each investor.

Normalizing the FR of an embodiment comprises identifying a maximum FR of the plurality of investors. Normalizing the FR of an embodiment comprises generating a second interim score for each investor by dividing the first interim score by the maximum FR.

Normalizing the FR of an embodiment comprises generating a base skill score for each investor by multiplying the second interim score by 100.

Generating the skill score of an embodiment comprises generating the skill score for each investor by applying a tenure factor to the base skill score.

The tenure factor of an embodiment has a value of 1.0 when the investor has an investing tenure greater than two (2) years.

The tenure factor of an embodiment has a value of 0.3 when the investor has an investing tenure less than three (3) months.

The method of an embodiment comprises generating the persistence score, wherein the persistence score represents skill of the investor relative to a benchmark.

Generating the persistence score of an embodiment comprises determining a winning score for each investor as a number of times the investor outperformed a benchmark. Generating the persistence score of an embodiment comprises calculating a mean for each investor using a number of trials, wherein the number of trials is a sum of a number of times the investor outperformed the benchmark and a number of times the investor failed to outperform the benchmark. Generating the persistence score of an embodiment comprises calculating a standard deviation of the number of trials for each investor. Generating the persistence score of an embodiment comprises calculating a distance from the mean for each investor as a first quantity divided by the standard deviation, wherein the first quantity is determined by subtracting the mean from the winning score. Generating the persistence score of an embodiment comprises generating a delta score for each investor by exponentiating the distance.

Generating the persistence score of an embodiment comprises identifying a minimum delta score among the delta scores of the plurality of investors. Generating the persistence score of an embodiment comprises generating a third interim score for each investor by subtracting the minimum delta score from the delta score of each investor. Generating the persistence score of an embodiment comprises identifying a maximum third interim score of the plurality of investors.

Generating the persistence score of an embodiment comprises generating a fourth interim score for each investor by dividing the third interim score of each investor by the maximum third interim score. Generating the persistence score of an embodiment comprises generating the persistence score for each investor by multiplying the fourth interim score by 100.

The method of an embodiment comprises generating the confidence score, wherein the confidence score represents an investment win percentage relative to an investment loss percentage.

Generating the confidence score of an embodiment comprises calculating a weighted average win percentage for a portfolio of each investor. Generating the confidence score of an embodiment comprises calculating a weighted average loss percentage for a portfolio of each investor. Generating the confidence score of an embodiment comprises generating the confidence score as a ratio of the weighted average win percentage to the weighted average loss percentage.

Calculating the weighted average win percentage of an embodiment comprises calculating a first quantity by multiplying a percentage of the investment position in the portfolio and a percentage gain for the investment position, wherein the first quantity is calculated for each period of time of a plurality of periods of time for which the investment position outperformed a benchmark. Calculating the weighted average win percentage of an embodiment comprises calculating a second quantity by summing each first quantity for all periods of time of the plurality of periods of time for which the investment position outperformed the benchmark. Calculating the weighted average win percentage of an embodiment comprises calculating the weighted average win percentage by dividing the second quantity by a total number of investment positions that outperformed the benchmark.

Calculating the weighted average loss percentage of an embodiment comprises calculating a third quantity by multiplying a percentage of the investment position in the portfolio and a percentage loss for the investment position, wherein the third quantity is calculated for each period of time of a plurality of periods of time for which the investment position underperformed a benchmark. Calculating the weighted average loss percentage of an embodiment comprises calculating a fourth quantity by summing each third quantity for all periods of time of the plurality of periods of time for which the investment position underperformed the benchmark. Calculating the weighted average loss percentage of an embodiment comprises calculating the weighted average loss percentage by dividing the third quantity by a total number of investment positions that underperformed the benchmark.

The method of an embodiment comprises establishing a portfolio value for the portfolio at a time when the investment position is entered. The method of an embodiment comprises using the portfolio value to establish the percentage gain and the percentage loss.

The method of an embodiment comprises generating the confidence score for each trade during each period of time of a plurality of periods of time.

The method of an embodiment comprises normalizing the confidence score such that the confidence score is in a range of zero (0) to 100.

The confidence score of an embodiment represents for each investor a magnitude of outperforming a benchmark when the investment position outperforms relative to a magnitude of failing to outperform the benchmark when the investment position underperforms.

Generating the rank score of an embodiment comprises generating a weighted average of the skill score, the persistence score and the confidence score.

Generating the rank score of an embodiment comprises forming a skill component by multiplying the skill score by a first weight. Generating the rank score of an embodiment comprises forming a persistence component by multiplying the persistence score by a second weight. Generating the rank score of an embodiment comprises forming a confidence component by multiplying the confidence score by a third weight. Generating the rank score of an embodiment comprises calculating the rank score by summing the skill component, the persistence component and the confidence component.

A sum of the first weight, the second weight and the third weight of an embodiment equals one (1).

The method of an embodiment comprises classifying each investor by the rank score of the investor.

The method of an embodiment comprises receiving investment data of at least one of each investor and the investment position.

The investment data of an embodiment includes historical data and real-time data.

The real-time data of an embodiment comprises trade data of the investment position.

The investment position of an embodiment includes at least one of a security, a mutual fund, and an ETF.

Embodiments described herein include a method for generating a performance index, the method using a processor-based investment system. The method of an embodiment comprises generating a rank score for each investor relative to a plurality of investors of which the investor is a member, the rank score comprising at least one of a skill score, a persistence score and a confidence score of the investor. The method of an embodiment comprises selecting a set of investors from the plurality of investors based on the rank score. The method of an embodiment comprises generating the performance index to provide a measure of performance of investors over time relative to a market index, the generating of the performance index comprising generating a composite portfolio comprising investment positions of each portfolio of each investor of the set of investors.

Embodiments described herein include a system comprising: a processor; a ranking component executing under the processor, the ranking component generating a rank score for each investor relative to a plurality of investors of which the investor is a member, the generating of the rank score using investment data of a portfolio of the investor, wherein the portfolio comprises at least one investment position; a performance index component executing under the processor, the performance index component selecting a set of investors from the plurality of investors, the selecting based on the rank score of each investor of the plurality of investors, the performance index component generating the performance index to provide a measure of performance of top individual investors over time relative to a market index, the generating of the performance index comprising generating a composite portfolio comprising investment positions of each portfolio of each investor of the set of investors.

Generating of the performance index of an embodiment comprises determining a portfolio weight for the portfolio of each investor, wherein the portfolio weight is relative to other investors of the set of investors.

Generating of the performance index of an embodiment comprises determining an investment weight of each investment position in the portfolio of each investor, wherein the investment weight is relative to other investment positions in the portfolio.

Generating of the performance index of an embodiment comprises determining a weight of each investment position in the performance index.

Determining of the weight of each investment position in the performance index of an embodiment comprises forming a first quantity for each investment position in a portfolio of an investor by multiplying the portfolio weight of the portfolio by the investment weight of the investment position.

Determining of the weight of each investment position in the performance index of an embodiment comprises summing across the portfolios of the set of investors the first quantity for all like investment positions.

The performance index component of an embodiment periodically updates a composition of the performance index.

The periodically updating of an embodiment comprises accounting for changes to at least one of the portfolios and the set of investors.

The periodically updating of an embodiment comprises accounting for changes to at least one of contents of the portfolio of each investor of the set of investors and accounting for changes to investors in the set of investors.

The rank score of an embodiment ranks the investor relative to other investors based upon the investment data, wherein generating the rank score comprises generating the rank score for each investor by combining a skill score, a persistence score and a confidence score corresponding to the investor.

The skill score of an embodiment represents an Information Ratio (IR) of the investor, wherein the IR represents active return on the investment position adjusted for risk.

The skill score of an embodiment represents a Sharpe Ratio (SR) and an Information Ratio (IR) of the investor.

The system of an embodiment comprises generating the skill score, wherein generating the skill score comprises calculating the SR of each investor, wherein the SR of an investor comprises an average of an excess monthly return divided by a standard deviation of the excess monthly return.

Generating the skill score of an embodiment comprises calculating the IR of each investor, wherein the IR of an investor comprises an average of a weighted excess active monthly return divided by a standard deviation of the weighted excess active monthly return.

Generating the skill score of an embodiment comprises calculating a Final Ratio (FR) of each investor representing the IR and the SR of the investor, wherein calculating the FR of each investor comprises calculating a weighted average of the IR and the SR, wherein generating the skill score comprises normalizing the FR.

The system of an embodiment comprises generating the persistence score, wherein the persistence score represents skill of the investor relative to a benchmark.

Generating the persistence score of an embodiment comprises determining a winning score for each investor as a number of times the investor outperformed a benchmark. Generating the persistence score of an embodiment comprises calculating a mean for each investor using a number of trials, wherein the number of trials is a sum of a number of times the investor outperformed the benchmark and a number of times the investor failed to outperform the benchmark. Generating the persistence score of an embodiment comprises calculating a standard deviation of the number of trials for each investor. Generating the persistence score of an embodiment comprises calculating a distance from the mean for each investor as a first quantity divided by the standard deviation, wherein the first quantity is determined by subtracting the mean from the winning score. Generating the persistence score of an embodiment comprises generating a delta score for each investor by exponentiating the distance.

Generating the persistence score of an embodiment comprises identifying a minimum delta score among the delta scores of the plurality of investors. Generating the persistence score of an embodiment comprises generating a third interim score for each investor by subtracting the minimum delta score from the delta score of each investor. Generating the persistence score of an embodiment comprises identifying a maximum third interim score of the plurality of investors. Generating the persistence score of an embodiment comprises generating a fourth interim score for each investor by dividing the third interim score of each investor by the maximum third interim score. Generating the persistence score of an embodiment comprises generating the persistence score for each investor by multiplying the fourth interim score by 100.

The system of an embodiment comprises generating the confidence score, wherein the confidence score represents an investment win percentage relative to an investment loss percentage.

Generating the confidence score of an embodiment comprises calculating a weighted average win percentage for a portfolio of each investor. Generating the confidence score of an embodiment comprises calculating a weighted average loss percentage for a portfolio of each investor. Generating the confidence score of an embodiment comprises generating the confidence score as a ratio of the weighted average win percentage to the weighted average loss percentage.

Calculating the weighted average win percentage of an embodiment comprises calculating a first quantity by multiplying a percentage of the investment position in the portfolio and a percentage gain for the investment position, wherein the first quantity is calculated for each period of time of a plurality of periods of time for which the investment position outperformed a benchmark. Calculating the weighted average win percentage of an embodiment comprises calculating a second quantity by summing each first quantity for all periods of time of the plurality of periods of time for which the investment position outperformed the benchmark. Calculating the weighted average win percentage of an embodiment comprises calculating the weighted average win percentage by dividing the second quantity by a total number of investment positions that outperformed the benchmark.

Calculating the weighted average loss percentage of an embodiment comprises calculating a third quantity by multiplying a percentage of the investment position in the portfolio and a percentage loss for the investment position, wherein the third quantity is calculated for each period of time of a plurality of periods of time for which the investment position underperformed a benchmark. Calculating the weighted average loss percentage of an embodiment comprises calculating a fourth quantity by summing each third quantity for all periods of time of the plurality of periods of time for which the investment position underperformed the benchmark. Calculating the weighted average loss percentage of an embodiment comprises calculating the weighted average loss percentage by dividing the third quantity by a total number of investment positions that underperformed the benchmark.

The system of an embodiment comprises establishing a portfolio value for the portfolio at a time when the investment position is entered. The system of an embodiment comprises using the portfolio value to establish the percentage gain and the percentage loss.

The system of an embodiment comprises generating the confidence score for each trade during each period of time of a plurality of periods of time.

Generating the rank score of an embodiment comprises generating a weighted average of the skill score, the persistence score and the confidence score.

Generating the rank score of an embodiment comprises forming a skill component by multiplying the skill score by a first weight. Generating the rank score of an embodiment comprises forming a persistence component by multiplying the persistence score by a second weight. Generating the rank score of an embodiment comprises forming a confidence component by multiplying the confidence score by a third weight. Generating the rank score of an embodiment comprises calculating the rank score by summing the skill component, the persistence component and the confidence component.

The system of an embodiment comprises classifying each investor by the rank score of the investor.

The system of an embodiment comprises receiving investment data of at least one of each investor and the investment position, wherein the investment data includes historical data and real-time data, wherein the real-time data comprises trade data of the investment position.

Embodiments described herein include a method comprising forming an electronic network between a plurality of investors, wherein the electronic network includes a coupling to portfolios and online brokerage accounts of the plurality of investors. The method of an embodiment comprises sharing between the plurality of investors via the electronic network at least one of investment data and brokerage data, wherein the investment data comprises data of the portfolios, wherein a portfolio comprises at least one investment position, wherein the brokerage data comprises data of the brokerage accounts. The method of an embodiment comprises executing a first action involving an investment position in at least one of a first portfolio and a first brokerage account of a first investor of the plurality of investors, wherein the executing is in response to the at least one of the investment data and brokerage data indicating a second action taken in at least one of a second portfolio and a second brokerage account of at least one second investor of the plurality of investors.

Executing of the first action of an embodiment comprises receiving an automatic notification of the second action taken in the second portfolio.

Executing of the first action of an embodiment comprises, in response to the notification, presenting an action option to the first investor of taking the first action in the first portfolio.

Executing of the first action of an embodiment comprises, in response to the notification, presenting an action option to the first investor of taking the first action in the first brokerage account.

Executing of the first action of an embodiment comprises, in response to the notification, automatically taking the first action in the first portfolio.

Executing of the first action of an embodiment comprises, in response to the notification, automatically taking the first action in the first brokerage account.

The second action of an embodiment involves a second investment position that is equivalent to the first investment position.

The second action of an embodiment involves a second investment position that is identical to the first investment position.

The first action of an embodiment is equivalent to the second action.

The first action of an embodiment is different than the second action.

The first action of an embodiment is proportional to the second action.

The first action of an embodiment is a trade involving the investment position.

The executing of an embodiment comprises automatically issuing a command to a broker to initiate authentication of the trade, wherein the broker controls the brokerage account.

The executing of an embodiment comprises automatically issuing a command to execute the trade.

The executing of an embodiment comprises periodically issuing a command to check status of the trade.

The executing of an embodiment comprises automatically issuing a notification message to the investor upon completion of the trade.

The executing of an embodiment comprises automatically issuing a status message to the investor advising of status of the trade.

The first action of an embodiment is a transaction option, wherein the transaction option includes at least one of a buy option and a sell option corresponding to an investment position.

The first action of an embodiment is a transaction recommendation, wherein the transaction recommendation includes at least one of a buy recommendation and a sell recommendation corresponding to an investment position.

The second action of an embodiment is change in a rating of the investment position.

The second action of an embodiment is a change in value of the investment position.

The second action of an embodiment is a trade involving the investment position.

The method of an embodiment comprises aggregating the investment data of the portfolios and the online brokerage accounts.

The method of an embodiment comprises aggregating the investment data of the portfolios.

The method of an embodiment comprises aggregating the investment data to include data of the online brokerage accounts.

The method of an embodiment comprises ranking each investor relative to every other investor of the plurality of investors using a rank score, the ranking according to investment performance derived from the investment data.

The rank score of an embodiment ranks the investor relative to other investors based upon the investment data, wherein generating the rank score comprises generating the rank score for each investor by combining a skill score, a persistence score and a confidence score corresponding to the investor.

The skill score of an embodiment represents a Sharpe Ratio (SR) and an Information Ratio (IR) of the investor.

The method of an embodiment comprises generating the skill score, wherein generating the skill score comprises calculating the SR of each investor, wherein the SR of an investor comprises an average of an excess monthly return divided by a standard deviation of the excess monthly return.

Generating the skill score of an embodiment comprises calculating the IR of each investor, wherein the IR of an investor comprises an average of a weighted excess active monthly return divided by a standard deviation of the weighted excess active monthly return.

Generating the skill score of an embodiment comprises calculating a Final Ratio (FR) of each investor representing the IR and the SR of the investor, wherein calculating the FR of each investor comprises calculating a weighted average of the IR and the SR, wherein generating the skill score comprises normalizing the FR.

The method of an embodiment comprises generating the persistence score, wherein the persistence score represents skill of the investor relative to a benchmark.

Generating the persistence score of an embodiment comprises determining a winning score for each investor as a number of times the investor outperformed a benchmark. Generating the persistence score of an embodiment comprises calculating a mean for each investor using a number of trials, wherein the number of trials is a sum of a number of times the investor outperformed the benchmark and a number of times the investor failed to outperform the benchmark. Generating the persistence score of an embodiment comprises calculating a standard deviation of the number of trials for each investor. Generating the persistence score of an embodiment comprises calculating a distance from the mean for each investor as a first quantity divided by the standard deviation, wherein the first quantity is determined by subtracting the mean from the winning score. Generating the persistence score of an embodiment comprises generating a delta score for each investor by exponentiating the distance.

Generating the persistence score of an embodiment comprises identifying a minimum delta score among the delta scores of the plurality of investors. Generating the persistence score of an embodiment comprises generating a third interim score for each investor by subtracting the minimum delta score from the delta score of each investor. Generating the persistence score of an embodiment comprises identifying a maximum third interim score of the plurality of investors. Generating the persistence score of an embodiment comprises generating a fourth interim score for each investor by dividing the third interim score of each investor by the maximum third interim score. Generating the persistence score of an embodiment comprises generating the persistence score for each investor by multiplying the fourth interim score by 100.

The method of an embodiment comprises generating the confidence score, wherein the confidence score represents an investment win percentage relative to an investment loss percentage.

Generating the confidence score of an embodiment comprises calculating a weighted average win percentage for a portfolio of each investor. Generating the confidence score of an embodiment comprises calculating a weighted average loss percentage for a portfolio of each investor. Generating the confidence score of an embodiment comprises generating the confidence score as a ratio of the weighted average win percentage to the weighted average loss percentage.

Calculating the weighted average win percentage of an embodiment comprises calculating a first quantity by multiplying a percentage of the investment position in the portfolio and a percentage gain for the investment position, wherein the first quantity is calculated for each period of time of a plurality of periods of time for which the investment position outperformed a benchmark. Calculating the weighted average win percentage of an embodiment comprises calculating a second quantity by summing each first quantity for all periods of time of the plurality of periods of time for which the investment position outperformed the benchmark. Calculating the weighted average win percentage of an embodiment comprises calculating the weighted average win percentage by dividing the second quantity by a total number of investment positions that outperformed the benchmark.

Calculating the weighted average loss percentage of an embodiment comprises calculating a third quantity by multiplying a percentage of the investment position in the portfolio and a percentage loss for the investment position, wherein the third quantity is calculated for each period of time of a plurality of periods of time for which the investment position underperformed a benchmark. Calculating the weighted average loss percentage of an embodiment comprises calculating a fourth quantity by summing each third quantity for all periods of time of the plurality of periods of time for which the investment position underperformed the benchmark. Calculating the weighted average loss percentage of an embodiment comprises calculating the weighted average loss percentage by dividing the third quantity by a total number of investment positions that underperformed the benchmark.

The method of an embodiment comprises establishing a portfolio value for the portfolio at a time when the investment position is entered. The method of an embodiment comprises using the portfolio value to establish the percentage gain and the percentage loss.

The method of an embodiment comprises generating the confidence score for each trade during each period of time of a plurality of periods of time.

Generating the rank score of an embodiment comprises generating a weighted average of the skill score, the persistence score and the confidence score.

Generating the rank score of an embodiment comprises forming a skill component by multiplying the skill score by a first weight. Generating the rank score of an embodiment comprises forming a persistence component by multiplying the persistence score by a second weight. Generating the rank score of an embodiment comprises forming a confidence component by multiplying the confidence score by a third weight. Generating the rank score of an embodiment comprises calculating the rank score by summing the skill component, the persistence component and the confidence component.

The method of an embodiment comprises generating security ratings for securities held by the plurality of investors using the ranking and the investment data.

Generating the security ratings of an embodiment comprises identifying a set of investors corresponding to each investment position of a plurality of investment positions, wherein each investor of the set of investors owns the investment position. Generating the security ratings of an embodiment comprises for each set of investors, generating the rank score for each investor, the rank score categorizing the investors for a time period of a plurality of time periods. Generating the security ratings of an embodiment comprises for each set of investors, generating an average rank score for the period of time. Generating the security ratings of an embodiment comprises for each set of investors, generating a trailing rank score by averaging the rank scores across the plurality of periods of time. Generating the security ratings of an embodiment comprises generating a stock rating score for each investment position by combining the average rank score and the trailing rank score of the set of investors corresponding to the investment position.

The first action of an embodiment comprises generating customized recommendations corresponding to the investment position in the at least one of the first portfolio and the first brokerage account of the first investor, the customized recommendations considering at least one of investment performance derived from the investment data, the rankings, and the security ratings.

The investment data of an embodiment comprises data of current investment holdings, historical investment holdings, historical investment performance data, historical transactional data, and watch lists.

Embodiments described herein include a method comprising electronically linking an investment platform to a plurality of investors, a plurality of brokerage accounts of the plurality of investors, and a plurality of portfolios of the plurality of investors, wherein a portfolio comprises at least one investment position. The method of an embodiment comprises sharing between the plurality of investors via the investment platform at least one of portfolio data of the plurality of portfolios and brokerage data of the plurality of brokerage accounts. The method of an embodiment comprises automatically conducting operations involving at least one of the plurality of portfolios and the plurality of brokerage accounts in response to at least one of the portfolio data and the brokerage data.

Embodiments described herein include a method comprising electronically linking an investment platform to a plurality of investors, a plurality of brokerage accounts of the plurality of investors, and a plurality of portfolios of the plurality of investors, wherein a portfolio comprises at least one investment position. The method of an embodiment comprises sharing between the plurality of investors via the investment platform at least one of portfolio data of the plurality of portfolios and brokerage data of the plurality of brokerage accounts. The method of an embodiment comprises automatically conducting operations in at least one of the plurality of portfolios and the plurality of brokerage accounts in response to at least one of the portfolio data and the brokerage data.

Embodiments described herein include an investment system comprising a processor and a plurality of couplings between the processor and a plurality of investors, a plurality of brokerage accounts of the plurality of investors, and a plurality of portfolios of the plurality of investors, wherein a portfolio comprises at least one investment position, the processor sharing at least one of portfolio data of the plurality of portfolios and brokerage data of the plurality of brokerage accounts among the plurality of investors the processor automatically conducting operations involving at least one of the plurality of portfolios and the plurality of brokerage accounts in response to at least one of the portfolio data and the brokerage data.

Embodiments described herein include a system comprising a processor coupled to a trading application programming interface (API), wherein the trading API is coupled to portfolios and online brokerage accounts of a plurality of investors, the processor sharing between the plurality of investors via the electronic network at least one of investment data and brokerage data, wherein the investment data comprises data of the portfolios, wherein a portfolio comprises at least one investment position, wherein the brokerage data comprises data of the brokerage accounts, the trading API executing a first action involving an investment position in at least one of a first portfolio and a first brokerage account of a first investor of the plurality of investors, wherein the executing is in response to the at least one of the investment data and brokerage data indicating a second action taken in at least one of a second portfolio and a second brokerage account of at least one second investor of the plurality of investors.

The trading API executing the first action of an embodiment comprises receiving an automatic notification of the second action taken in the second portfolio.

The trading API executing the first action of an embodiment comprises, in response to the notification, presenting an action option to the first investor of taking the first action in the first portfolio.

The trading API executing the first action of an embodiment comprises, in response to the notification, presenting an action option to the first investor of taking the first action in the first brokerage account.

The trading API executing the first action of an embodiment comprises, in response to the notification, automatically taking the first action in the first portfolio.

The trading API executing the first action of an embodiment comprises, in response to the notification, automatically taking the first action in the first brokerage account.

The second action of an embodiment involves a second investment position that is equivalent to the first investment position.

The second action of an embodiment involves a second investment position that is identical to the first investment position.

The first action of an embodiment is equivalent to the second action.

The first action of an embodiment is different than the second action.

The first action of an embodiment is proportional to the second action.

The first action of an embodiment is a trade involving the investment position.

The executing of an embodiment comprises automatically issuing a command to a broker to initiate authentication of the trade, wherein the broker controls the brokerage account.

The executing of an embodiment comprises automatically issuing a command to execute the trade.

The executing of an embodiment comprises periodically issuing a command to check status of the trade.

The executing of an embodiment comprises automatically issuing a notification message to the investor upon completion of the trade.

The executing of an embodiment comprises automatically issuing a status message to the investor advising of status of the trade.

The first action of an embodiment is a transaction option, wherein the transaction option includes at least one of a buy option and a sell option corresponding to an investment position.

The first action of an embodiment is a transaction recommendation, wherein the transaction recommendation includes at least one of a buy recommendation and a sell recommendation corresponding to an investment position.

The second action of an embodiment is change in a rating of the investment position.

The second action of an embodiment is a change in value of the investment position.

The second action of an embodiment is a trade involving the investment position.

The processor of an embodiment aggregates the investment data of the portfolios and the online brokerage accounts.

The processor of an embodiment aggregates the investment data of the portfolios.

The processor of an embodiment aggregates the investment data to include data of the online brokerage accounts.

Aspects of the IDSS described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the IDSS include: microcontrollers with memory (such as electronically erasable programmable read only memory (EEPROM)), embedded microprocessors, firmware, software, etc. Furthermore, aspects of the IDSS may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the IDSS is not intended to be exhaustive or to limit the systems and methods to the precise forms disclosed. While specific embodiments of, and examples for, the IDSS are described herein for illustrative purposes, various equivalent modifications are possible within the scope of the systems and methods, as those skilled in the relevant art will recognize. The teachings of the IDSS provided herein can be applied to other systems and methods, not only for the systems and methods described above.

The elements and acts of the various embodiments described above can be combined to provide further embodiments. These and other changes can be made to the IDSS in light of the above detailed description.

In general, in the following claims, the terms used should not be construed to limit the IDSS to the specific embodiments disclosed in the specification and the claims, but should be construed to include all systems that operate under the claims. Accordingly, the IDSS is not limited by the disclosure, but instead the scope of the IDSS is to be determined entirely by the claims.

While certain aspects of the IDSS are presented below in certain claim forms, the inventors contemplate the various aspects of the IDSS in any number of claim forms. Accordingly, the inventors reserve the right to add additional claims after filing the application to pursue such additional claim forms for other aspects of the IDSS.

What is claimed is:

1. A method for generating a performance index, the method using a processor-based investment system, the method comprising:
generating, by an automated programmed computer, a rank score for each investor relative to a plurality of investors of which the investor is a member, the generating of the rank score using investment data of a portfolio of the investor, wherein the portfolio comprises at least one investment position;
selecting a set of investors from the plurality of investors, the selecting based on the rank score of each investor of the plurality of investors; and
generating the performance index to provide a measure of performance of top individual investors over time relative to a market index, the generating of the performance index comprising generating a composite portfolio comprising investment positions of each portfolio of each investor of the set of investors; wherein the generating of the performance index comprises determining a portfolio weight for the portfolio of each investor of the set of investors, wherein each portfolio weight is proportional to the rank score of the corresponding investor relative to other investors of the set of investors.

2. The method of claim 1, wherein the generating of the performance index comprises determining an investment weight of each investment position in the portfolio of each investor, wherein the investment weight is relative to other investment positions in the portfolio.

3. The method of claim 2, wherein the generating of the performance index comprises determining a weight of each investment position in the performance index.

4. The method of claim 3, wherein the determining of the weight of each investment position in the performance index comprises forming a first quantity for each investment position in a portfolio of an investor by multiplying the portfolio weight of the portfolio by the investment weight of the investment position.

5. The method of claim 4, wherein the determining of the weight of each investment position in the performance index comprises summing across the portfolios of the set of investors the first quantity for all like investment positions.

6. The method of claim 1, comprising tracking performance of the set of investors for a period of time.

7. The method of claim 1, comprising periodically updating a composition of the performance index.

8. The method of claim 7, wherein the periodically updating comprises accounting for changes to at least one of the portfolios and the set of investors.

9. The method of claim 7, wherein the periodically updating comprises accounting for changes to contents of the portfolio of each investor of the set of investors.

10. The method of claim 7, wherein the periodically updating comprises accounting for changes to investors in the set of investors.

11. The method of claim 1, wherein the set of investors comprises the top N percentage of investors of the plurality of investors, wherein N is any number that is greater than zero.

12. The method of claim 1, wherein the market index includes at least one of Standard and Poor's (S&P) 500 (S&P 500), Dow Jones Industrial Average (DJIA), and National Association of Securities Dealers Automated Operations (NASDAQ).

13. The method of claim 1, wherein the performance index excludes transaction costs.

14. The method of claim 1, wherein the performance index excludes taxes.

15. The method of claim 1, wherein the performance index excludes brokerage commission.

16. The method of claim 1, wherein the rank score ranks the investor relative to other investors based upon the investment data.

17. The method of claim 1, wherein generating the rank score comprises generating the rank score for each investor by combining a skill score, a persistence score and a confidence score corresponding to the investor.

18. The method of claim 17, wherein the skill score represents an Information Ratio (IR) of the investor, wherein the IR represents active return on the investment position adjusted for risk.

19. The method of claim 17, wherein the skill score represents an investing tenure of the investor.

20. The method of claim 17, comprising generating the skill score, wherein generating the skill score comprises calculating the IR of each investor.

21. The method of claim 20, wherein generating the skill score comprises:
identifying a minimum IR among the plurality of investors;
generating a first interim score for each investor by subtracting the minimum IR from the IR of each investor.

22. The method of claim 21, wherein generating the skill score comprises:
identifying a maximum first interim score of the plurality of investors;
generating a second interim score for each investor by dividing the first interim score by the maximum first interim score.

23. The method of claim 22, wherein generating the skill score comprises generating a base score for each investor by multiplying the second interim score by 100.

24. The method of claim 23, wherein generating the skill score comprises generating the skill score for each investor by applying a tenure factor to the base score.

25. The method of claim 24, wherein the tenure factor scales down the base score for each investor having an investing tenure equal to or less than two (2) years.

26. The method of claim 24, wherein the tenure factor has a value of 1.0 when the investor has an investing tenure greater than two (2) years.

27. The method of claim 24, wherein the tenure factor has a value determined by the formula $(0.2+0.7*tenure/1.75)$ when the investor has an investing tenure equal to or less than two (2) years.

28. The method of claim 24, wherein the tenure factor has a value of 0.3 when the investor has an investing tenure less than three (3) months.

29. The method of claim 17, wherein the skill score represents a Sharpe Ratio (SR) and an Information Ratio (IR) of the investor.

30. The method of claim 29, wherein generating the skill score comprises calculating the SR of each investor.

31. The method of claim 30, wherein the SR of an investor comprises an average of an excess monthly return divided by a standard deviation of the excess monthly return.

32. The method of claim 30, wherein calculating the SR of an investor comprises calculating an excess monthly return for the investor for each month of a period.

33. The method of claim 32, wherein calculating the excess monthly return comprises subtracting a risk-free return from a monthly return.

34. The method of claim 32, wherein the period comprises a past N years, wherein N is any number greater than zero.

35. The method of claim 32, wherein calculating the SR of an investor comprises calculating an average of the excess monthly return for the period.

36. The method of claim 35, wherein calculating the SR of an investor comprises calculating a standard deviation of the excess monthly return for the period.

37. The method of claim 36, wherein calculating the SR of an investor comprises dividing the average of the excess monthly return by the standard deviation of the excess monthly return.

38. The method of claim 30, wherein generating the skill score comprises calculating the IR of each investor.

39. The method of claim 38, wherein the IR of an investor comprises an average of a weighted excess active monthly return divided by a standard deviation of the weighted excess active monthly return.

40. The method of claim 38, wherein calculating the IR of an investor comprises calculating an excess active monthly return for the investor for each month of a period.

41. The method of claim 40, wherein calculating the excess active monthly return comprises subtracting a benchmark return from a monthly return.

42. The method of claim 41, comprising receiving the benchmark return from a benchmark, the benchmark comprising at least one of Standard and Poor's (S&P) 500 (S&P 500), Dow Jones Industrial Average (DJIA), and National Association of Securities Dealers Automated Operations (NASDAQ).

43. The method of claim 40, wherein the period comprises a past N years, wherein N is any number greater than zero.

44. The method of claim 40, wherein calculating the SR of an investor comprises calculating a weighted excess active monthly return by applying a weighting function to the excess active monthly return for the period.

45. The method of claim 44, wherein the weighting function is an exponential function.

46. The method of claim 44, wherein the weighting function is at least one of a constant, a linear function, and an exponential function.

47. The method of claim 44, wherein calculating the SR of an investor comprises calculating an average of un-weighted excess active monthly returns for the period.

48. The method of claim 47, wherein calculating the SR of an investor comprises calculating a standard deviation of the excess active monthly returns for the period.

49. The method of claim 48, wherein calculating the SR of an investor comprises dividing the weighted excess active monthly return by the standard deviation of the excess active monthly returns.

50. The method of claim 38, wherein generating the skill score comprises calculating a Final Ratio (FR) of each investor representing the IR and the SR of the investor.

51. The method of claim 50, wherein calculating the FR of each investor comprises calculating a weighted average of the IR and the SR.

52. The method of claim 51, wherein generating the skill score comprises normalizing the FR.

53. The method of claim 52, wherein normalizing the FR comprises:
identifying a minimum FR of the plurality of investors;
generating a first interim score for each investor by subtracting the minimum FR from the FR of each investor.

54. The method of claim 53, wherein normalizing the FR comprises:
identifying a maximum FR of the plurality of investors;
generating a second interim score for each investor by dividing the first interim score by the maximum FR.

55. The method of claim 54, wherein normalizing the FR comprises generating a base skill score for each investor by multiplying the second interim score by 100.

56. The method of claim 55, wherein generating the skill score comprises generating the skill score for each investor by applying a tenure factor to the base skill score.

57. The method of claim 56, wherein the tenure factor has a value of 1.0 when the investor has an investing tenure greater than two (2) years.

58. The method of claim 56, wherein the tenure factor has a value of 0.3 when the investor has an investing tenure less than three (3) months.

59. The method of claim 17, comprising generating the persistence score, wherein the persistence score represents skill of the investor relative to a benchmark.

60. The method of claim 59, wherein generating the persistence score comprises:
determining a winning score for each investor as a number of times the investor outperformed a benchmark;
calculating a mean for each investor using a number of trials, wherein the number of trials is a sum of a number of times the investor outperformed the benchmark and a number of times the investor failed to outperform the benchmark;
calculating a standard deviation of the number of trials for each investor;
calculating a distance from the mean for each investor as a first quantity divided by the standard deviation, wherein the first quantity is determined by subtracting the mean from the winning score;
generating a delta score for each investor by exponentiating the distance.

61. The method of claim 60, wherein generating the persistence score comprises:
identifying a minimum delta score among the delta scores of the plurality of investors;
generating a third interim score for each investor by subtracting the minimum delta score from the delta score of each investor;
identifying a maximum third interim score of the plurality of investors;
generating a fourth interim score for each investor by dividing the third interim score of each investor by the maximum third interim score;
generating the persistence score for each investor by multiplying the fourth interim score by 100.

62. The method of claim 17, comprising generating the confidence score, wherein the confidence score represents an investment win percentage relative to an investment loss percentage.

63. The method of claim 62, wherein generating the confidence score comprises:
calculating a weighted average win percentage for a portfolio of each investor;

calculating a weighted average loss percentage for a portfolio of each investor;
generating the confidence score as a ratio of the weighted average win percentage to the weighted average loss percentage.

64. The method of claim 63, wherein calculating the weighted average win percentage comprises:
calculating a first quantity by multiplying a percentage of the investment position in the portfolio and a percentage gain for the investment position, wherein the first quantity is calculated for each period of time of a plurality of periods of time for which the investment position outperformed a benchmark;
calculating a second quantity by summing each first quantity for all periods of time of the plurality of periods of time for which the investment position outperformed the benchmark;
calculating the weighted average win percentage by dividing the second quantity by a total number of investment positions that outperformed the benchmark.

65. The method of claim 64, wherein calculating the weighted average loss percentage comprises:
calculating a third quantity by multiplying a percentage of the investment position in the portfolio and a percentage loss for the investment position, wherein the third quantity is calculated for each period of time of a plurality of periods of time for which the investment position underperformed a benchmark;
calculating a fourth quantity by summing each third quantity for all periods of time of the plurality of periods of time for which the investment position underperformed the benchmark;
calculating the weighted average loss percentage by dividing the third quantity by a total number of investment positions that underperformed the benchmark.

66. The method of claim 65, comprising:
establishing a portfolio value for the portfolio at a time when the investment position is entered;
using the portfolio value to establish the percentage gain and the percentage loss.

67. The method of claim 63, comprising generating the confidence score for each trade during each period of time of a plurality of periods of time.

68. The method of claim 63, comprising normalizing the confidence score such that the confidence score is in a range of zero (0) to 100.

69. The method of claim 17, wherein the confidence score represents for each investor a magnitude of outperforming a benchmark when the investment position outperforms relative to a magnitude of failing to outperform the benchmark when the investment position underperforms.

70. The method of claim 17, wherein generating the rank score comprises generating a weighted average of the skill score, the persistence score and the confidence score.

71. The method of claim 70, wherein generating the rank score comprises:
forming a skill component by multiplying the skill score by a first weight;
forming a persistence component by multiplying the persistence score by a second weight;
forming a confidence component by multiplying the confidence score by a third weight;
calculating the rank score by summing the skill component, the persistence component and the confidence component.

72. The method of claim 71, wherein a sum of the first weight, the second weight and the third weight equals one (1).

73. The method of claim 1, comprising classifying each investor by the rank score of the investor.

74. The method of claim 1, comprising receiving investment data of at least one of each investor and the investment position.

75. The method of claim 74, wherein the investment data includes historical data and real-time data.

76. The method of claim 75, wherein the real-time data comprises trade data of the investment position.

77. The method of claim 1, wherein the investment position includes at least one of a security, a mutual fund, and an ETF.

78. A method for generating a performance index, the method using a processor-based investment system, the method comprising:
generating, by an automated programmed computer, a rank score for each investor relative to a plurality of investors of which the investor is a member, the rank score comprising at least one of a skill score, a persistence score and a confidence score of the investor;
selecting a set of investors from the plurality of investors based on the rank score;
generating the performance index to provide a measure of performance of investors over time relative to a market index, the generating of the performance index comprising generating a composite portfolio comprising investment positions of each portfolio of each investor of the set of investors; wherein the generating of the performance index comprises determining a portfolio weight for the portfolio of each investor of the set of investors, wherein each portfolio weight is proportional to the rank score of the corresponding investor relative to other investors of the set of investors.

79. A system comprising:
a processor;
a ranking component executing under the processor, the ranking component generating a rank score for each investor relative to a plurality of investors of which the investor is a member, the generating of the rank score using investment data of a portfolio of the investor, wherein the portfolio comprises at least one investment position;
a performance index component executing under the processor, the performance index component selecting a set of investors from the plurality of investors, the selecting based on the rank score of each investor of the plurality of investors, the performance index component generating the performance index to provide a measure of performance of top individual investors over time relative to a market index, the generating of the performance index comprising generating a composite portfolio comprising investment positions of each portfolio of each investor of the set of investors, wherein the generating of the performance index comprises determining a portfolio weight for the portfolio of each investor of the set of investors wherein each portfolio weight is proportional to the rank score of the corresponding investor relative to other investors of the set of investors.

80. The system of claim 79, wherein the generating of the performance index comprises determining an investment weight of each investment position in the portfolio of each investor, wherein the investment weight is relative to other investment positions in the portfolio.

81. The system of claim 80, wherein the generating of the performance index comprises determining a weight of each investment position in the performance index.

82. The system of claim 81, wherein the determining of the weight of each investment position in the performance index comprises forming a first quantity for each investment position in a portfolio of an investor by multiplying the portfolio weight of the portfolio by the investment weight of the investment position.

83. The system of claim 82, wherein the determining of the weight of each investment position in the performance index comprises summing across the portfolios of the set of investors the first quantity for all like investment positions.

84. The system of claim 79, wherein the performance index component periodically updates a composition of the performance index.

85. The system of claim 84, wherein the periodically updating comprises accounting for changes to at least one of the portfolios and the set of investors.

86. The system of claim 84, wherein the periodically updating comprises accounting for changes to at least one of contents of the portfolio of each investor of the set of investors and accounting for changes to investors in the set of investors.

87. The system of claim 79, wherein the rank score ranks the investor relative to other investors based upon the investment data, wherein generating the rank score comprises generating the rank score for each investor by combining a skill score, a persistence score and a confidence score corresponding to the investor.

88. The system of claim 87, wherein the skill score represents an Information Ratio (IR) of the investor, wherein the IR represents active return on the investment position adjusted for risk.

89. The system of claim 87, wherein the skill score represents a Sharpe Ratio (SR) and an Information Ratio (IR) of the investor.

90. The system of claim 89, comprising generating the skill score, wherein generating the skill score comprises calculating the SR of each investor, wherein the SR of an investor comprises an average of an excess monthly return divided by a standard deviation of the excess monthly return.

91. The system of claim 90, wherein generating the skill score comprises calculating the IR of each investor, wherein the IR of an investor comprises an average of a weighted excess active monthly return divided by a standard deviation of the weighted excess active monthly return.

92. The system of claim 91, wherein generating the skill score comprises calculating a Final Ratio (FR) of each investor representing the IR and the SR of the investor, wherein calculating the FR of each investor comprise's calculating a weighted average of the IR and the SR, wherein generating the skill score comprises normalizing the FR.

93. The system of claim 87, comprising generating the persistence score, wherein the persistence score represents skill of the investor relative to a benchmark.

94. The system of claim 93, wherein generating the persistence score comprises:
determining a winning score for each investor as a number of times the investor outperformed a benchmark;
calculating a mean for each investor using a number of trials, wherein the number of trials is a sum of a number of times the investor outperformed the benchmark and a number of times the investor failed to outperform the benchmark;
calculating a standard deviation of the number of trials for each investor;
calculating a distance from the mean for each investor as a first quantity divided by the standard deviation, wherein the first quantity is determined by subtracting the mean from the winning score;
generating a delta score for each investor by exponentiating the distance.

95. The system of claim 94, wherein generating the persistence score comprises:
identifying a minimum delta score among the delta scores of the plurality of investors;
generating a third interim score for each investor by subtracting the minimum delta score from the delta score of each investor;
identifying a maximum third interim score of the plurality of investors;
generating a fourth interim score for each investor by dividing the third interim score of each investor by the maximum third interim score;
generating the persistence score for each investor by multiplying the fourth interim score by 100.

96. The system of claim 87, comprising generating the confidence score, wherein the confidence score represents an investment win percentage relative to an investment loss percentage.

97. The system of claim 96, wherein generating the confidence score comprises:
calculating a weighted average win percentage for a portfolio of each investor;
calculating a weighted average loss percentage for a portfolio of each investor;
generating the confidence score as a ratio of the weighted average win percentage to the weighted average loss percentage.

98. The system of claim 97, wherein calculating the weighted average win percentage comprises:
calculating a first quantity by multiplying a percentage of the investment position in the portfolio and a percentage gain for the investment position, wherein the first quantity is calculated for each period of time of a plurality of periods of time for which the investment position outperformed a benchmark;
calculating a second quantity by summing each first quantity for all periods of time of the plurality of periods of time for which the investment position outperformed the benchmark;
calculating the weighted average win percentage by dividing the second quantity by a total number of investment positions that outperformed the benchmark.

99. The system of claim 98, wherein calculating the weighted average loss percentage comprises:
calculating a third quantity by multiplying a percentage of the investment position in the portfolio and a percentage loss for the investment position, wherein the third quantity is calculated for each period of time of a plurality of periods of time for which the investment position underperformed a benchmark;
calculating a fourth quantity by summing each third quantity for all periods of time of the plurality of periods of time for which the investment position underperformed the benchmark;
calculating the weighted average loss percentage by dividing the third quantity by a total number of investment positions that underperformed the benchmark.

100. The system of claim 99, comprising:
establishing a portfolio value for the portfolio at a time when the investment position is entered;
using the portfolio value to establish the percentage gain and the percentage loss.

101. The system of claim 97, comprising generating the confidence score for each trade during each period of time of a plurality of periods of time.

102. The system of claim 87, wherein generating the rank score comprises generating a weighted average of the skill score, the persistence score and the confidence score.

103. The system of claim 102, wherein generating the rank score comprises:
- forming a skill component by multiplying the skill score by a first weight;
- forming a persistence component by multiplying the persistence score by a second weight;
- forming a confidence component by multiplying the confidence score by a third weight;
- calculating the rank score by summing the skill component, the persistence component and the confidence component.

104. The system of claim 79, comprising classifying each investor by the rank score of the investor.

105. The system of claim 79, comprising receiving investment data of at least one of each investor and the investment position, wherein the investment data includes historical data and real-time data, wherein the real-time data comprises trade data of the investment position.

* * * * *